(12) United States Patent
Morioka

(10) Patent No.: US 7,817,612 B2
(45) Date of Patent: Oct. 19, 2010

(54) DECENTRALIZED WIRELESS COMMUNICATION SYSTEM, APPARATUS, AND ASSOCIATED METHODOLOGY

(75) Inventor: Yuichi Morioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1142 days.

(21) Appl. No.: 10/566,130

(22) PCT Filed: Jul. 23, 2004

(86) PCT No.: PCT/JP2004/010509

§ 371 (c)(1),
(2), (4) Date: Jan. 27, 2006

(87) PCT Pub. No.: WO2005/011200

PCT Pub. Date: Feb. 3, 2005

(65) Prior Publication Data

US 2006/0251098 A1    Nov. 9, 2006

(30) Foreign Application Priority Data

Jul. 29, 2003  (JP) ............... 2003-281586
Jul. 31, 2003  (JP) ............... 2003-283688
Dec. 3, 2003   (JP) ............... 2003-404833

(51) Int. Cl.
    H04W 4/00    (2009.01)
    H04J 1/00    (2006.01)
    H04L 12/28   (2006.01)

(52) U.S. Cl. ............ 370/341; 370/329; 370/330; 370/338; 370/343; 370/400

(58) Field of Classification Search ........ 370/203, 370/208, 254, 270, 312–313, 328–330, 336–338, 370/341, 343–350, 400–401, 414, 431–433, 370/437, 447–450, 458–460, 461, 462, 464–465, 370/468–478, 485–488, 902–903, 908, 912–913, 370/216, 230, 235–236, 252, 315, 326, 454, 370/480; 455/41.2, 500–502, 509–517, 524–526, 455/67.13, 63.3, 550.1, 556.1–556.2, 114.2, 455/115.1, 10, 11.1, 63.1, 67.11, 142.2, 296, 455/418–420, 434, 450, 453, 55.1, 561; 375/143–150, 375/346–349

See application file for complete search history.

(56) References Cited

U.S. PATENT DOCUMENTS 4,533,871 A * 8/1985 Boetzkes ............... 340/10.2
6,377,608 B1 * 4/2002 Zyren .................... 375/132

(Continued)

FOREIGN PATENT DOCUMENTS

JP    2002-64503    2/2002

(Continued)

*Primary Examiner*—Meless N Zewdu
(74) *Attorney, Agent, or Firm*—Oblon, Spivak, McClelland, Maier & Neustadt, L.L.P.

(57) ABSTRACT

Communication stations select the channel which as many communication stations as possible can receive as a beacon sending channel based on interference information of each channel specified in a beacon signal. When there is a communication station which cannot receive a beacon, the beacon sending channel is changed. The communication stations can receive a beacon from all other communication stations by performing beacon receiving operation over a particular channel, avoiding the deadlock state.

47 Claims, 25 Drawing Sheets

U.S. PATENT DOCUMENTS

| | | | |
|---|---|---|---|
| 6,671,525 B2 * | 12/2003 | Allen et al. | 455/574 |
| 6,735,448 B1 * | 5/2004 | Krishnamurthy et al. | 455/522 |
| 6,831,896 B1 * | 12/2004 | Lempio et al. | 370/252 |
| 6,928,263 B2 * | 8/2005 | Blake et al. | 455/41.2 |
| 6,934,554 B2 * | 8/2005 | Mizuno et al. | 455/502 |
| 7,016,673 B2 * | 3/2006 | Reddy et al. | 455/426.2 |
| 7,151,769 B2 * | 12/2006 | Stanforth et al. | 370/351 |
| 7,299,042 B2 * | 11/2007 | Moore et al. | 455/434 |
| 7,333,458 B2 * | 2/2008 | Cain | 370/337 |
| 2001/0031626 A1 * | 10/2001 | Lindskog et al. | 455/67.3 |
| 2002/0082035 A1 * | 6/2002 | Aihara et al. | 455/518 |
| 2002/0172186 A1 * | 11/2002 | Larsson | 370/349 |
| 2003/0181211 A1 * | 9/2003 | Razavilar et al. | 455/450 |
| 2004/0053621 A1 * | 3/2004 | Sugaya | 455/450 |
| 2004/0120292 A1 * | 6/2004 | Trainin | 370/338 |
| 2004/0184473 A1 * | 9/2004 | Tavli et al. | 370/445 |
| 2005/0174950 A1 * | 8/2005 | Ayyagari | 370/254 |
| 2008/0144524 A1 * | 6/2008 | Hershey et al. | 370/254 |

FOREIGN PATENT DOCUMENTS

| | | |
|---|---|---|
| JP | 2002-158667 | 5/2002 |
| JP | 2003-8588 | 1/2003 |

\* cited by examiner

DECENTRALIZED WIRELESS COMMUNICATION SYSTEM, APPARATUS, AND ASSOCIATED METHODOLOGY

TECHNICAL FIELD

The present invention relates to a wireless communication system, wireless communication apparatus and wireless communication method, and computer program for performing mutual communication between multiple wireless stations, such as a wireless LAN (Local Area Network) or PAN (Personal Area Network), and particularly relates to a wireless communication system, wireless communication apparatus and wireless communication method, and computer program for establishing a wireless network by autonomous decentralized operation of each communication station having no particular relationship between a control station and controlled stations.

In more detail, the present invention relates to a wireless communication system, wireless communication apparatus and wireless communication method, and computer program for forming an autonomous decentralized wireless network without neighboring wireless systems interfering mutually without intervention of a specific control station, in a communication environment with multiple channels, and particularly relates to a wireless communication system, wireless communication apparatus and wireless communication method, and computer program for forming an multi-channel autonomous decentralized wireless network by each communication station determining the beacon sending channel and data sending channel of the local station as appropriate.

BACKGROUND ART

Sharing of information such as files, data, and the like, sharing of peripheral equipment such as a printer, and the like, or exchange of information such as transfer of E-mails, data contents, and the like, can be realized by connecting multiple computers to form a LAN.

Heretofore, LAN connection has been generally made by a cable such as an optical fiber, coaxial cable, or a twist pair cable, but this case needs a line laid-down construction, which prevents a network from simple establishment, and also complicates lead wiring of cables. Also, even following establishment of a LAN, the movement range of equipment is restricted due to a cable length, which is inconvenient.

Wireless LANs have attracted a great deal of attention as a system for liberating users from LAN cables of the wired method. According to a wireless LAN, the most part of cables in the work space such as an office can be omitted, so communication terminals such as personal computers (PC) can be moved with relative ease.

In recent years, the demand thereof has been markedly increased along with speeding up and price-reduction of a wireless LAN system. Particularly, in these days, implementation of a personal area network (PAN) has been studied for establishing a small-scale wireless network between multiple electronic apparatuses present around a personal environment to perform information communication. For example, different wireless communication systems and wireless communication apparatuses have been stipulated by using frequency bands not requiring the authorization of a competent authority, such as THE 2.4-GHz band, 5-GHz band, or the like.

Examples of the standard specifications relating to a wireless network include IEEE (The Institute of Electrical and Electronics Engineers) 802.11 (e.g., see Non-patent Document No. 1), HiperLAN/2 (e.g., see Non-patent Document No. 2 and Non-patent Document No. 3), IEEE802.15.3, and Bluetooth communication. As for the IEEE802.11 standard, various types of wireless communication method such as the IEEE802.11a standard, IEEE802.11b standard, and the like are available according to the differences of wireless communication methods and frequency bands to be used.

In general, in order to form a local area network using wireless technology, a method is employed wherein one apparatus serving as a control station called an "access point" or "coordinator" is provided within the area, and then a network is formed under totalized control of this control station.

With a wireless network in which an access point is disposed, in the event that information transmission is performed from a certain communication apparatus, an access control method based on a band reservation has been widely employed wherein a band necessary for information transmission thereof is reserved for the access point first, and a transmission path is utilized so as not to collide with information transmission in one of the other communication apparatuses. That is to say, wireless communication is performed synchronously such that communication apparatuses within the wireless network are synchronized one another by disposing the access point.

However, with a wireless communication system including an access point, in the event that asynchronous communication is performed between the communication apparatuses of the transmission side and the reception side, wireless communication always needs to be performed via the access point, and consequently, a problem wherein utility efficiency of a transmission path is reduced by half is caused.

On the other hand, "Ad-hoc" communication wherein wireless communication is performed direct-asynchronously between terminals has been devised as another method for forming a wireless network. In particular, with a small-scale wireless network made up of relatively few clients positioned nearby, the AD-hoc communication is appropriate wherein wireless communication of direct synchronization can be performed between arbitrary terminals without utilizing a particular access point.

An Ad-hoc wireless communication system includes no central control station, so is appropriate for forming a home network made up of domestic electric appliances, for example. An Ad-hoc network has characteristics wherein routing is automatically changed even if one terminal fails to operate properly, or becomes power-off, so is hardly collapsed, and accordingly, data can be transmitted relatively away while maintaining a high-speed data rate by hopping a packet multiple times between mobile stations. As for an Ad-hoc system, various development cases have been known (e.g., see Non-patent Document 4).

Incidentally, under a work environment wherein information devices such as a personal computer (PC) and the like have become widely used, and a great number of devices are mixed within an office, it is assumed that communication stations are scattered, and multiple networks are established in overlapped manner. Under such a situation, in the case of a wireless network employing a single channel, there is no room for retrieving the situation even if another system interrupts during communication, or communication quality deteriorates due to interference or the like.

To this end, with a conventional wireless network system, a method has been generally employed wherein multiple frequency channels are prepared for coexistence with another network beforehand, and one frequency channel to be used in a wireless communication apparatus serving as an access point is selected to start operation.

According to such a multi-channel communication method, when another system interrupts during communication, or communication quality is deteriorated due to interference or the like, network operation is maintained, and coexistence with another network can be realized by switching a frequency channel to be used.

For example, with a high-speed wireless PAN system of IEEE802.15.3 as well, multiple frequency channels available for the system are prepared, a wireless communication device confirms existence of a device which is sending a beacon signal as a piconet coordinator (PNC) to the surrounding area following power being turned on, and accordingly, an algorism is employed wherein a frequency channel to be used is selected by performing scan operation as to all available channels.

With an autonomous decentralized Ad-hoc network in which a control station is not disposed, resource management regarding frequency channels is important to suppress interference with a different wireless network which is running in the vicinity as much as possible. However, in order to switch a frequency channel to be used for the system all at once, a representative station called an access point needs to instruct each terminal station regarding a utility channel. In other words, it is difficult to switch a frequency channel with an Ad-hoc network.

In order to switch between multiple frequency channels, upon HiperLAN/2 being taken as an example, a method for switching the channels all at once has been conceived. For example, an AP (base station) serving as a central control station repeatedly informs MTs (mobile stations) connected to the AP that frequency channels are changed, and the AP and MTs switch the utility channels all at once. Determination regarding whether or not switching should be done is made on the initiative of the AP. Information necessary for this determination can be acquired through the following processing procedures, for example.

(1) According to the instructions of the AP, the MTs which are connecting therewith suspend communication temporarily, scan another frequency channel to perform channel quality evaluation, and inform the AP of the result thereof.

(2) According to the instructions of the AP, the AP suspends transmission of an annunciation channel temporarily, and the MTs now connecting to the AP scan the current frequency channel in use, also perform channel quality evaluation, and inform the AP of the result thereof, and the information is collected by following such procedures.

Also, with Bluetooth communication, a method has been employed wherein each frequency channel is fairly utilized by hopping frequencies with a central control station called a master serving as the basis. In order to form a network, the existence of the master serving as the basis of synchronization between the hopping pattern of a frequency channel and the time axial direction is indispensable. In the event of the master disappearing, the network formed so far once becomes a disconnected state, and the processing for selecting a new master becomes necessary.

Also, with a wireless LAN system of the IEEE802.11 series, a network is formed using the frequency channel set by an access point first, and accordingly, it is difficult to establish an Ad-hoc network without disposing a base station. In the event of performing communication with a wireless communication apparatus (terminal) accommodated in an AP which runs with another frequency channel, between the APs needs to be connected with a wired LAN cable, for example. That is to say, unless between the APs which are accommodated is connected, communication cannot be performed even if wireless communication apparatuses (terminals) which physically adjacently exist are accommodated in a different AP.

Also, with a high-speed wireless PAN system of IEEE802.15.3 as well, it is possible to perform scan of all frequency channels first, and search of coordinators existing in the vicinity, but once implementation using a particular frequency channel is started, the utility situations of other frequency channels cannot be comprehended. Accordingly, even if a piconet using a different frequency channel exists in the vicinity, communication with a wireless communication apparatus connected to the piconet cannot be performed.

Thus, with a conventional wireless communication method, a complex mechanism is necessary, such as timing of switching frequency channels, set-up processing realized by message exchange and the like for terminals, which participate in a network, starting frequency channel switching operation in sync with one another, arbitration processing for determining frequency channel switching, and the like. Also, the existence of a central control station is necessary, such as an AP in IEEE802.11 and HiperLAN/2, or a master in Bluetooth communication, which performs control independently. If the central control station such as an AP, master, or the like disappears, some kind of protocol processing or human-induced setting modification work becomes necessary for selecting a new central control station instead of that central control station, which causes a problem wherein communication is disconnected during that processing.

Also, a wireless communication system has been proposed wherein a frequency channel is determined by measuring not only the interference of the local station channel but also interference using an adjacent channel (see Patent Document 1), but this is a system in which multi-channels are realized by intervening of a base station, so cannot be applied to an autonomous decentralized system.

For example, a method can be conceived wherein a traffic receiving channel is specified by a communication station sending a beacon over the channel most appropriate for the local station. However, even if that channel is most appropriate for the local station, that channel may be a channel which provides interference to a communication station receiving the beacon. It is needless to say that the beacon sending channel which a communication station selected on the basis of the local station is not always a channel which all peripheral communication stations can receive.

Also, in the event that the beacon sending channel of one station is the channel which cannot be used in the other station due to a interference channel or deterioration of communication quality, even if these communication stations can communicate with each other over another channel, these communication stations get trapped in a deadlock state in which they cannot acknowledge one another's existence eternally.

[Patent Document 1]

Japanese Unexamined Patent Application Publication No. 6-37762

[Non-Patent Document 1]

International Standard ISO/IEC 8802-11: 1999(E) ANSI/IEEE Std 802.11, 1999 Edition, PartII: Wireless LAN Medium Access Control (MAC) and Physical Layer (PHY) Specifications

[Non-Patent Document 2]

ETSI Standard ETSI TS 101 761-1 V1.3.1 Broadband Radio Access Networks (BRAN); HIPERLAN Type 2; Data Link Control (DLC) Layer; Part1: Basic Data Transport Functions

[Non-Patent Document 3]
ETSI TS 101 761-2 V1.3.1 Broadband Radio Access Networks (BRAN); HIPERLAN Type 2; Data Link Control (DLC) Layer; Part2: Radio Link Control (RLC) sublayer

[Non-Patent Document 4]
C. K. Tho; Ad Hoc Mobile Wireless Network (Prentice Hall PTR)

SUMMARY

It is an object of the present invention to provide an excellent wireless communication system, wireless communication apparatus and wireless communication method, and computer program, which can preferably form a network by between communication stations mutually operating in an autonomous decentralized manner without interference under a communication environment in which multiple channels are prepared.

It is another object of the present invention to provide an excellent wireless communication system, wireless communication apparatus and wireless communication method, and computer program, which can perform channel access using multiple frequency channels effectively in an autonomous decentralized wireless network which requires no particular control station.

It is a further object of the present invention to provide an excellent wireless communication system, wireless communication apparatus and wireless communication method, and computer program, which can avoid a deadlock state in which each of communication stations cannot acknowledge one another's existence to form an autonomous decentralized multi-channel wireless network.

The present invention has been made in light of the above problems, and a first aspect thereof is a wireless communication system for forming an autonomous decentralized network using multiple communication stations having no relationship between a control station and controlled stations under a communication environment in which multiple channels are prepared;
wherein each communication station transmits a beacon signal in a certain cycle using the channel which many more peripheral stations can receive.

Note, however, that the term "system" here means a logical group made up of multiple devices (or function modules for realizing a particular function), and whether or not each device or each function module is accommodated in a single casing is irrelevant.

With an autonomous decentralized wireless network, each of communication stations can acknowledge the network configuration thereof by informing beacon information within a transmission frame cycle, and performing scan operation of a beacon signal from one of the other stations. However, in the event of an autonomous decentralized network utilizing multi-channels, transmission frames are configured so as to be overlapped over the frequency axis for the amount of the number of utility channels, so the communication stations cannot receive a beacon unless they make the transition to over the same channel at the beacon sending timing of another communication, and accordingly, it is hard for a new participating station to determine the beacon sending timing and sending channel of the local station.

Also, even if the communication station is most appropriate for the local station, that channel may be the channel which provides interference to one of the other stations serving as an other communication party. It is needless to say that the beacon sending channel which a communication station selected on the basis of the local station is not always the channel which all peripheral communication stations can receive. For example, in the event that the beacon sending channel of one station is the channel which cannot be used in the other station due to a interference channel or deterioration of communication quality, even if these communication stations can communicate with each other over another channel, these communication stations get trapped in a deadlock state in which they cannot acknowledge one another's existence eternally.

With the present invention, an arrangement is made wherein the communication stations describe the level information of interference which the local station receives in a beacon signal which is periodically transmitted by each communication station (or some kind of signal for informing interference information), and transmit this. Consequently, the communication stations determine a communication channel following comprehending interference situations based on the received beacon information from peripheral stations. Accordingly, with the present invention, the communication channels can be controlled in an autonomous decentralized manner by avoiding that the channel which terribly provides interference to the peripheral stations is utilized as a communication channel.

The communication stations select the channel which many more communication stations can receive as a beacon sending channel based on the interference information of each channel described in a beacon signal when new participation or refresh. Also, in the event that there is a peripheral station which cannot receive a beacon, the beacon sending channel is attempted to be changed.

Thus, according to the present invention, in light of the interference levels of peripheral stations over each channel, an arrangement is made by selecting the channel which many more communication stations can receive as a beacon sending channel, so becoming trapped in a deadlock state in which they cannot acknowledge one another's existence eternally can be avoided as much as possible. Also, each communication station does not need to switch the channel during a period in which there is no sending data, and only reception of a beacon is being performed.

The communication stations can reduce overhead necessary for exchange of (RTS/CTS) packets, and channel transition by utilizing the same communication channel as that of a peripheral communication station as much as possible if the interference which the local station receives is an acceptable level.

Also, the communication stations may perform data sending operation using a channel other than a beacon sending channel. For example, based on the interference information obtained from the beacon signal of an other communication party, a traffic may be transmitted using the most appropriate channel having a low interference level between the communication stations.

The communication stations may determine a beacon sending channel according to regarding whether or not the local station needs a wideband, for example. For example, in the event that the local station needs a wideband, the channel which is preferably not used by other communication stations, and has a low interference level for the local station is selected, and transmission of a beacon is started. The same operation is performed regardless of whether the local station is the transmission side or the reception side.

On the other hand, the communication station which does not need a wideband, upon considering overhead and the like when changing a channel, preferably transmits a beacon over the same channel as a peripheral communication station, so focuses on the channel which the most communication stations transmit a beacon (most frequent channel).

In the event that peripheral stations including the local station do not receive great interference over the most frequent channel, transmission of a beacon is started using this channel. Also, in the event that the multiple communication stations receive so great interference that they cannot receive a beacon transmitted at the lowest rate, the channel which causes the average interference level to the lowest is selected, and transmission of a beacon is started there.

Also, according to a wireless communication system according to the present invention, following transmission of a beacon, comings and goings of traffics can be managed in an autonomous decentralized manner by giving a preferential communication right to the beacon sending station thereof. At this time, following transmission of a beacon, the channel preferentially utilized may be changed to the channel most appropriate for traffic transmission other than the beacon sending channel according to the interference situation on the reception side.

Also, with an autonomous decentralized wireless communication system according to the present invention, random access based on (CSMA/CA) can be performed during a period other than a preferential sending period disposed immediately following a beacon sending timing over each channel. At this time, the (RTS/CTS) method can be employed as means for avoiding a collision and improving communication quality. With this communication method, the communication station serving as a data sending source transmits a request to send packet (RTS) over the beacon sending channel of the communication station serving as a data sending destination, and starts data transmission in response to receiving a clear to send packet (CTS) from the communication station serving as the data sending destination.

Now, the communication station serving as the data sending source may transmit a beacon multiplexed with the (RTS) signal over the beacon sending channel prior to transmission of the (RTS) signal, assuming that a communication station serving as a hidden terminal exists from the perspective of the communication station serving as the data sending destination. A peripheral station which received such a beacon attempts to avoid interference by withholding transmission of data for a predetermined period over a channel wherein data transmission is performed based on the (RTS/CTS) procedures.

At this time, in the event that the beacon sending channel of the data sending source is identical to the beacon sending channel of the data sending destination communication station, the beacon multiplexed with the (RTS) signal is regarded as the (RTS) signal itself. Also, the communication station serving as the data sending destination can start data transmission by feeding back the (CTS) signal in response to receiving the relevant beacon. Thus, the overhead of the (RTS/CTS) procedures at multi-channels can be reduced by omitting retransmission of the (RTS) signal.

Also, a second aspect of the present invention is a wireless communication system for forming an autonomous decentralized network using multiple communication stations having no relationship between a control station and controlled stations under a communication environment in which multiple channels are prepared;

wherein each communication station transmits a beacon in a certain transmission frame cycle over the beacon sending channel of the local station, and also in the event that the beacon sending channel set by the other station which does not need to perform communication is different from the channel which the local station now uses, each communication station omits receiving operation of a beacon from the relevant other station so as not to perform channel switching for reception of a beacon.

As described above, the wireless communication system according to the first aspect of the present invention is a multi-channel-type autonomous decentralized network, so the communication stations can set the most appropriate channel to the beacon sending channel of the local station.

Now, each communication station needs to perform notification regarding comprehension for existences of peripheral stations, and a network state by transmitting a beacon in a certain transmission frame cycle, and also receive a beacon from the peripheral stations. With a multi-channel-type network, in order to transmit a beacon, the communication stations need to make the transition to the beacon sending channel in sync with the beacon sending timing of each peripheral station. However, channel switching requires a period of around 300 μsec or so from the perspective of hardware operation. Consequently, in the event that the communication station which is communicating data suspends data communication to receive a beacon from one of the other stations, performs channel transition and reception of a beacon, following which makes the transition to the original channel to resume data communication, overhead becomes great.

To this end, with the second aspect of the present invention, an arrangement is made wherein in the event that the communication stations comprehend that the beacon sending timing of one of the other stations approaches, the communication stations determine regarding whether or not there is the need to communicate with the relevant beacon sending station, and then in the event that there is no need to receive a beacon, and also the current utility channel is different from the beacon sending channel, beacon receiving operation is omitted.

Thus, omitting unnecessary beacon receiving operation enables time necessary for beacon transition and power consumption of an apparatus to be omitted, and also enables communication capacity to be increased.

Now, with a wireless communication system according to the present invention, comings and goings of traffics is managed in an autonomous decentralized manner by providing a preferential communication right to a beacon sending station (described above), but the beacon sending station does not always acquire a preferential transmission right based on a beacon sending channel. That is to say, the beacon sending station may change a channel which can be used preferentially to the channel most appropriate for traffic transmission other than the beacon sending channel depending on the interference situation on the reception side.

The beacon sending station may make the transition to another channel immediately after sending a beacon to start data communication, but upon the communication station omitting beacon receiving operation, such channel transition operation cannot be acknowledged. To this end, the communication station, in the event of omitting beacon receiving operation, estimates the sending timing regarding the RTS and CTS signals based on the beacon sending timing, performs receiving operation over the current utility channel only for that timing, and detects regarding whether or not the beacon sending station has made the transition to the current utility channel.

Subsequently, in the event that the communication station detects that the beacon sending channel has made the transition to the current utility channel at the sending timing of the RTS and CTS signals, the communication station avoids a communication collision by withholding data communication operation of the local station. On the other hand, in the event that the communication station does not detect that situation, the communication station acknowledges that the beacon sending station has acquired a preferential transmission right based on another channel, and continuously performs data communication operation of the local station over the current utility channel.

Thus, in the event of omitting beacon receiving operation of one of the other stations, there is no need to perform unnecessary channel transition, and also a communication collision can be avoided by the beacon sending station performing receiving operation for a certain period during the preferential sending period acquired through beacon transmission.

Also, a third aspect of the present invention is a wireless communication system for forming a network based on Ad-hoc communication using multiple communication stations having no relationship between a control station and controlled stations under a communication environment in which multiple channels are prepared;

wherein each communication station transmits a beacon over the beacon sending channel most appropriate for own reception, and also performs transmission of data using the beacon sending channel of the communication station serving as a data sending destination.

With the third aspect of the present invention, an arrangement is made wherein each communication station selects a channel having communication quality most excellent for the local station as a beacon sending channel, and disposes the beacon sending timing of the local station over this channel to perform beacon transmission. In the event that the beacon sending timing of an existing station has been already set over the own beacon sending channel, the own beacon sending timing is determined so as not to overlap temporally. The information of interference from which each channel suffers for example, and so forth are described on beacon information. Also, the communication stations, according to the beacon sending timing of one of the other stations, make the transition to the beacon sending channel of that station to perform beacon reception.

On the other hand, when the communication stations transmit data, the communication stations perform data transmission using the channel having excellent communication quality appropriate for reception in the communication station serving as a data sending destination, regardless of the beacon sending channel of the local station. Regarding which channel communication quality is appropriate for each communication station can be readily determined by which channel the communication station thereof uses to perform beacon transmission.

Thus, each communication station determines a beacon sending channel only depending on the interference situation of the local station, and this is familiarized to the public as a channel for receiving the traffic of the local station, which facilitates control in each communication station under a multi-channel autonomous decentralized communication environment.

Here, each communication station may acquire a preferential sending period along with the beacon sending timing of the local station.

Also, each communication station makes the transition to the beacon sending channel of one of the other stations along with the beacon sending timing of that station, and receives a beacon, following which is allowed to perform data sending operation over a channel other than that beacon sending channel even during a preferential sending period provided to that station over that beacon sending channel.

For example, a certain communication station performs data transmission using the beacon sending channel of the communication station of a sending destination using a preferential sending period acquired following beacon transmission. Subsequently, during the preferential sending period, upon the beacon receiving timing of one of the other stations approaching, the communication station once suspends transmission, and makes the transition to the beacon sending scheduled channel thereof. With the channel serving as the transition destination, one of the other stations utilizes a preferential sending period, but in the event that the channel serving as the transition destination is different from the channel utilized by the local station, the local station can return to the original channel to continue data sending operation.

Therefore, according to the present invention, each communication station can determine a communication channel in an autonomous decentralized manner, and avoid interference effectively, and also improve communication capacity drastically by utilizing multiple channels effectively.

Also, with an autonomous decentralized wireless communication system according to the present invention, random access based on (CSMA/CA) can be performed during a period other than a preferential sending period disposed immediately following a beacon sending timing over each channel. At this time, the (RTS/CTS) method can be employed as means for avoiding a collision and improving communication quality.

In such a case, the communication station serving as a data sending source transmits the request to send packet (RTS) over the beacon sending channel of the communication station serving as a data sending destination, and starts data transmission in response to receiving the clear to send packet (CTS) from the communication station serving as the data sending destination.

Also, the communication station serving as the data sending source may transmit a beacon in which the communication station serving as the data sending destination and the beacon sending channel thereof are specified over the beacon sending channel of the local station prior to transmission of the (RTS) signal, assuming that a communication station serving as a hidden terminal exists from the perspective of the communication station serving as the data sending destination. A peripheral station which received such a beacon attempts to avoid interference by withholding transmission of data for a predetermined period over the beacon sending channel of the communication station serving as the data sending destination, i.e., a channel wherein data transmission is performed based on the (RTS/CTS) procedures.

At this time, in the event that the beacon sending channel of the data sending source is identical to the beacon sending channel of the communication station serving as the data sending destination, the beacon in which the communication station serving as the data sending destination and the beacon sending channel thereof are specified is regarded as a pseudo-RTS signal. Also, the communication station serving as the data sending destination can start data transmission by feeding back the (CTS) signal in response to receiving the beacon in which the communication station serving as the data sending destination and the beacon sending channel thereof are specified. Thus, overhead of the (RTS/CTS) procedures at multi-channels can be reduced by omitting the transmission procedures of the (RTS) signal (retransmission of the (RTS) signal).

Also, a fourth aspect of the present invention is a computer program which is described in a computer-readable format so as to execute on a computer system the processing for operating in an autonomous decentralized manner under a wireless communication environment in which multiple channels are prepared, having no relationship between a control station and controlled stations, the program comprising:

a channel setting step for setting a data sending/receiving channel;

a communication control step for controlling transmission and reception of data;

a beacon generating step for generating a beacon signal including the level information of interference which the local station receives; and a beacon analyzing step for analyzing the beacon signal received from a peripheral station;

wherein in the channel setting step, a communication channel is determined based on the interference level information included in the beacon received from a peripheral station following comprehending the interference situation of each channel at the peripheral station.

Also, a fifth aspect of the present invention is a computer program which is described in a computer-readable format so as to execute the processing for operating in an autonomous decentralized manner under a wireless communication environment in which multiple channels are prepared, having no relationship between a control station and controlled stations, the program comprising:

a beacon sending step for setting the beacon sending channel of the local station, and sending a beacon;

a beacon receiving control step for controlling beacon receiving operation from a peripheral station;

a beacon analyzing step for analyzing the beacon signal received from a peripheral station; and a communication control step for setting a data communication channel, and controlling data communication operation;

wherein the beacon receiving control step including:
a sub step for comprehending that the beacon sending timing of the other station approaches;
a sub step for determining regarding whether or not there is the need to perform communication with the relevant beacon sending station; and
a sub step for omitting beacon receiving operation in the event that there is no need to receive a beacon, and also the channel which the local station now uses is different from the beacon sending channel.

Also, a sixth aspect of the present invention is a computer program which is described in a computer-readable format so as to execute the processing for operating in an autonomous decentralized manner under a wireless communication environment in which multiple channels are prepared, having no relationship between a control station and controlled stations, the program comprising:

a channel setting step for setting a data sending/receiving channel;

a communication control step for controlling data sending/receiving timing;

a beacon generating step for generating a beacon signal of the local station; and a beacon analyzing step for analyzing the beacon signal received from a peripheral station;

wherein in the channel setting step, of the multiple channels, the own beacon sending channel is determined, and also the beacon sending channel of the communication station serving as a data sending destination is determined as a data sending channel when transmitting data.

The computer program according to each of the fourth through sixth aspects of the present invention is defined as a computer program which is described in a computer-readable format so as to realize predetermined processing on a computer system. In other words, by installing the computer program according to each of the fourth through sixth aspects of the present invention on a computer system, collaborative operation is exhibited on the computer system, which operates as a wireless communication apparatus. A wireless network is established by activating a plurality of such wireless communication apparatuses, whereby the same advantages as the wireless communication system according to each of the first through third aspects of the present invention can be obtained.

ADVANTAGES

The present invention provides an excellent wireless communication system, wireless communication apparatus and wireless communication method, and computer program, which can preferably form a Ad-hoc network without mutual interference between communication stations under a communication environment in which multiple channels are prepared.

Also, the present invention further provides an excellent wireless communication system, wireless communication apparatus and wireless communication method, and computer program, which can perform channel access using multiple frequency channels effectively in an autonomous decentralized wireless network which requires no particular control station (access point, base station, master, etc.).

Also, the present invention further provides an excellent wireless communication system, wireless communication apparatus and wireless communication method, and computer program, which can avoid a deadlock state in which each of communication stations cannot acknowledge one another's existence to form an autonomous decentralized multi-channel wireless network.

A multi-channel autonomous decentralized wireless communication system according to the present invention can preferably avoid a deadlock state between communication stations, and also improve the throughput of the entire system by effective frequency assignment, and further reduce influence to another system.

Also, the multi-channel autonomous decentralized wireless communication system according to the present invention, by transmitting a beacon, needs to perform comprehending the existence of a peripheral station, and notification of a network status, and also receiving a beacon from peripheral stations, but by omitting unnecessary beacon receiving operation, can omit time necessary for beacon transition and power consumption of an apparatus, and can increase communication capacity.

Also, in the event of omitting beacon receiving operation, by estimating the sending timing of the (RTS) and (CTS) signals based on the beacon sending timing, and performing receiving operation over the current utility channel only for that timing, unnecessary channel transition can be omitted, and also a communication collision can be avoided.

Also, the multi-channel autonomous decentralized wireless communication system according to the present invention can improve the throughput of the entire system, and also can reduce influence to another wireless system in the vicinity by each communication station performing frequency assignment effectively, and performing flexible interference avoidance. Also, multiple channels can be used simultaneously, so even in this point, the throughput of the entire system can be improved.

Other objects, characteristics, and advantages regarding the present invention will be apparent with more detailed description based on later-described embodiments of the present invention and the appended drawings.

DETAILED DESCRIPTION

Hereinafter, description will be made in detail regarding embodiments of the present invention with reference to the drawings.

A. System Configuration

A communication transmission path assumed in the present invention is wireless, and also a network is established between multiple communication stations using a transmission medium made up of multiple frequency channels, i.e., multi-channels. Also, communication assumed in the present invention is cumulative exchanging traffic, and information is transferred in increments of packet.

With a wireless network according to the present invention, each communication station can directly (at random) transmit information in accordance with the access procedures based on carrier detection such as CSMA (Carrier Sense Multiple Access) or the like, or detection of the clear status of a medium, whereby an autonomous decentralized wireless network can be established.

With an autonomous decentralized wireless communication system having no relationship between a control station and controlled stations, for example, each communication station informs the other communication stations in the vicinity (i.e., within a communication range) of its own existence, and also informs them of the network configuration thereof by informing them of beacon information. Also, a communication station newly appears in the communication range of a certain communication station detects to enter the communication range by receiving a beacon signal, and also acknowledges the network thereof by interpreting information described in the received beacon, and can participate in the network.

The communication stations transmit a beacon at the head of a transmission frame cycle, so the transmission frame cycle in each channel which each communication station utilizes is defined by a beacon interval. Each communication station is in gradual time-sync with one another in accordance with mutual beacon sending timings, and transmission control which utilizes channel resources effectively is performed using a transmission (MAC) frame having a time-sharing multiplexing access configuration. Accordingly, each communication station can employ an access method on the basis of time synchronization, such as reserving a band, or setting a preferential utility period, or the like.

Processing in each communication station, which will be described below, is basically the processing which is executed by all communication stations to be participated in an autonomous decentralized network according to the present invention. However, in some cases, all communication stations making up a network do not always perform the processing which will be described below.

Figure 1:
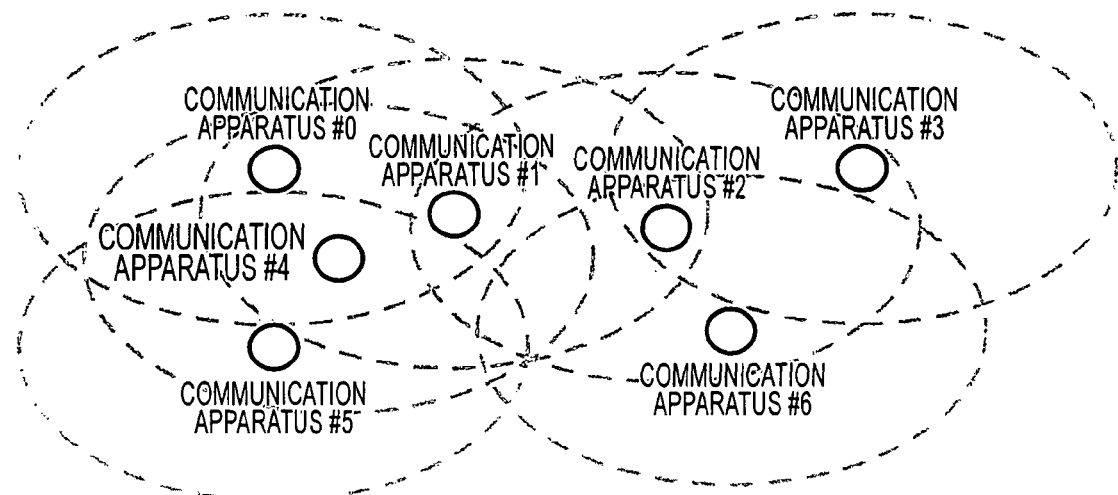
FIG. 1 is a diagram illustrating placement examples of communication apparatuses making up a wireless communication system according to an embodiment of the present invention.

FIG. 1 illustrates a placement example of communication apparatuses making up a wireless communication system according to an embodiment of the present invention. With this wireless communication system, a particular control station is not disposed, each communication apparatus operates in an autonomous decentralized manner, and makes up an Ad-hoc network. This drawing represents a situation in which communication apparatus #0 through communication apparatus #6 are distributed on the same space.

Also, in the drawing, the communication range of each communication apparatus is illustrated with a dashed line, which is defined not only as a range in which each communication apparatus can communicate with one of the other communication apparatuses contained therein, but also as a range with which a signal transmitted from the local station interferes. That is to say, the communication apparatus #0 is positioned in a range communicable with the communication apparatuses #1 and #4 in the vicinity thereof, the communication apparatus #1 is positioned in a range communicable with the communication apparatuses #0, #2, and #4 in the vicinity thereof, the communication apparatus #2 is positioned in a range communicable with the communication apparatuses #1, #3, and #6 in the vicinity thereof, the communication apparatus #3 is positioned in a range communicable with the communication apparatus #2 in the vicinity thereof, the communication apparatus #4 is positioned in a range communicable with the communication apparatuses #0, #1, and #5 in the vicinity thereof, the communication apparatus #5 is positioned in a range communicable with the communication apparatus #4 in the vicinity thereof, and the communication apparatus #6 is positioned in a range communicable with the communication apparatus #2 in the vicinity thereof.

In the event of performing communication between particular communication apparatuses, a communication apparatus from which one of the communication apparatuses serving as an other communication party can hear, but the other communication apparatus cannot hear, i.e., a "hidden terminal" exists.

Figure 2:
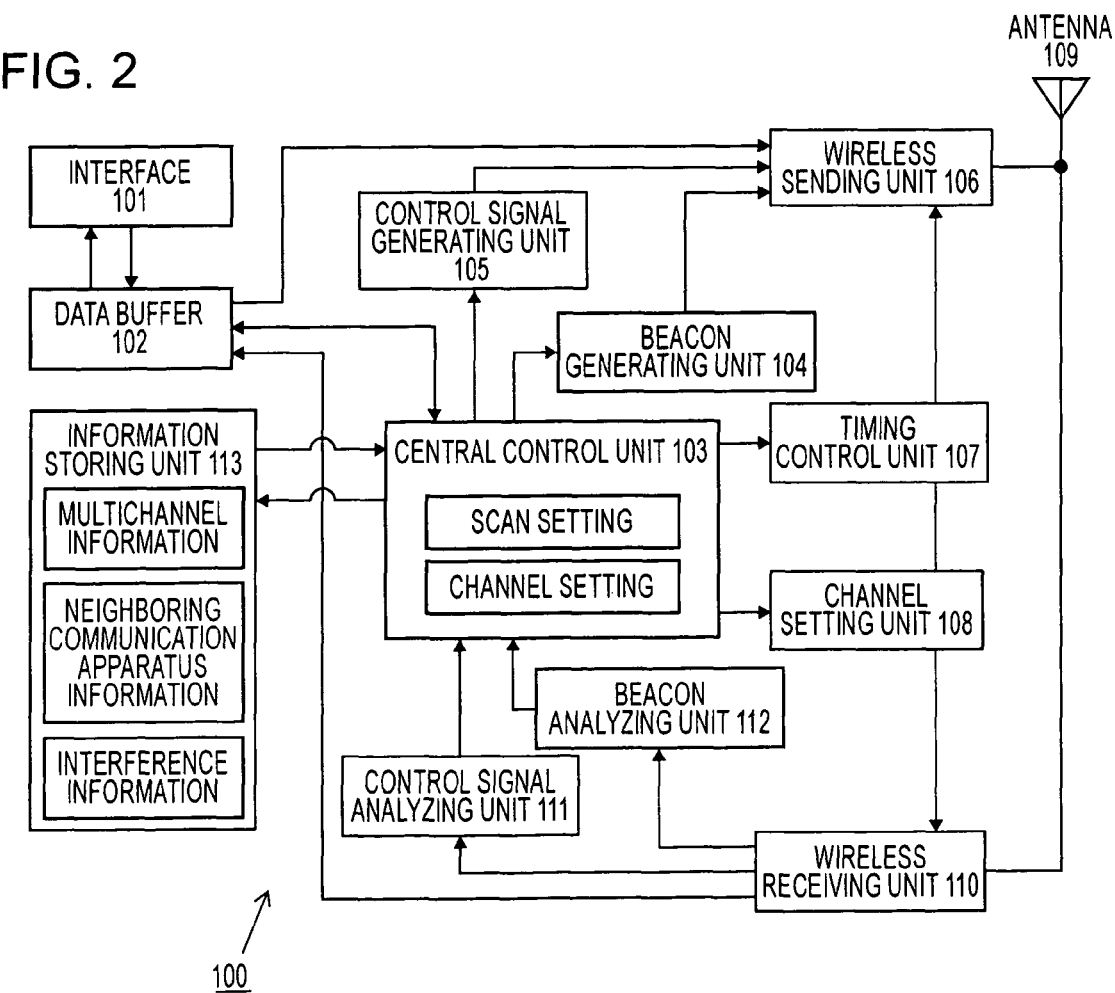
FIG. 2 is a diagram schematically illustrating the functional configuration of a wireless communication apparatus according to an embodiment of the present invention.

FIG. 2 illustrates the functional configuration of a wireless communication apparatus operating as a communication station in a wireless network according to an embodiment of the present invention. The wireless communication apparatus shown in the drawing can form an appropriate Ad-hoc network without mutual interference with another wireless system by performing channel access effectively within the same wireless system under a communication environment in which multiple channels are prepared.

A wireless communication apparatus 100 comprises an interface 101, data buffer 102, central control unit 103, beacon generating unit 104, control signal generating unit 105, wireless sending unit 106, timing control unit 107, channel setting unit 108, antenna 109, wireless receiving unit 110, control signal analyzing unit 111, beacon analyzing unit 112, and information storing unit 113.

The interface 101 performs exchange of various types of information with an external device (e.g., personal computer (not shown) etc.) connected to this wireless communication apparatus 100.

The data buffer 102 is used for temporarily storing data transmitted from equipment connected via the interface 101, or data received via a wireless transmission path prior to transmitting this via the interface 101.

The central control unit 103 performs transmission and reception processing management of a series of information, and access control of a transmission path (including scan setting operation and channel setting operation at multi-channels, beacon receiving operation, data communication operation in accordance with the (RTS/CTS) method, etc.), at the wireless communication device 100, in a centralized manner.

The beacon generating unit 104 generates a beacon signal to be exchanged periodically with a wireless communication apparatus in the vicinity.

The control signal generating unit 105 generates control information (described later) such as a request to send (RTS) signal, a clear to send (CTS) signal, or the like as necessary prior to data transmission. With the present embodiment, the (RTS) signal and a beacon signal are sometimes multiplexed and transmitted. However, the (RTS/CTS) communication method under a multi-channel autonomous decentralized communication environment will be described later in detail.

The antenna 109 transmits a signal by wireless to one of the other wireless communication apparatuses over the selected frequency channel, or collects a signal transmitted from one of other wireless communication apparatuses. With the present embodiment, let us say that a single antenna is employed, and cannot perform transmission and reception simultaneously. Also, let us say that multiple frequency channels cannot be handled at the same time.

The wireless sending unit 106 transmits data or a beacon temporarily stored in the data buffer 102 by wireless. The wireless sending unit 106 comprises a modulator for modulating a transmission signal with a predetermined modulation method, D/A converter for converting a digital transmission signal into an analog signal, up-converter for up-converting an analog transmission signal through frequency conversion, power amp (PA) for amplifying the power of the up-converted transmission signal, and the like (any of these are not shown).

The wireless receiving unit 110 performs reception processing of a signal such as information, a beacon, or the like transmitted from one of the other wireless communication apparatuses at predetermined time. The wireless receiving unit 110 comprises a low noise amp (LNA) for subjecting a signal received from one of the other stations via the antenna 109 to voltage amplification, down-converter for down-converting the received signal subjected to voltage amplification through frequency conversion, automatic gain controller (AGC), A/D converter for converting analog received signal into digital, demodulator for performing synchronization processing for acquiring synchronization, channel estimation, and demodulation processing using a predetermined demodulation method, and the like (any of these are not shown).

With a first embodiment according to the present invention, a beacon signal is configured so as to be transmitted at the lowest rate which can be set, and so as to be received by many more communication stations. Also, with a second embodiment, the wireless communication apparatus 100 confirms the communication quality in each channel, and sets the channel most appropriate for the local station as a reference channel for sending a beacon to operate and control a wireless network. Subsequently, in the event that there is an existing station over the beacon sending channel of the local station, the beacon sending slot position of the local station is determined so as not to overlap temporally, but in the event that there is no existing station, the beacon sending slot position of the local station is determined at arbitrary timing. Information regarding the communication quality of each channel, the beacon sending channel of the local station, and the other beacon transmission is stored in the information storing unit 113. Description will be made later regarding the specific configuration of a beacon signal.

Also, with the first embodiment of the present invention, each communication station determines the beacon sending channel and data communication channel of the local station based on the communication quality of each channel. To this end, the wireless receiving unit 110 estimates the propagation path situation in each channel, and informs the central control unit 103 of the result thereof. On the other hand, with the second embodiment, of the multiple frequency channels which are prepared, the channel most appropriate for the local station is set as the beacon sending channel of the local station, and also when transmitting data, the channel appropriate for reception of the communication station serving as a sending destination (i.e., the beacon sending channel of the relevant receiving station) is set successively as the data sending channel of the local station.

Note that as for the wireless sending/receiving method in the wireless sending unit 106 and the wireless receiving unit 110, various types of communication method, for example, which can apply to a wireless LAN, and are appropriate for relatively short distance communication, can be applied thereto. Specifically, the UWB (Ultra Wide Band) method, OFDM (Orthogonal Frequency Division Multiplexing) method, CDMA (Code Division Multiple Access) method, or the like can by employed.

The timing control unit 107 performs timing control for transmitting and receiving a wireless signal. For example, the beacon sending timing of the local station at the head of a transmission frame cycle stipulated over the beacon sending channel of the local station, the beacon receiving timing from a peripheral station at each channel, the scan operation cycle in each channel, a refresh cycle for setting a beacon sending channel or channel interference information, the sending timing (inter-frame space (IFS)) of each packet (RTS, CTS, data, ACK, etc.) in accordance with the RTS/CTS method, and the like are controlled.

The channel setting unit 108 selects a channel for actually transmitting or receiving a wireless signal conforming to the multi-channel method. With the present embodiment, the channel most appropriate for the local station, or the channel which many more communication stations can receive is set as the beacon sending channel. Also, the most appropriate channel having a low interference level between the communication stations can be set as the data sending channel based on the interference information obtained from the beacon signal of the other communication party.

Regarding which channel is the most appropriate for reception of a traffic in the local station can be determined by measuring communication quality at the time of scanning each channel, for example. Also, the status of each channel fluctuates every moment, so in addition to the time of new participation, refresh operation is performed in a periodic cycle to obtain the newest channel interference information, and then channel setting operation is performed. It is needless to say that when communication quality changes equal to or greater than a predetermined value at any of the channels, the beacon sending channel may be set again. Note that the measuring method of the communication quality of a channel, and resetting of the beacon sending channel are not directly associated with the essence of the present invention, so further description will not be made in the present specification.

The control signal analyzing unit 111 analyzes control information such as the (RTS) signal (including the RTS signal multiplexed with a beacon signal), (CTS) signal, which are transmitted from a peripheral wireless communication apparatus, and the like.

The beacon analyzing unit 112 analyzes the beacon signal received from a peripheral station, and analyzes the existence of a wireless communication apparatus in the vicinity. For example, information such as the beacon sending channel of a peripheral station and the receiving timing thereof, the channel interference information described in a received beacon, and so forth is stored in the information storing unit 113 as neighboring apparatus information.

The information storing unit 113 stores executive procedure instructions (program for performing scan setting, channel setting, etc.) such as a series of access control operation which are executed by the central control unit 103, multi-channel information such as the beacon sending timing and beacon sending channel of the local station, the beacon sending timing and beacon sending channel of one of the other communication stations, and the like, neighboring apparatus information, interference information in each channel of the local station and a peripheral station, and the like.

The wireless communication apparatus 100 confirms the communication quality in each channel, and sets the channel most appropriate for the local station, or the channel which many more communication stations can receive as a reference channel for sending a beacon to operate and control a wireless network. Subsequently, in the event that there is an existing station over the beacon sending channel of the local station, the beacon sending timing of the local station is determined so as not to overlap temporally, but in the event that there is no existing station, the beacon sending timing of the local station is determined at arbitrary timing. Information regarding the communication quality of each channel, the beacon sending channel of the local station, and the other beacon transmission and reception is stored in the information storing unit 113. Description will be made later regarding the specific configuration of a beacon signal.

B. Access Operation Over a Channel

With the present embodiment, the wireless communication apparatus 100 operating as a communication station performs transmission control which utilizes channel resources effectively using a transmission (MAC) frame having a gradual time-sharing multiplexing access configuration, or communication operation such as random access based on (CSMA/CA), and the like under a communication environment in which multiple channels are prepared, and a particular control station is not disposed.

Here, CSMA is a connection method for performing multiplexing access based on carrier detection. With wireless communication, it is difficult for a station to receive a signal transmitted from itself, so collision is avoided by starting information transmission of the local station following confirming that there is no information transmission of the other communication apparatuses using not the (CSMA/CD) (Collision Detection) method but the (CSMA/CA) (Collision Avoidance) method. The (CSMA) method is an access method appropriate for asynchronous data communication such as file transfer, E-mail, and the like.

Note that with ultra wide band (UWB) communication for performing communication using a ultra-short pulse wave of 1 nano-second or less without using carriers in very wide frequency band, a signal diffused in the bandwidth of several GHz, or a multi-carrier signal, carrier detection cannot be performed, but similar random access can be performed by the communication station, which performs data transmission, detecting the clear status of a medium.

With the first embodiment of the present invention, each communication station selects the channel which many more communication stations can receive as the beacon sending channel based on the interference information of each channel of the local station and peripheral stations. Subsequently, each communication station informs the other communication stations in the vicinity (i.e., within a communication range) of its own existence by informing them of beacon information over the most frequent channel, and also informs the other communication stations in the vicinity (i.e., within a communication range) of its own existence, and also informs them of the network configuration thereof by informing them of the network configuration thereof. A beacon transmission cycle is defined as "transmission frame (T_SF)", for example, 40 msec is employed here. A beacon sending channel is set by the channel setting unit 108.

Also, with the second embodiment of the present invention, each communication station determines the beacon sending channel based on the communication quality of the local station, informs the other communication stations in the vicinity (i.e., within a communication range) of its own existence, and also informs them of the network configuration thereof by informing them of beacon information.

A communication station newly appears in the communication range of a certain communication station detects to enter the communication range by receiving a beacon signal, and also acknowledges the network configuration thereof by interpreting information described in the received beacon. Subsequently, the communication station sets the beacon sending timing of the local station at the timing wherein a beacon is not transmitted from any peripheral station while gradually synchronizing with the receiving timing of a beacon.

Description will be made regarding the beacon sending procedures of each communication station according to the present embodiment with reference to FIG. 3. However, first, description will be made regarding a case wherein the beacon of each communication station is disposed over a single channel, here.

If we say that information to be transmitted with a beacon is 100 bytes, a period necessary for transmission becomes 18 μsec. This is one transmission per 40 msec, so the medium occupation ratio of a beacon for each communication station is one 2222th, which is sufficiently small.

Each communication station gradually synchronizes while hearing a beacon transmitted from a peripheral station. In the event that a communication station newly appears, the new communication station sets the beacon sending timing of the local station so as not to collide with the beacon sending timing of an existing communication station.

In the event that there is no peripheral communication station, a communication station 01 can start to transmit a beacon at appropriate timing. The transmission interval of a beacon is 40 msec (described above). With the example shown in the top of FIG. 3, B01 represents a beacon transmitted from the communication station 01.

Hereinafter, a communication station, which will newly participate in a communication range, sets the beacon sending timing of the local station so as not to collide with an existing beacon placement.

Figure 3:
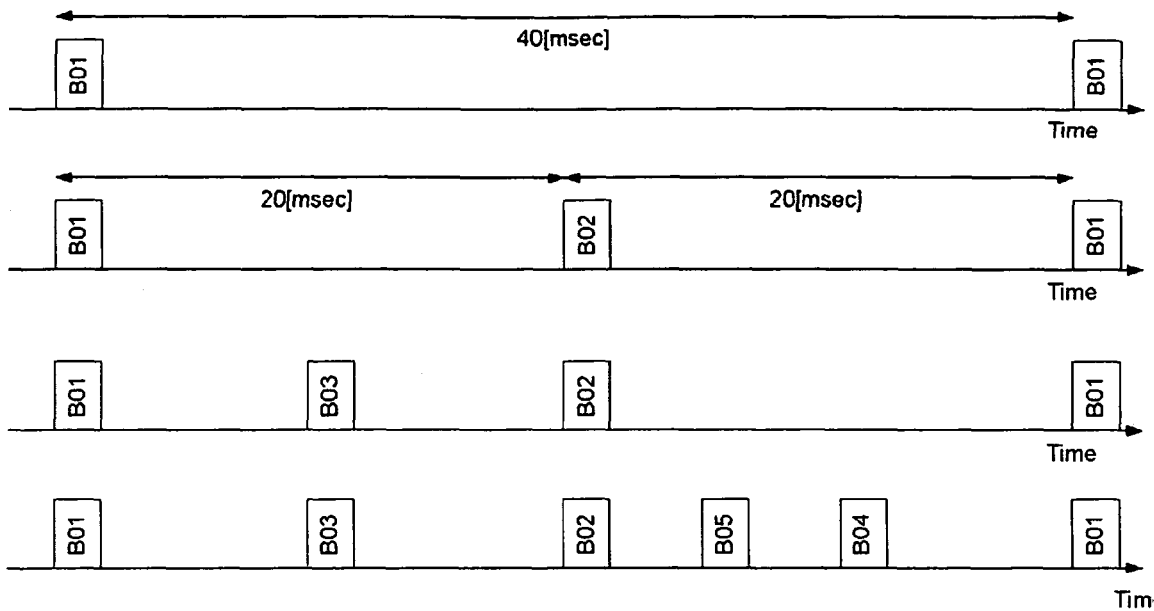
FIG. 3 is a diagram for describing the beacon transmission sequence of each communication station according to the present embodiment.

For example, as illustrated in the top of FIG. 3, let us say that a new communication station 02 appears over a channel wherein only the communication station 01 exists. At this time, the communication station 02 acknowledges the existence and beacon's position thereof by receiving a beacon from the communication station 01, as illustrated in the second row of FIG. 3, sets the beacon sending timing of the local station generally at the center of the beacon interval of the communication station 01, and starts transmission of a beacon.

Further, let us say that a new communication station 03 appears. At this time, the communication station 03 receives at least one of the beacons transmitted from the communication station 01 and the communication station 02 respectively, and acknowledges the existences of these existing communication stations. Subsequently, as illustrated in the third row of FIG. 3, the communication station 03 starts transmission generally at the midmost timing of the interval of the beacons transmitted from the communication station 01 and the communication station 02.

Hereinafter, each time a communication station newly participates in accordance with the same algorism, the beacon interval narrows. For example, as illustrated in the bottom of FIG. 3, the communication station 04, which will appear next, sets the beacon sending timing generally at the midmost timing of the beacon interval set by the communication station 02 and the communication station 01 respectively, and the communication station 05, which will appear further subsequently, sets the beacon sending timing generally at the midmost timing of the beacon interval set by the communication station 02 and the communication station 04 respectively.

However, a minimal beacon interval $B_{min}$ is stipulated beforehand such that the inside of a band (transmission frame cycle) is not flowed with beacons, and two or more beacon sending timings are not allowed to be disposed within the $B_{min}$. For example, in the event that the minimal beacon interval $B_{min}$ with a transmission frame cycle of 40 msec is stipulated with 2.5 msec, the number of communication stations, which can be accommodated within a range where a radio wave reaches, becomes 16 at the maximum.

Here, each communication station acquires a preferential utility region (TPP) immediately after transmission of a beacon (described later), so when disposing a new beacon within a transmission frame, a case wherein the beacon sending timing of each communication station is evenly dispersed within the transmission frame cycle is more preferable from the perspective of transmission efficiency than a case wherein the beacon sending timing of each communication station is clustered together over a single channel. Accordingly, with the present embodiment, as illustrated in FIG. 3, an arrangement is made wherein transmission is basically started generally at the midmost of the longest time zone of the beacon interval in a range which the local station can hear. However, another utility method is available wherein the beacon sending timing of each communication station is disposed so as to be clustered together, and receiving operation is stopped during the remaining transmission frame cycle so as to reduce power consumption of the apparatus.

Figure 4:
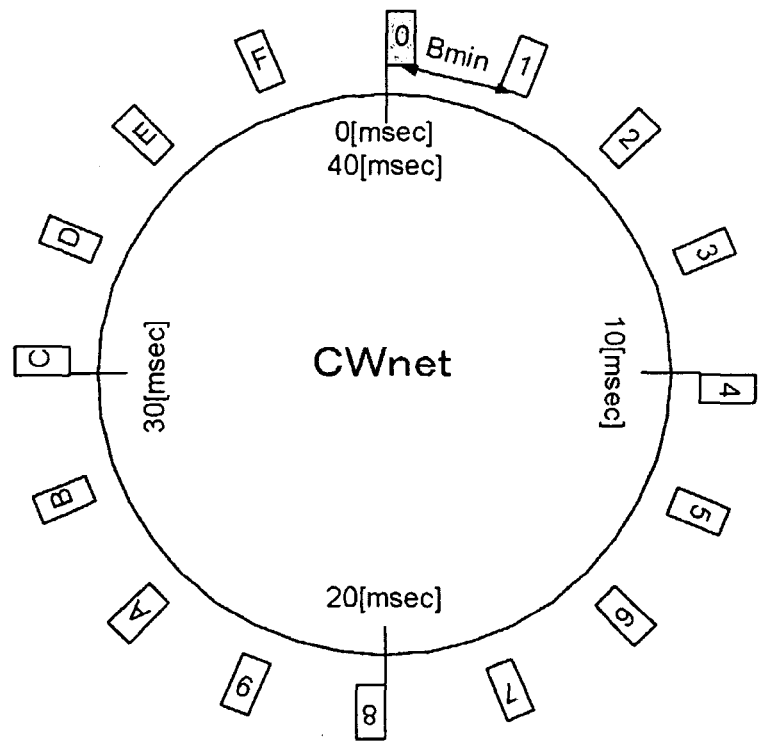
FIG. 4 is a diagram illustrating an example of beacon sending timing over one channel.

FIG. 4 illustrates an example of beacon sending timing within a transmission frame over one channel. However, with the example shown in the drawing, time elapse in a transmission frame cycle made up of 40 msec is represented like a clock of which the hour hand is moving clockwise over the circular ring thereof. A position within a transmission frame where beacon sending timing can be disposed is referred to as a "slot". Each communication station performs transmission at the point-in-time having some intentional time offset (TBTT offset) from TBTT (Target Beacon Transmission Time) serving as the beacon sending timing of the local station.

With the example illustrated in FIG. 4, a total of 16 communication stations from the communication station 0 through the communication station F are configured as the nodes of the network. As described with reference to FIG. 3, let us say that beacon allocations were performed in accordance with an algorism wherein the beacon sending timing of a new participating station is sequentially set at the midmost timing of the beacon interval set by the existing communication stations. In the event that the $B_{min}$ is stipulated with 5 msec, only 16 beacons per single transmission frame can be disposed at the maximum. In other words, communication stations more than 16 stations cannot be participate in the network.

Figure 5:
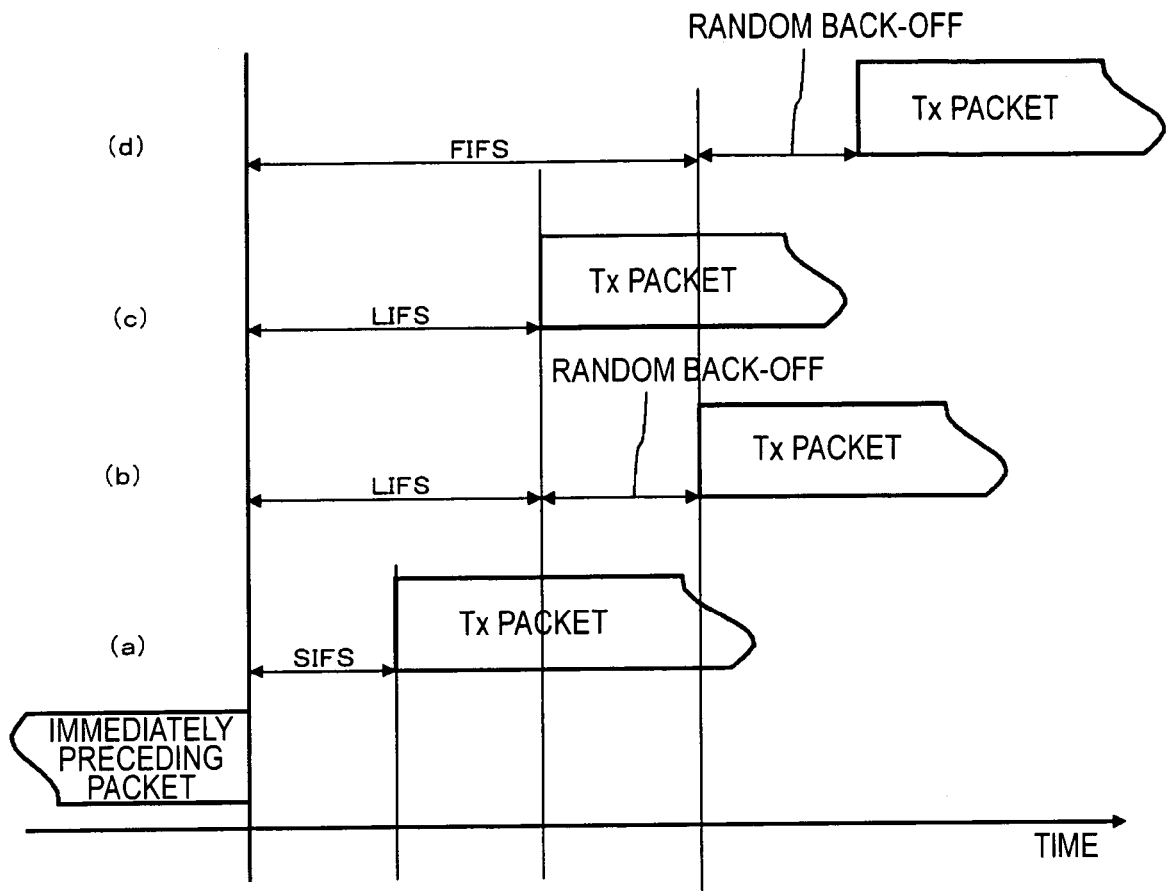
FIG. 5 is a diagram for describing the definition of inter-frame space.

With the present embodiment, multiple inter-frame spaces are defined, as with the case of the IEEE802.11 method. As shown in FIG. 5, a Short Inter Frame Space (SIFS) and a Long Inter Frame Space (LIFS) are defined as inter-frame spaces.

When transmitting a normal packet in accordance with the (CSMA) procedures, as shown in FIG. 5(*b*), following some packet transmission ending, first the status of a medium is monitored only for the LIFS, during this period in the event that the medium is clear, i.e., there is no transmission signal, random back-off is performed, and further even during this period in the event that there is no transmission signal, a transmission right is provided. As for a method for calculating a random back-off value, a method known as existing technology is applied, such as using pseudo-random sequence, or the like.

Conversely, when transmitting a high preferential or emergency packet, transmission following the inter-frame space of the SIFS shorter than the LIFS is allowed. That is to say, as shown in FIG. 5(*a*), the status of a medium is monitored only for the SIFS, during this period in the event that the medium is clear, i.e., there is no transmission signal, a transmission right is provided. Thus, a high emergency packet can be transmitted prior to a packet to be transmitted in accordance with the normal (CSMA) procedures (i.e., transmission is performed following awaiting only for the LIFS+random back-off).

For example, a communication station during a preferential sending period (TPP) can assure a right for transmitting a packet preferentially by starting transmission following the SIFS inter-frame space. Also, as for each packet of the (CTS), data, and (ACK), which are transmitted following the (RTS) in accordance with the (RTS/CTS) method, a series of communication procedures can be executed without disturbance of neighboring stations by performing transmission using the SIFS inter-frame space in the same way.

In other words, priority assignment regarding packet sending right competition is performed according to the length of an inter-frame space by defining different types of inter-frame space.

Further, with the present embodiment, in addition to "SIFS" and "LIFS+back-off", which are the above inter-frame spaces, as shown in FIGS. 5(*c*) and 5(*d*), "LIFS" and "FIFS+back-off" (FIFS: Far Inter Frame Space) are defined. Normally, the inter-frame spaces of "SIFS" and "LIFS+back-off" are applied. On the other hand, with a time zone of which the transmission preferential right is given to a certain communication station, the other communication stations use the "FIFS+back-off" inter-frame space, and the station having the preferential right uses the SIFS or LIFS inter-frame space.

Figure 6:
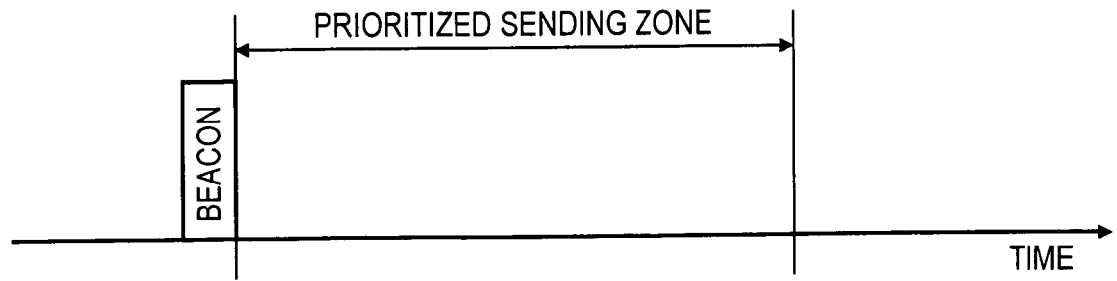
FIG. 6 is a diagram illustrating a situation wherein a priority right is provided to a beacon sending station.

Each communication station transmits a beacon at a constant interval, but acquires the preferential sending period (TPP) which allows the station which transmitted a beacon to perform transmission preferentially for a while following the beacon being transmitted. FIG. 6 illustrates a situation wherein a preferential right is provided to a beacon sending station. With the present specification, this preferential interval is defined as a Transmission Prioritized Period (TPP). During the TPP, the communication stations can assure a right for transmitting a packet preferentially by starting transmission following the SIFS inter-frame space.

Also, an interval other than the TPP is defined as a Fairly Access Period (FAP), and each communication station performs communication using the normal (CSMA/CA) method. That is to say, all the communication stations including a beacon sending station of which the TPP is expired can start transmission after awaiting only for the LIFS+random back-off, so in other words, a transmission right is evenly provided by random back-off.

Figure 7:
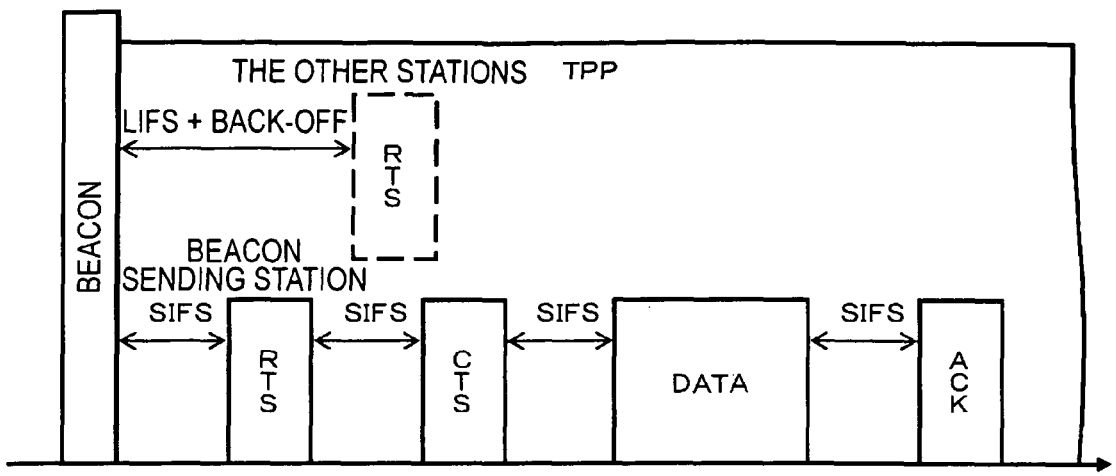
FIG. 7 is a diagram for describing operation for a beacon sending station and the other stations within a TPP interval obtaining a transmission right.

FIG. 7 illustrates operation for a beacon sending station during the TPP interval and the other stations obtaining a transmission right.

The beacon sending station, following transmitting the beacon of the local station, can start transmission following the shorter packet interval SIFS. With the example shown in the drawing, the beacon sending station transmits the (RTS) packet following the SIFS. Subsequently, as for each packet of the (CTS), data, and (ACK) which are transmitted thereafter, the beacon sending station can also execute a series of communication procedures without disturbance of neighbor stations by performing transmission using the SIFS inter-frame space in the same way.

On the other hand, the other stations, following a beacon being transmitted, first monitor the status of a medium for the LIFS, during this period in the event that the medium is clear, i.e., there is no transmission signal, perform random back-off, and further even during this period in the event that there is no transmission signal, a transmission right is provided. Accordingly, upon the beacon sending station transmitting the RTS signal following elapse of the SIFS in advance, the medium becomes unclear, and consequently, the other stations cannot start transmission.

Figure 8:
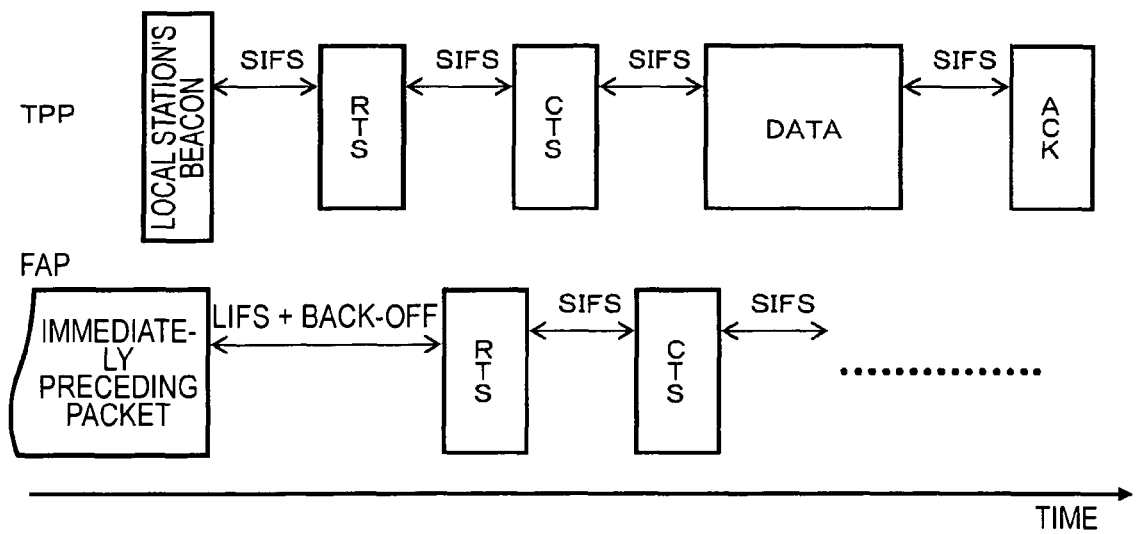
FIG. 8 is a diagram for describing operation for a communication station starting transmission in the TPP interval and an FAP interval respectively.

FIG. 8 illustrates operation for a communication station starting transmission during the TPP interval and the FAP interval respectively.

During the TPP interval, following the beacon of the local station being transmitted, the communication station can start transmission following the shorter packet interval SIFS. With the example shown in the drawing, the beacon sending station transmits the RTS packet following the SIFS. Subsequently, as for each packet of the (CTS), data, and (ACK) which are transmitted thereafter, the beacon sending station can also execute a series of communication procedures without disturbance of neighbor stations by performing transmission using the SIFS inter-frame space in the same way.

Conversely, during the FAP interval, the communication station starts transmission after awaiting only for the LIFS +random back-off, as with the other peripheral stations. In other words, a transmission right is evenly provided by random back-off. With the example shown in the drawing, following the beacon of one of the other stations being transmitted, the communication station first monitors the status of a medium only for the LIFS, during this period in the event that the medium is clear, i.e., there is no transmission signal, performs random back-off, and further even during this period in the event that there is no transmission signal, transmits the RTS packet. Note that with a series of packets such as the (CTS), data, (ACK), and the like, which are transmitted due to the (RTS) signal, as well, a series of communication procedures can be executed without disturbance of neighboring stations by performing transmission using the SIFS inter-frame space.

Figure 9:
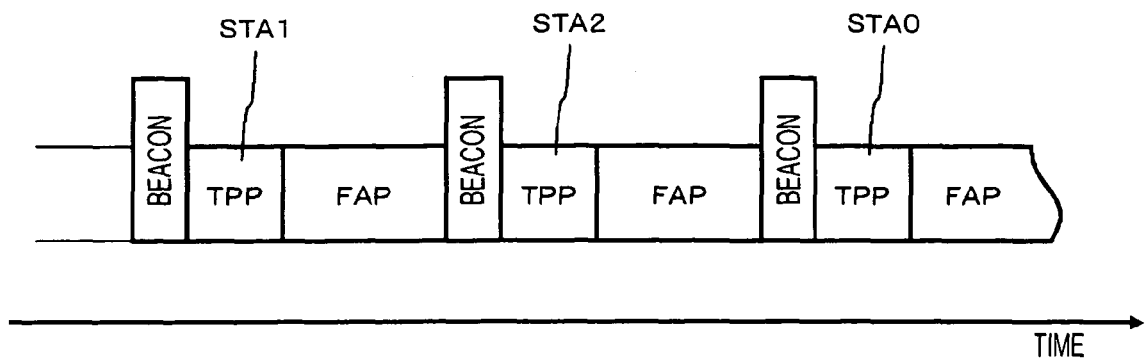
FIG. 9 is a diagram illustrating the configuration of transmission frame cycles.

FIG. 9 illustrates the configuration of a transmission frame cycle (T_SF). As shown in the drawing, following transmission of a beacon from each communication station, the TPP is assigned as to the communication station which transmitted a beacon the last time, and only the relevant station can obtain a transmission right preferentially using the SIFS, short inter-frame space.

Upon the TPP interval elapsing, the FAP interval starts, and each communication station performs communication using the normal (CSMA/CA) method. In other words, all the communication stations start transmission following awaiting only for the LIFS+random back-off, so are given a transmission right evenly. The FAP is ended by the next communication station, regarding which the beacon transmission timing is adjacent, transmitting a beacon. Subsequently, following the beacon sending station being given the TPP in the same way, the FAP interval starts, and such a sequence is repeated.

Beacon are basically transmitted for establishing a network, but in the event of transmitting this for the purpose of indicating the start reference of the transmission prioritized period TPP, not all of the later-described information (see FIG. 11) needs to be described. That is to say, in some cases, a beacon includes only information regarding acquisition of the TPP, with an extreme example, a beacon can be configured of one bit (or several bits or so) information representing that the present signal is transmitted following acquiring the TPP.

Also, with an autonomous decentralized communication system, an arrangement can be realized wherein a communication station can acquire the transmission prioritized period TPP without using a beacon. With a system for acquiring the transmission prioritized period TPP without using a beacon, the same network operation (collision avoidance operation) as the above communication system using a beacon can be realized by a communication station describing that transmission is performed using the transmission prioritized period TPP in a part of a signal to be transmitted following acquiring the transmission prioritized period TPP. Thus, each communication station can realize a gradual time-sharing multiplexing access while informing sending/receiving timing within a mutual super frame based on notification of a beacon signal, a part description of a signal such as a data frame or the like, and performing random access as to a medium in an autonomous decentralized manner using the (CSMA) procedures.

Note that FIG. 9 illustrates an example wherein the TPP starts immediately following a beacon sending station transmitting a beacon, but the present invention is not restricted to this, for example, the start time of the TPP may be set with a relative position (point-in-time) from the transmission time of a beacon.

Now, regarding an inter-frame space over one channel is summarized as follows. As for transmission of a beacon and packets of the local station within the TPP, each communication station is given a high priority by transmission using the SIFS interval being allowed. That is to say, each time the communication station transmits a beacon, the communication station can start transmission using a short inter-frame space, so can obtain an opportunity for transmitting data preferentially.

On the other hand, with the FAP other than that, transmission using the LIFS+back-off interval is allowed.

Also, the communication station can obtain a transmission right preferentially during the TPP of the local station, but this means that a medium is occupied during this interval. That is to say, even during the TPP of the local station, one of the other communication stations is allowed to start transmission awaiting for the LIFS+back-off interval. For example, even if the communication station acquired the TPP by transmitting a beacon, in the event that the local station has nothing to be transmitted, and also in the event that the local station does not know that one of the other stations holds information to be transmitted to the local station, the local station does not start communication operation using the SIFS inter-frame space. As a result, the beacon sending station results in abandoning the TPP of the local station. In this case, one of the other communication stations which acquired no TPP can start transmission even during this time zone following the LIFS+ back-off or the FIFS+back-off elapsing.

Figure 10:
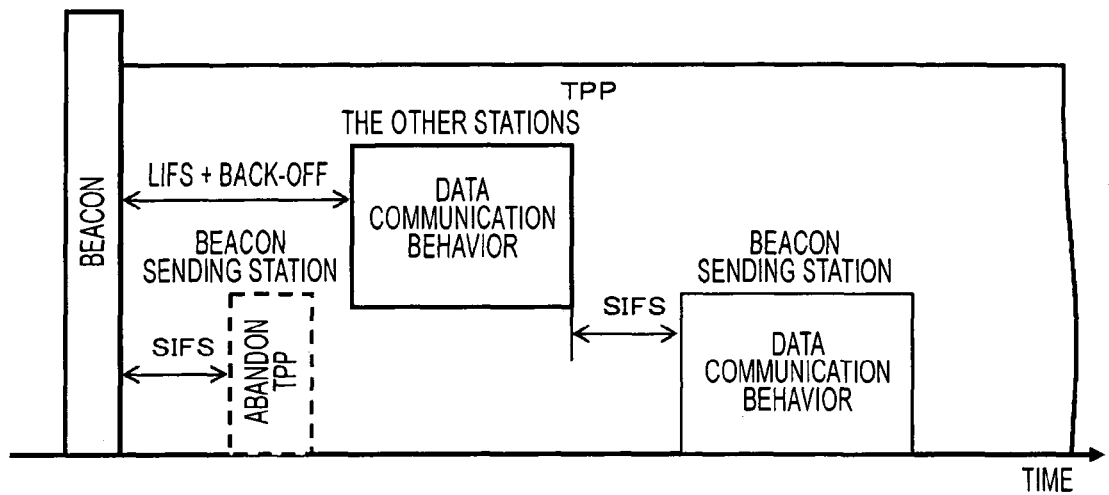
FIG. 10 is a diagram illustrating operation when a beacon sending station abandoning the TPP.

FIG. 10 illustrates operation when the beacon sending station abandons the TPP. In the event that the beacon sending station does not start transmission using the SIFS interval due to TPP abandon, one of the other stations can start transmission of a packet using the LIFS+back-off. In this case, one of the other communication stations, which was not provided the TPP, can start transmission even during this time zone following the LIFS+back-off or the FIFS+back-off elapsing. Also, even in the event of abandoning the TPP, the beacon sending station, of course, can start transmission preferentially using further the SIFS interval during the TPP interval of the local station following one of the other stations completing transmission operation.

Further, as for packet transmission during the TPP of one the other stations, let us say that transmission using the FIFS+ back-off interval is employed, which is given a low priority. With the IEEE802.11 method, the FIFS+back-off is always employed as an inter-frame space, but according to the configuration of the present embodiment, this interval can be narrowed, thereby providing more effective packet transmission.

The above description has been made wherein a preferential transmission right can be provided to only the communication station using the TPP, but let us say that a preferential transmission right is also provided to a called communication station by the communication station using the TPP. Basically, though transmission is prioritized during the TPP, in the event that the local station has nothing to be transmitted, but in the event of knowing that one of the other stations holds information to be transmitted to the local station, a Paging message or a Polling message may be addressed to one of the "other stations" thereof.

Inversely, though a beacon was transmitted, in the event that the local station has nothing to be transmitted, and also in the event of not knowing that one of the other stations holds information to be transmitted to the local station, such a communication station does not perform communication operation, abandons the transmission preferential right provided by the TPP, and transmits nothing. In this case, one of the other communication stations starts transmission in accordance with the normal CSMA procedures regardless of the TPP time zone following a predetermined inter-frame space and back-off elapsing.

As shown in FIG. 9, when considering a configuration wherein the TPP continues immediately after transmitting a beacon, a case wherein the beacon sending timing of each communication station is evenly dispersed is more preferable than a case wherein the beacon sending timing of each communication station is clustered together from the perspective of transmission efficiency. Accordingly, with the present embodiment, an arrangement is made wherein transmission is basically started generally at the midmost of the longest time zone of the beacon interval in a range which the local station can hear. However, another utility method is available wherein the beacon sending timing of each communication station is disposed so as to be clustered together, and receiving operation is stopped during the remaining transmission frame cycle so as to reduce power consumption of the apparatus.

Also, with the present embodiment, comings and goings of traffics are managed in an autonomous decentralized manner by giving a preferential communication right to the beacon sending station (described above), but under a multi-channel environment, the beacon sending station does not always acquire the TPP over the beacon sending channel. That is to say, the beacon sending station may change the channel which can be utilized preferentially to the channel most appropriate for traffic transmission other than the beacon sending channel according to the interference situation on the reception side.

Figure 11:
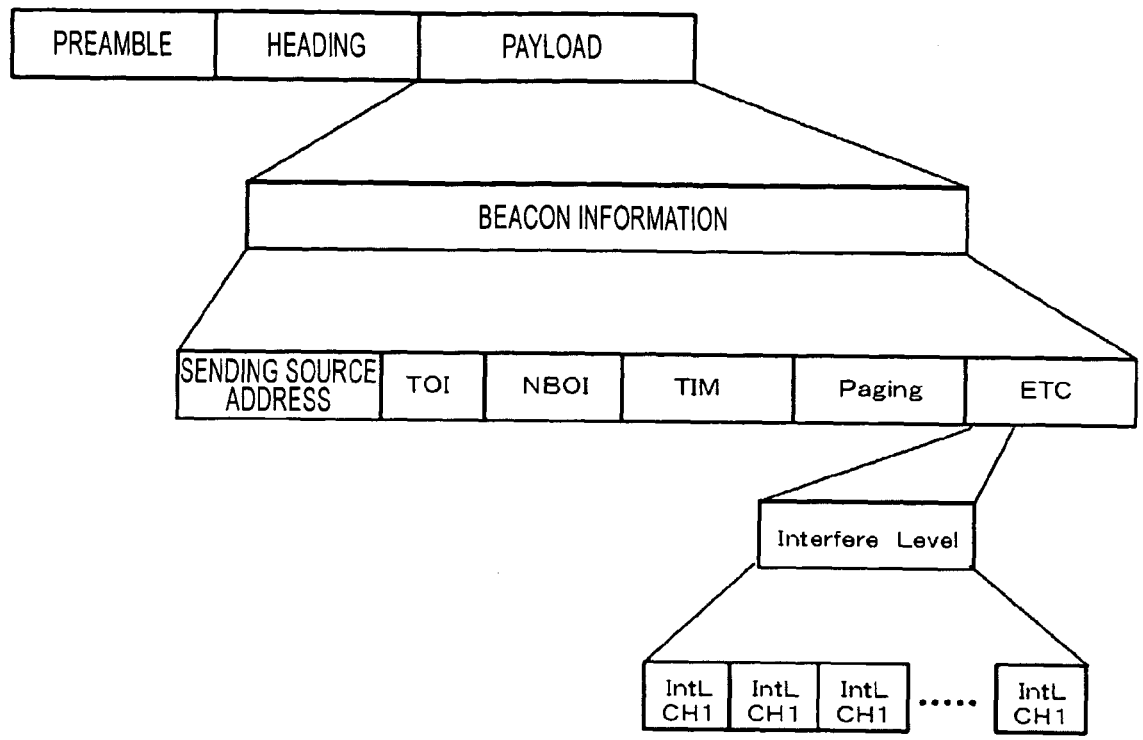
FIG. 11 is a diagram illustrating a configuration example of a beacon signal format.

FIG. 11 illustrates a configuration example of a beacon signal format. As shown in the drawing, with a beacon signal, following a preamble for informing the other communication stations of the existence of the relevant signal, heading, and payload section PSDU continues. With the heading region, information indicating that this packet is a beacon is described. Also, the following information, which is desired to be informed using a beacon, is described within the PSDU.

TX. ADDR: the MAC address of a sending station (TX)
TOIS: TBTT offset indicator (TBTT Offset Indication Sequence)
NBOI: the offset information of a neighboring beacon (Neighbor Beacon Offset Information)
TIM: Traffic Indication Map
PAGE: Paging The TOIS field stores information for determining the TBTT offset (described above) (e.g., pseudo-random sequence), and indicates regarding how much offset the relevant beacon has as to the beacon sending timing TBTT for transmission. By providing the TBTT offset, even in the event that two communication stations dispose the beacon sending timing thereof on the same slot over a transmission frame, actual beacon sending time can be shifted, so even if beacons collide at a certain transmission frame cycle, each communication station can here a mutual beacon at another transmission frame cycle each other (or neighboring communication stations hear both beacons), i.e., can acknowledges a collision.

The term "TIM" means notification information regarding which communication station this communication station currently has information addressed to, and a receiving station can acknowledge that the local station needs to perform reception by referring to the TIM field. Also, the Paging is a field for indicating that of receiving stations described on the TIM, transmission is scheduled at the TPP immediately after this beacon, and the station specified by this field needs to prepare for reception at the TPP.

A field other than the above fields (ETC field) is prepared in a beacon. The ETC field may include a field for describing a degree receiving interference at each prepared frequency channel, i.e., an interference level (IntLCH).

Also, the communication stations may specify the communication station serving as a data sending destination and the beacon sending channel thereof using the ETC field (or provide a PSDU dedicated field) at the time of attempting to perform data transmission based on the (RTS/CTS) procedures from now. Communication quality can be maintained by the (RTS/CTS) procedures at the time of performing random access based on the (CSMA/CA), but description will be made later regarding this point.

The NBOI field is information which describes the beacon position (receiving time) of a neighboring station which the local station can receive within a transmission frame. With the present embodiment, as shown in FIG. 4, slots which can dispose 16 beacons at the maximum are prepared within one transmission frame, so information regarding the placement of a received beacon is described with a 16-bit length bit map format. That is to say, the beacon sending timing TBTT of the local station is mapped in the headmost bit (MSB) of the NBOI field, and also the other respective slots are mapped in bit positions corresponding to relative positions (offset) on the basis of the TBTT of the local station. Subsequently, let us say that 1 is written in the bit position assigned to each slot of the sending beacon of the local station and beacons which can be received, and the bit positions other than this remain in zero.

Figure 12:
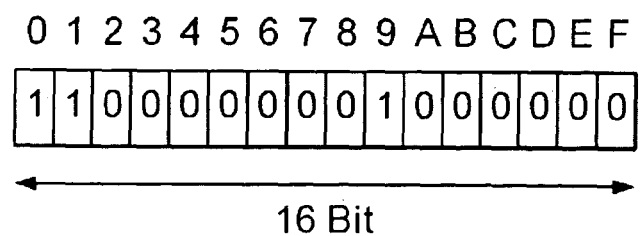
FIG. 12 is a diagram illustrating a description example of an NBOI.

FIG. 12 illustrates a description example of the NBOI in a case wherein the number of utility channels is one. With the example shown in the drawing, the communication station 0 creates the NBOI field such as "1100, 0000, 0100, 0000". This results in notifying that the communication station 0 shown in FIG. 3 "can receive a beacon from the communication station 1 and the communication station 9" under a communication environment such that the communication stations 0 through F set the TBTT at each slot which can accommodate 16 stations at the maximum as shown in FIG. 4. That is to say, regarding each bit of the NBOI corresponding to the relative position of a received beacon, a mark is assigned thereto in the event that the beacon can be received, and a space is assigned thereto in the event that the beacon is not received. Also, the reason why the MSB is 1 is because the local station transmits a beacon, and in addition to this, the place corresponding to the time when the local station transmits a beacon is also marked.

Upon each communication station receiving a mutual beacon signal over a certain channel, each communication station can dispose the beacon sending timing while avoiding a beacon collision over the channel, or detect the beacon receiving timing from a peripheral station, based on the description of the NBOI included therein.

Figure 13:
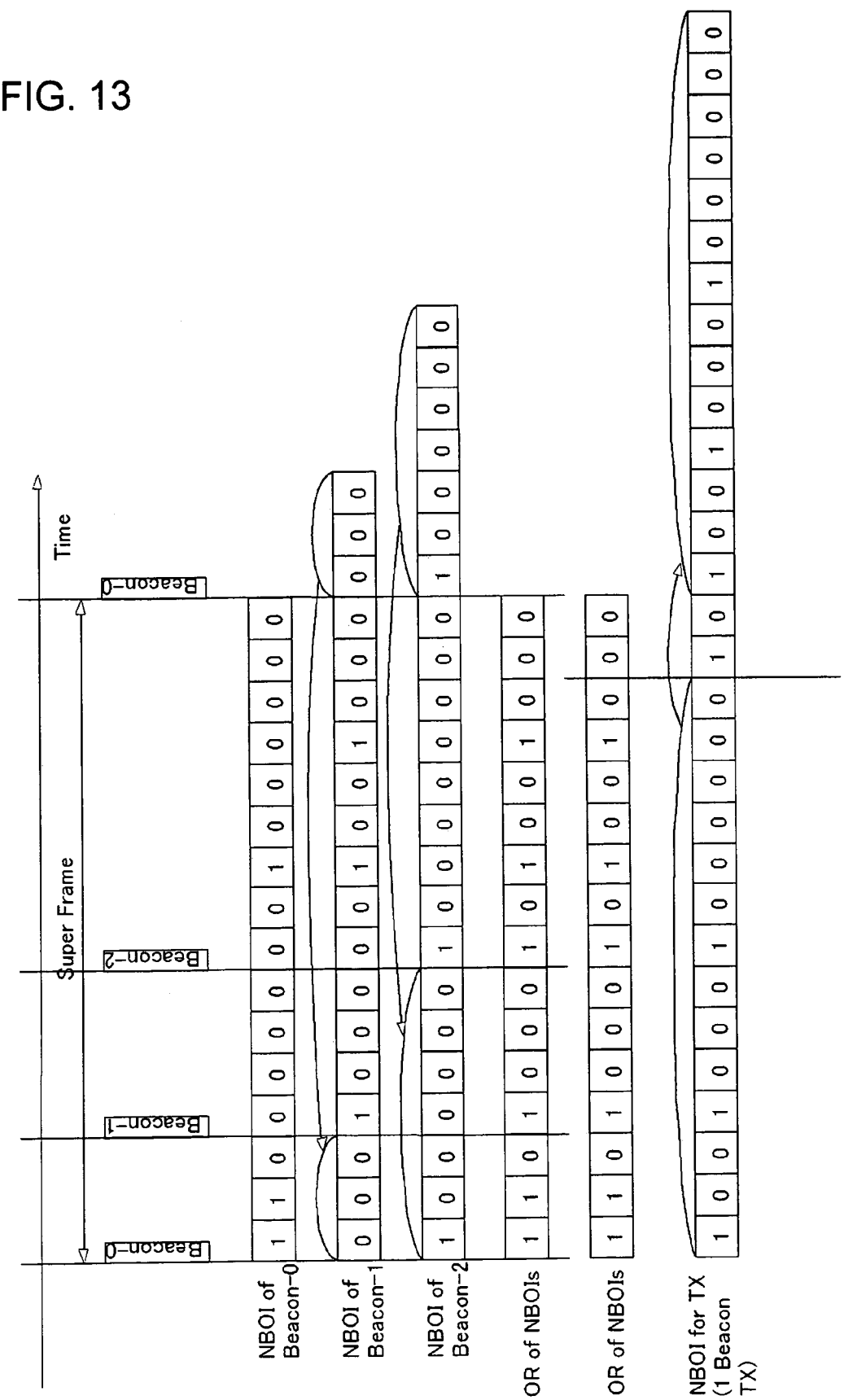
FIG. 13 is a diagram illustrating a situation wherein a communication station, which newly participates in a network, sets the TBTT of the local station based on the NBOI of each beacon obtained from the beacons received from peripheral stations.

FIG. 13 illustrates a situation wherein a new participating communication station sets the TBTT of the local station based on the NBOI of each beacon obtained from the beacons received from peripheral stations.

Following power-on, the communication station first attempt to perform scan operation, i.e., signal reception continuously across the transmission frame length or more to confirm existence of a beacon transmitted from a peripheral station. At this process, in the event of receiving no beacon from a peripheral station, the communication station sets appropriate timing as the TBTT. On the other hand, in the event of receiving a beacon transmitted from a peripheral station, the communication station extracts beacon sending timing from timing equivalent to the bit positions not marked conclusively by calculating the logical OR operation while shifting the NBOI field of each beacon received from peripheral stations according to the reception time of the relevant beacon, and referring to the result.

The example shown in FIG. 13 focuses on a communication station A which newly appears, and assumes a communication environment wherein a communication station 0, communication station 1, communication station 2 exist around the communication station A. Further, let us say that the communication station A can receive a beacon from these three stations 0 through 2 within a transmission frame by scan operation.

The NBOI field is described with a bitmap format wherein the beacon receiving time of a peripheral station is mapped in a relative position as to the beacon of the local station (described above). Accordingly, the communication station A shifts the NBOI fields of three beacons which could be received from peripheral stations to align the corresponding position of each bit on the time axis, following which calculates the logical OR operation of the NBOI bit of each timing, and refers to the result.

As a result of integrating the NBOI fields of the peripheral stations and referring to this, the obtained sequence is "1101, 0001, 0100, 1000" shown in "OR of NBOIs" in FIG. 9, wherein 1 represents the relative position of the timing of which the TBTT has been already set within one transmission frame, and 0 represents the relative position of the timing of which the TBTT has not been set. With this sequence, the longest run length of spaces (zeroes) is 3, and two candidates exist. With the example shown in FIG. 13, the communication station A determines, of these, the 15th bit as the TBTT of the local station beacon.

The communication station A sets the time of the 15th bit as the TBTT of the normal beacon of the local station (i.e., the head of the transmission frame of the local station), starts transmission of a beacon. At this time, with the NBOI field transmitted by the communication station A, each beacon reception time of the communication stations 0 through 2 which can receive a beacon is described with a bitmap format wherein the bit position equivalent to the relative position from the transmission time of the normal beacon of the local station is marked, as shown in "NBOI for TX (1 Beacon TX)" in FIG. 13.

The present invention relates to a multi-channel autonomous decentralized network, the NBOI information which describes the available beacon position regarding each frequency channel is necessary, but description will be made later regarding this point.

Figure 14:
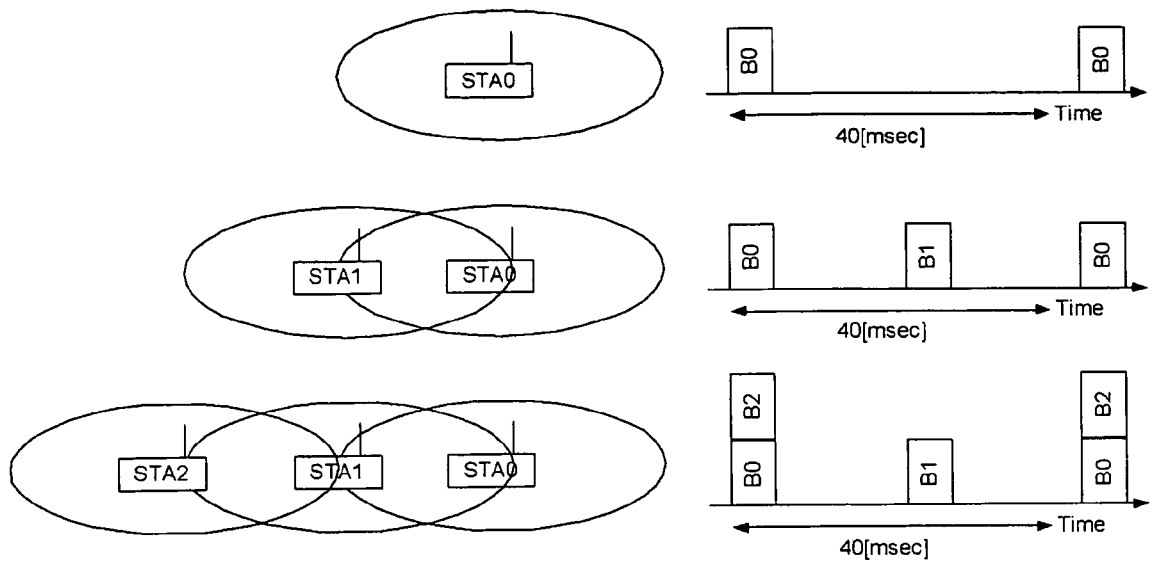
FIG. 14 is a diagram illustrating a situation wherein a new participating station disposes the beacon sending timing of the local station over a certain frequency channel while avoiding collision with existing beacons based on the NBOI descriptions of the existing beacons.

FIG. 14 illustrates a situation wherein a new participating station disposes the own beacon sending timing while avoiding a collision with an existing beacon over a certain frequency channel based on the description of the NBOI. Each row in the drawing represents a participating status of communication stations STA0 through STA2. The placement status of each communication station is illustrated on the left side of each row, the placement of a beacon transmitted from each station is illustrated on the right side thereof.

The top row in FIG. 14 illustrates a case wherein only the communication station STA0 exists. At this time, the STA0 attempts to perform beacon reception, but cannot receive a beacon, so can set appropriate beacon sending timing to start transmission of a beacon in response to the coming of this timing. A beacon is transmitted every 40 msec (transmission frame). At this time, all of the bits of the NBOI field described in a beacon transmitted from the STA0 are zero.

The middle row in FIG. 14 illustrates a situation wherein the STA1 participates in the communication range of the communication station STA0. Upon the STA1 attempting beacon reception, the STA1 receives the beacon of the STA0. Further, the NBOI field of the beacon of the STA0 is all zero except for the bits indicating the sending timing of the local station, and accordingly, the STA1 sets the own beacon sending timing generally at the midmost of the beacon interval of the STA0 in accordance with the above processing procedures.

With the NBOI field of a beacon transmitted by the STA1, the bit indicating the transmission timing of the local station and the bit indicating the beacon receiving timing from the STA0 are set to 1, and the bits other than those are all zeroes. Also, upon the STA0 acknowledging the beacon from the STA1, the STA0 also sets the corresponding bit position of the NBOI field to 1.

The bottom row in FIG. 14 illustrates a situation wherein further thereafter, the STA2 participates in the communication range of the communication station STA1. With the example shown in the drawing, the STA0 becomes a hidden terminal from the perspective of the STA2. Accordingly, the STA2 cannot acknowledge that the STA1 is receiving a beacon from the STA0, as illustrated on the right side, there is the possibility that the STA1 transmits a beacon at the same timing as the STA0, which causes a collision.

The NBOI field is used for avoiding this phenomenon. First, with the NBOI field of the beacon of the STA1, in addition to the bit indicating the sending timing of the local station, the bit indicating the sending timing of the beacon of the STA0 is also set to 1. The STA2 cannot directly receive the beacon transmitted by the STA0 serving as a hidden terminal, but acknowledges the beacon sending timing of the STA0 based on the beacon received from the STA1, and avoids beacon transmission at this timing.

Figure 15:
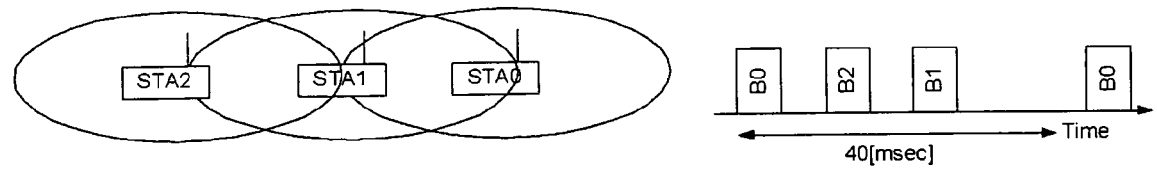
FIG. 15 is a diagram illustrating a situation wherein a new participating station disposes the beacon sending timing of the local station while avoiding the beacon sending timing of a hidden terminal based on the received beacon information.

Subsequently, as shown in FIG. 15, at this time, the STA2 determines the beacon sending timing generally at the midmost of the beacon interval of the STA0 and STA1. It is needless to say that with the NBOI within the sending beacon of the STA2, the bits indicating the beacon sending timing of the STA2 and STA1 are set to 1. According to the beacon collision avoidance function based on such description of the NBOI field, a hidden terminal, i.e., the beacon position of a two-stops-ahead adjacent station can be comprehended, and consequently, collision of beacons can be avoided.

C. Access Operation Under a Multi-Channel Environment

As described above, with an autonomous decentralized wireless communication system, each communication station can acknowledge a network configuration over one channel by informing the other communication stations of beacon information within a transmission frame cycle, and also performing scan operation of the beacon signal from the other stations.

Figure 16:
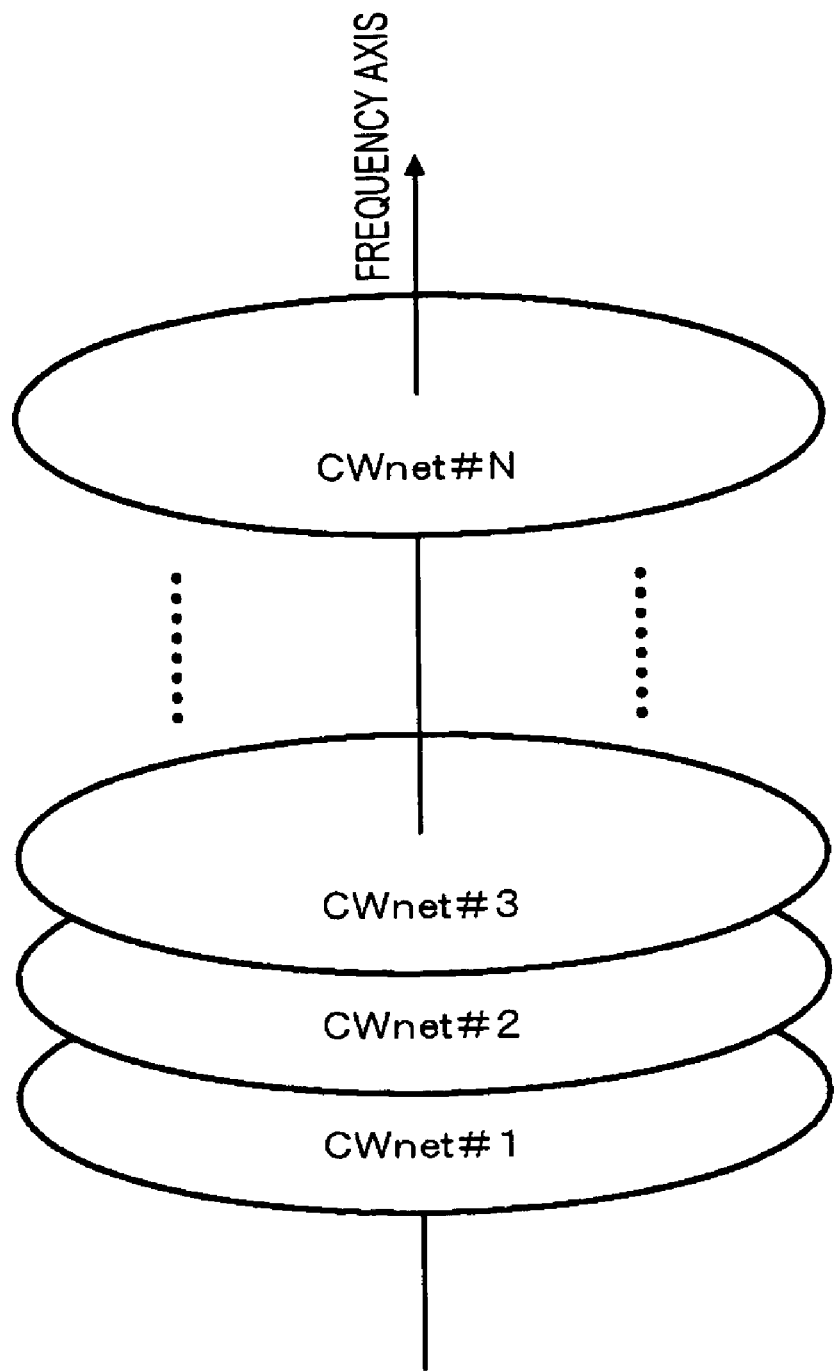
FIG. 16 is a diagram schematically illustrating a transmission frame configuration of an autonomous decentralized multi-channel wireless communication system.

However, in the case of an autonomous decentralized network according to the present invention, a configuration is made wherein transmission frames such as shown in FIG. 4 are disposed only for the amount of the number of utility channels (see FIG. 16). Also, the present invention assumes that each communication station includes a single antenna, so cannot perform transmission and reception simultaneously, and also cannot handle multiple frequency channels at the same time (described above). Accordingly, the communication station cannot receive a beacon at the beacon sending timing of one of the other communication stations unless a transition to the same channel is not performed, and consequently, it is difficult to comprehend network configurations over all of the channels.

Also, even if the communication station is most appropriate channel for the local station, that channel may be the channel which provides interference to one of the other stations serving as an other communication party. For example, in the event that the beacon sending channel of one station is the channel which cannot be used in the other station due to a interference channel or deterioration of communication quality, even if these communication stations can communicate with each other over another channel, these communication stations get trapped in a deadlock state in which they cannot acknowledge one another's existence eternally.

To this end, with the first embodiment of the present invention, an arrangement is made wherein the level information of interference which the local station receives is described in a beacon signal which is periodically transmitted by each communication station, and transmitted, and a communication channel is determined following comprehending interference situations based on the received beacon information from peripheral stations. For example, communication channels can be controlled in an autonomous decentralized manner by avoiding that the channel which terribly provides interference to the peripheral stations is utilized as a communication channel.

Also, with the second embodiment of the present invention, each communication station selects the channel having communication quality most appropriate for the local station as the beacon sending channel, but on the other hand, when transmitting data, each communication station performs data transmission using the channel having excellent communication quality appropriate for reception in the communication station serving as a data sending destination, regardless of the beacon sending channel of the local station.

D. First Embodiment

With a multi-channel communication system according to the first embodiment of the present invention, the level information of interference which the local station receives is described in a beacon signal which is periodically transmitted by each communication station, and transmitted, and a communication channel is determined following comprehending interference situations based on the received beacon information from peripheral stations. Thus, communication channels can be controlled in an autonomous decentralized manner by avoiding that the channel which terribly provides interference to the peripheral stations is utilized as a communication channel.

Figure 17:
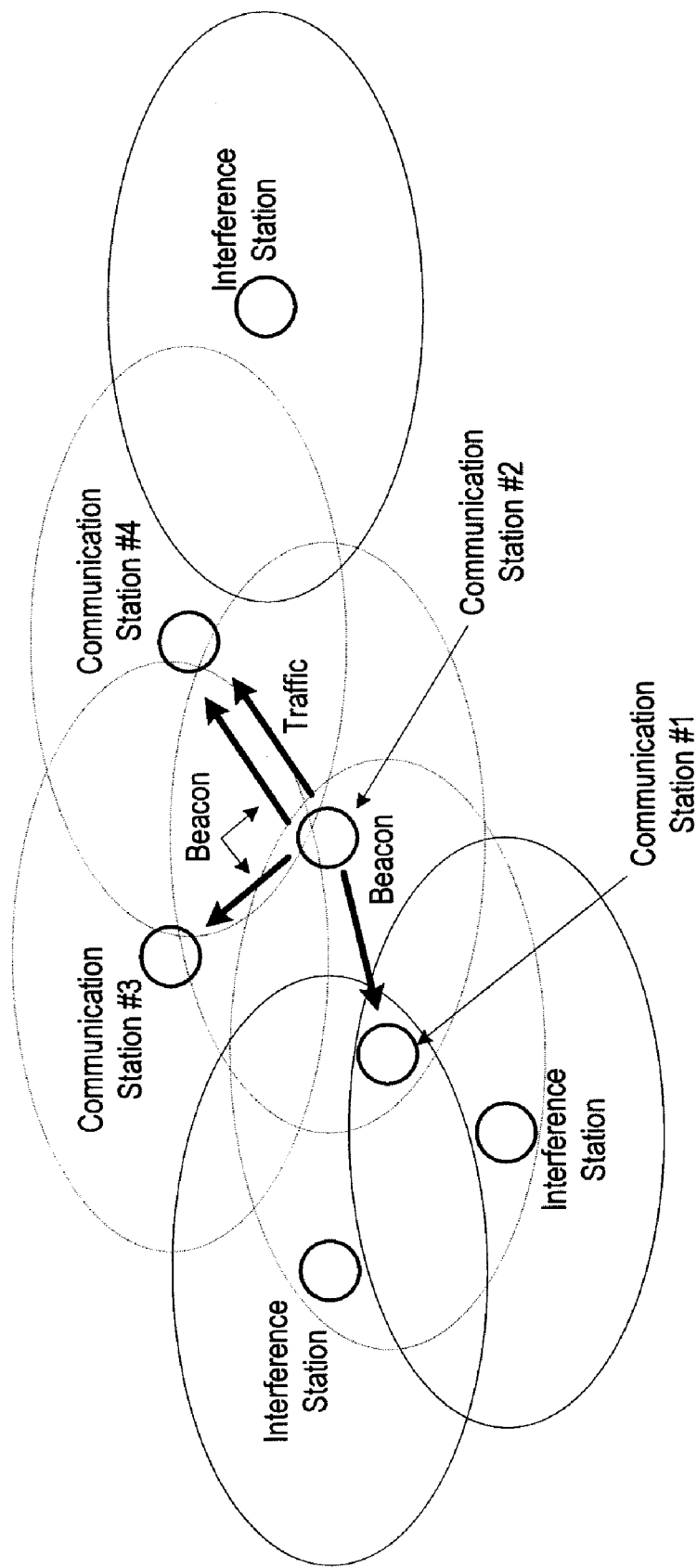
FIG. 17 is a diagram illustrating a state wherein two or more communication stations are disposed under an interference environment.

Now, let us consider a situation wherein two or more communication stations are disposed under an interference environment such as shown in FIG. 17.

With the wireless communication system shown in the drawing, three channels of a channel #1 through a channel #3 are prepared as available channels, but on the left and right on the space, interference stations which cause the channel #1, channel #2, and channel #3 to become interfered channels are disposed respectively.

With the communication station #2 and the communication station #3 disposed generally at the center of this space, a beacon can be heard over all of the channels. Also, with the communication station #1, the channel #1 and the channel #2 become interfered channels, and with the communication station #4, the channel #3 becomes an interfered channel, but these are interference levels wherein a beacon signal to be transmitted at the lowest rate can be received.

The communication station #2 can acquire interference information for each channel at each station by receiving a beacon from each station. Subsequently, the communication station #2 performs transmission of the beacon signal of the local station utilizing the channel #3 which all of the communication stations can receive a beacon.

Also, the communication station #2 may perform sending operation using a channel other than the beacon sending channel. For example, when transmitting a traffic to the communication station #4, following transmitting a beacon utilizing the channel #3, the communication station #2 makes the transition to the channel #1 or channel #2 of which interference level is low at the communication station #4, and starts traffic transmission.

With the autonomous decentralized wireless network according to the first embodiment of the present invention, the communication stations select the channel which as many communication stations as possible can receive as a beacon sending channel based on the interference information of each channel specified in a beacon signal at the time of new participation or refresh. Also, in the event that there is a peripheral station which cannot receive a beacon, change in the beacon sending channel is attempted.

Thus, by performing beacon sending operation using the channel which many more communication stations can receive as a beacon sending channel, many more communication stations can acknowledge the existence thereof by receiving a mutual beacon, so becoming trapped in a deadlock state can be avoided as much as possible.

Also, each communication station does not need to switch the channel during a period in which there is no sending data, and reception of a beacon is only performed. The communication stations can reduce the overhead due to channel transition by utilizing the same communication channel as that of a peripheral communication station as much as possible if the interference which the local station receives is an acceptable level. Channel transition requires a delay period of around 300 μsec or so from the perspective of hardware operation, so communication capacity can be increased by reducing the number of channel transition.

Also, the communication stations may determine a beacon sending channel according to regarding whether or not the local station needs a wideband, for example. For example, in the event that the local station needs a wideband, the channel which is preferably not used by other communication stations, and has a low interference level for the local station is selected, and transmission of a beacon is started. The same operation is performed regardless of whether the local station is the transmission side or the reception side.

On the other hand, the communication station which does not need a wideband, upon considering overhead and the like when changing a channel, preferably transmits a beacon over the same channel as a peripheral communication station, so focuses on the channel which the most communication stations transmit a beacon (most frequent channel).

In the even that peripheral stations including the local station do not receive great interference over the most frequent channel, transmission of a beacon is started using the channel thereof. Also, in the event that the multiple communication stations receive so great interference that they cannot receive a beacon transmitted at the lowest rate, the channel which causes the average interference level to the lowest is selected, and transmission of a beacon is started there.

Each communication station always refreshes the communication channel so as to become the most appropriate channel by performing this operation periodically.

Figure 18:
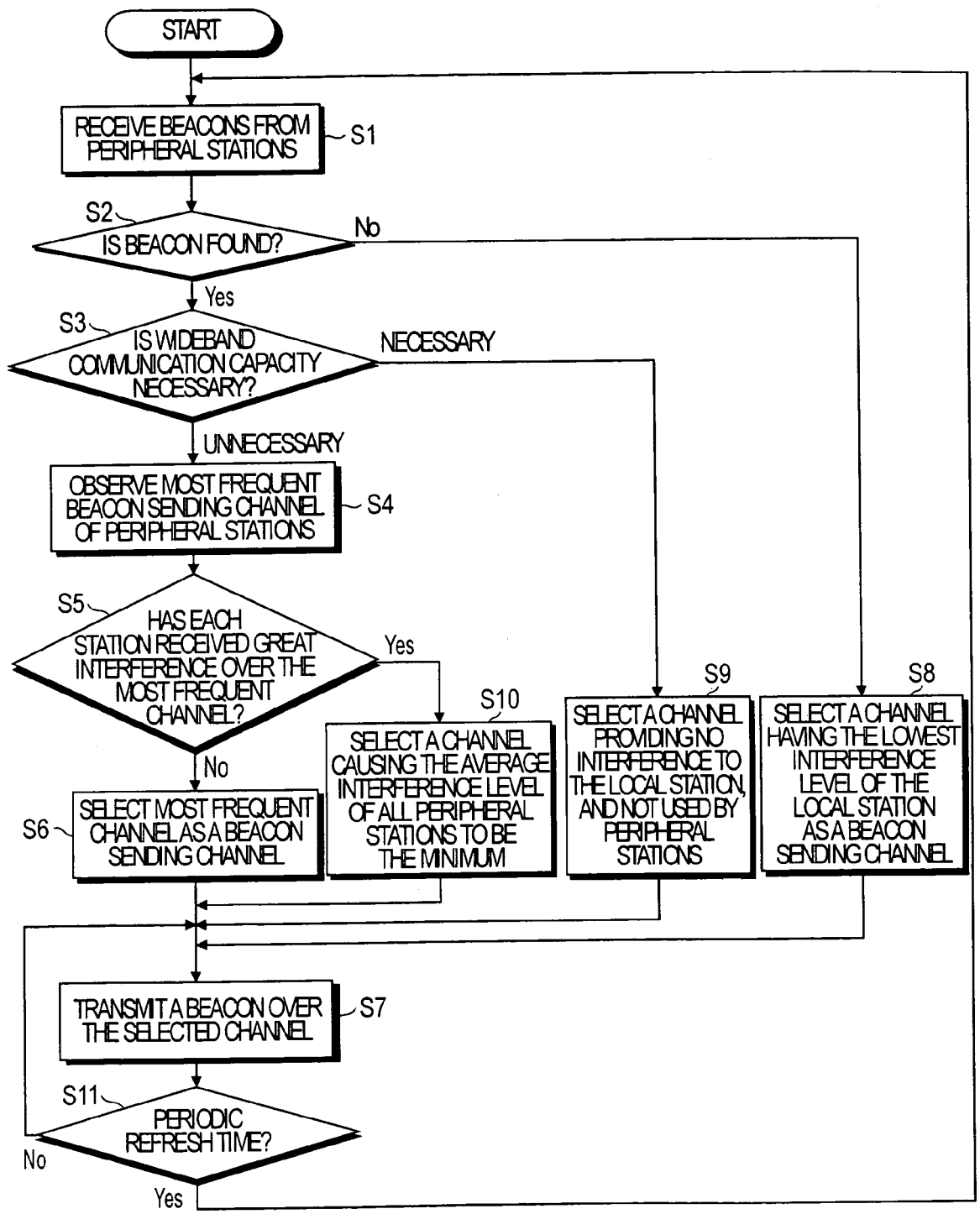
FIG. 18 is a flowchart illustrating operation sequence for a communication station selecting a beacon sending channel with a multi-channel autonomous decentralized wireless network according to the present invention.

FIG. 18 illustrates operation sequence for a communication station selecting a beacon sending channel with a multi-channel autonomous decentralized wireless network according to the present invention using a flowchart format. Actually, such operation is realized with an arrangement wherein the central control unit 103 within the wireless communication apparatus executes an executive instructing program stored in the information storing unit 113.

First, the communication station performs scan operation over each channel in accordance with predetermined procedures, and attempts to receive a beacon signal transmitted from a peripheral station (Step S1).

Here, in the event that the communication station could find the beacon signal of a peripheral station (Step S2), subsequently, the communication station determines regarding whether or not the local station needs a wideband (Step S3). Regarding whether or not a wideband is necessary, determination is made in light of both a case wherein the local station is the transmission side, and a case wherein the local station is the reception side.

In the event that the local station does not need a wideband, the communication station focuses attention on the channel which the most communication stations of the peripheral stations transmit a beacon (most frequent channel) (Step S4), and further determines regarding whether or not the most frequent channel provides great interference on the peripheral stations including the local station (Step S5).

Here, in the event that the most frequent channel does not provide great interference on the peripheral stations including the local station, the communication station selects the most frequent channel (Step S6), and starts beacon transmission on that channel (Step S7).

Also, in the event that the most frequent channel provides great interference on multiple communication stations, the communication station selects the channel which causes the average interference level to be the lowest (Step S10), and starts beacon transmission there (Step S7).

Also, in Step S3, in the event that determination is made that the local station needs wideband communication capacity, the communication station selects the channel which is preferably not used by the other communication stations, and has a low interference level for the local station (Step S9), and starts transmission of a beacon (Step S7). The same operation is performed regardless of whether the local station is the transmission side or the reception side.

Also, in Step S2, in the event that the communication station did not find a beacon signal from the peripheral stations, the communication station selects the channel most appropriate for the local station, specifically, the channel having an interference level lowest for the local station as the beacon sending channel (Step S8), and starts beacon transmission (Step S7).

Subsequently, when periodic refresh time comes (Step S11), the communication station returns to Step S1, where repeatedly performs selection operation of the beacon sending channel. Thus, the communication station always refreshes the communication channel so as to become the most appropriate channel by performing the above operation periodically.

Next, description will be made regarding operation wherein a communication station performs channel change in a time-series manner with the multi-channel autonomous decentralized wireless network according to the present invention.

With the autonomous decentralized wireless system according to the present embodiment, during each period of the prioritized transmission period (TPP) disposed over each channel immediately after the beacon sending timing, and the FAP following the TPP, random access is performed based on the (CSMA/CA). At this time, a preferential transmission right is assigned using an inter-frame space, and also the (RTS/CTS) method can be employed as means for avoiding a collision, and improving communication quality (e.g., see FIG. 7 and FIG. 8).

With the (RTS/CTS) method, the communication station serving as a sending source transmits the (RTS) (Request to Send) prior to transmission of net information, the communication station serving as a receiving destination receives this (RTS), and if possible to receive data, feeds back the (CTS) (Clear to Send) as the response thereof. Subsequently, following connection being established between the sending and receiving stations by (RTS/CTS) information exchange, data transmission is executed.

Now, description will be made regarding common data sending/receiving sequence utilizing the (RTS/CTS) information exchange with reference to FIG. 19. However, the example shown in the drawing is sequence in a case wherein data transmission is performed from a communication station serving as a sending source #1 to a communication station serving as a receiving destination #2 over a particular one channel. Also, a communication station #0 is a hidden terminal for the communication station #2, and a communication station #3 is a hidden terminal for the communication station #1.

First, prior to transmitting data from the communication station #1 to the communication station #2, following the communication station #1 detecting that the channel is in an empty state, the communication station #2 transmits a predetermined preamble signal P (131) and the RTS signal (132).

Here, duration information until receiving the (CTS) (Duration) is described in the (RTS) signal, a peripheral station, which can receive this (RTS) signal, sets an NAV (Network Allocation Vector), and stops signal transmission during a period specified with the Duration, thereby performing collision avoidance operation. With the example shown in the drawing, upon the communication station #0 receiving the (RTS) signal of the communication station #1, the communication station #0 performs operation for setting a period for withholding transmission from the local station based on the received duration information (transmission standby period). On the other hand, the communication station #3 is a hidden terminal, so cannot receive the (RTS) signal.

Also, if the communication station #2 can receive the RTS signal, and further can perform data reception thereafter, a predetermined preamble signal P (133) and the CTS signal (134) are returned.

Duration information until completing data reception (Duration) is described in the (CTS) signal, a peripheral station, which could receive this (CTS) signal, sets an NAV, and stops signal transmission during a period specified with the Duration, thereby performing collision avoidance operation. With the example shown in the drawing, upon the communication station #3 receiving the (CTS) signal of the communication station #2, the communication station #3 performs operation for setting a period for withholding transmission from the local station based on the received duration information (transmission standby period).

Thus, even with a communication station serving as a hidden terminal for one of the sending and receiving stations, interference is avoided and communication quality is maintained by receiving either the (RTS) signal or the (CTS) signal, and withholding transmission operation only for a predetermined period.

Subsequently, the communication station #1, which could receive this (CTS) signal, performs transmission processing of a predetermined preamble signal P (135) and data Data (136) during a period described with the (CTS) signal, and also the communication station #2 performs reception operation of the data Data (136).

At this time, control may be performed wherein the communication station #0 comprehends that data communication is performed from the communication station #1 based on the header information Head (not shown) of the data Data (136), the communication station #0 withholds transmission addressed to the communication station #1 during this data communication duration period.

In addition to this, as necessary, regarding whether or not data reception is correctly performed may be fed back from the wireless communication apparatus #2 to the wireless communication apparatus #1 as (ACK) information (not shown).

Figure 20:
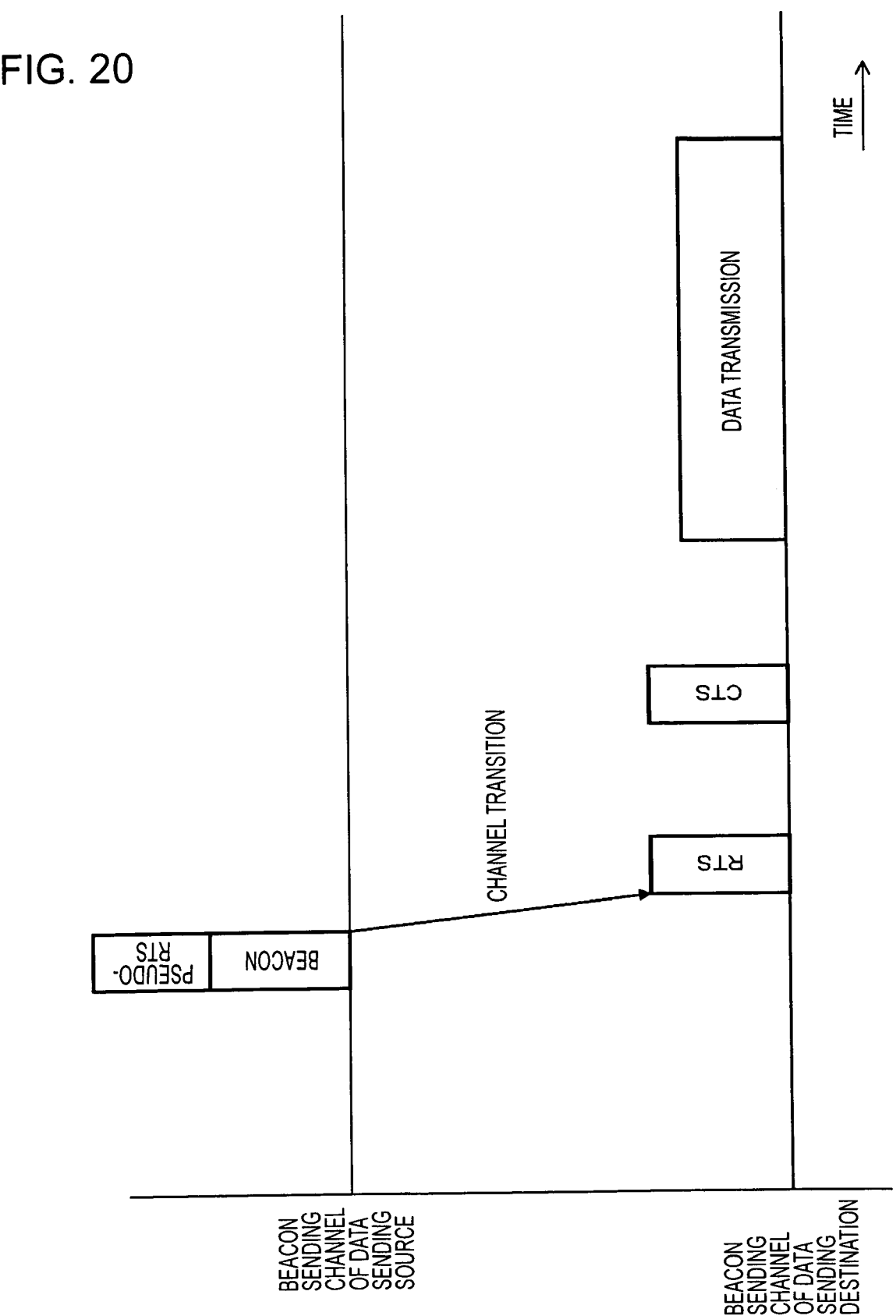
FIG. 20 is a diagram illustrating an example of a multi-channel autonomous decentralized wireless network according to the present invention to which the method (RTS/CTS) is applied.

Subsequently, description will be made regarding an application of the (RTS/CTS) method to the multi-channel autonomous decentralized wireless network according to the present embodiment with reference to FIG. 20.

As described above, with the present embodiment, the communication station serving as a data sending source makes the transition to the beacon sending channel of the communication station serving as a data sending destination to perform data sending operation. Accordingly, in the event that the channel of a peripheral station, which becomes a hidden terminal for the communication station serving as the data sending destination, i.e., the transition destination channel is an interference channel, a hidden terminal problem inherent in multi-channels occurs, such that the RTS signal transmitted over the transition destination channel cannot be heard.

To this end, the communication station serving as the data sending source, assuming that a communication station which becomes a hidden terminal for the communication station serving as the data sending destination exists, transmits a beacon signal multiplexed with the (RTS) signal (beacon signal including information of the channel used for data communication) over the beacon sending channel of the local station, prior to transmission of the (RTS) signal.

This beacon signal serves as a pseudo-RTS signal. The hidden terminal can avoid interference by withholding data sending operation for a predetermined period in response to receiving the beacon multiplexed with the (RTS) signal (beacon including information of the channel used for data communication) over the beacon sending channel.

Thereafter, the communication station serving as the data sending source makes the transition to the beacon sending channel of the communication station serving as the data sending destination to transmit the request to send packet (RTS), and starts data transmission in response to receiving the notification packet (CTS) from the communication station serving as the data sending destination.

Figure 21:
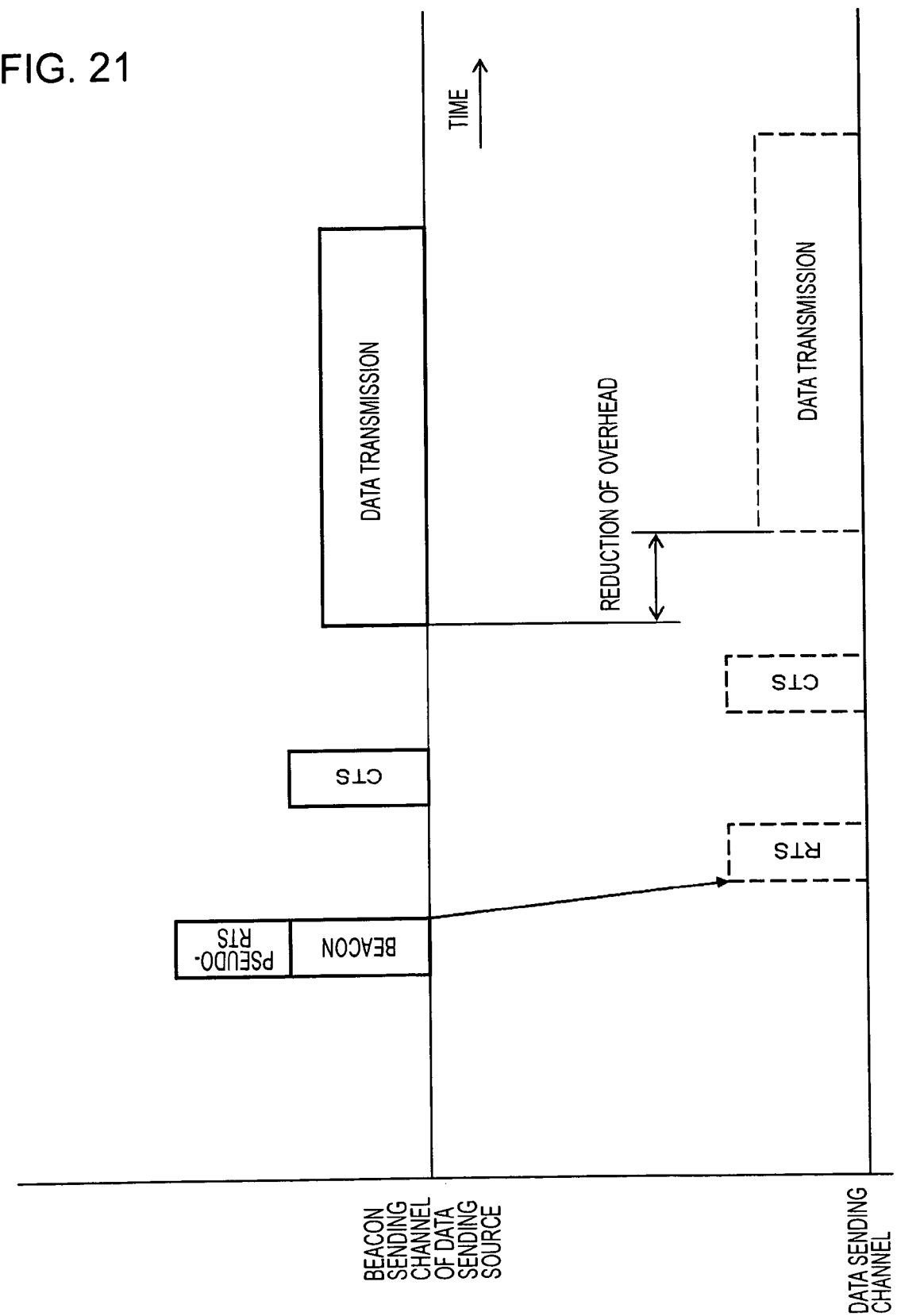
FIG. 21 is a diagram illustrating another example of a multi-channel autonomous decentralized wireless network according to the present invention to which the (RTS/CTS) method is applied.

FIG. 21 is a diagram illustrating another example of the multi-channel autonomous decentralized wireless network according to the present invention to which the (RTS/CTS) method is applied.

With the present embodiment, the communication station serving as a data sending source, in order to avoid a hidden terminal problem along with making the transition to a channel having a low interference level for the communication station serving as a data sending destination to perform data sending operation, transmits a beacon multiplexed with the (RTS) signal (beacon including information of the channel used for data communication) over the beacon sending channel of the local station, prior to transmission of the (RTS) signal.

At this time, in the event that the beacon sending channel of the data sending source is identical to the beacon sending channel of the communication station serving as the data sending destination, the beacon multiplexed with the RTS signal is regarded as a pseudo-RTS signal itself.

Also, in the event that the beacon sending channel of the data sending source is identical to the channel to be used for data transmission, the beacon multiplexed with the RTS signal (beacon including information of the channel used for data communication) is regarded as the RTS signal itself.

Also, the communication station serving as the data sending destination can start data transmission by feeding back the (CTS) signal without awaiting the normal (RTS) signal coming, in response to receiving the beacon multiplexed with the (RTS) signal (beacon including information of the channel used for data communication).

Thus, overhead of the (RTS/CTS) procedures in multi-channels can be reduced by omitting the sending procedure (retransmission of the RTS signal) of the (RTS) signal.

Figure 22:
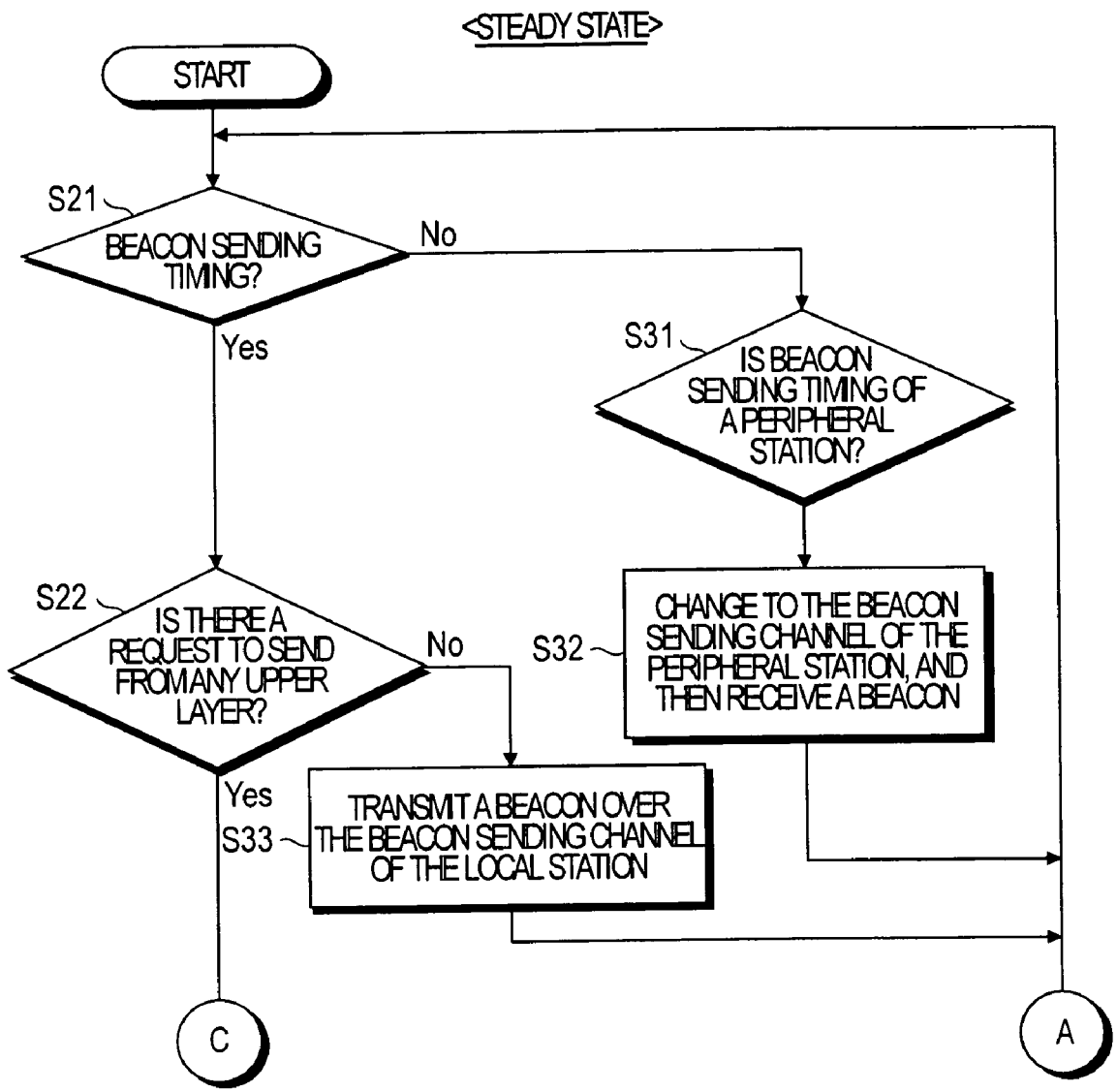
FIG. 22 is a flowchart illustrating processing procedures (in a steady state) for a wireless communication apparatus 100 performing autonomous operation as a communication station with a multi-channel autonomous decentralized wireless network according to the present invention.
Figure 23:
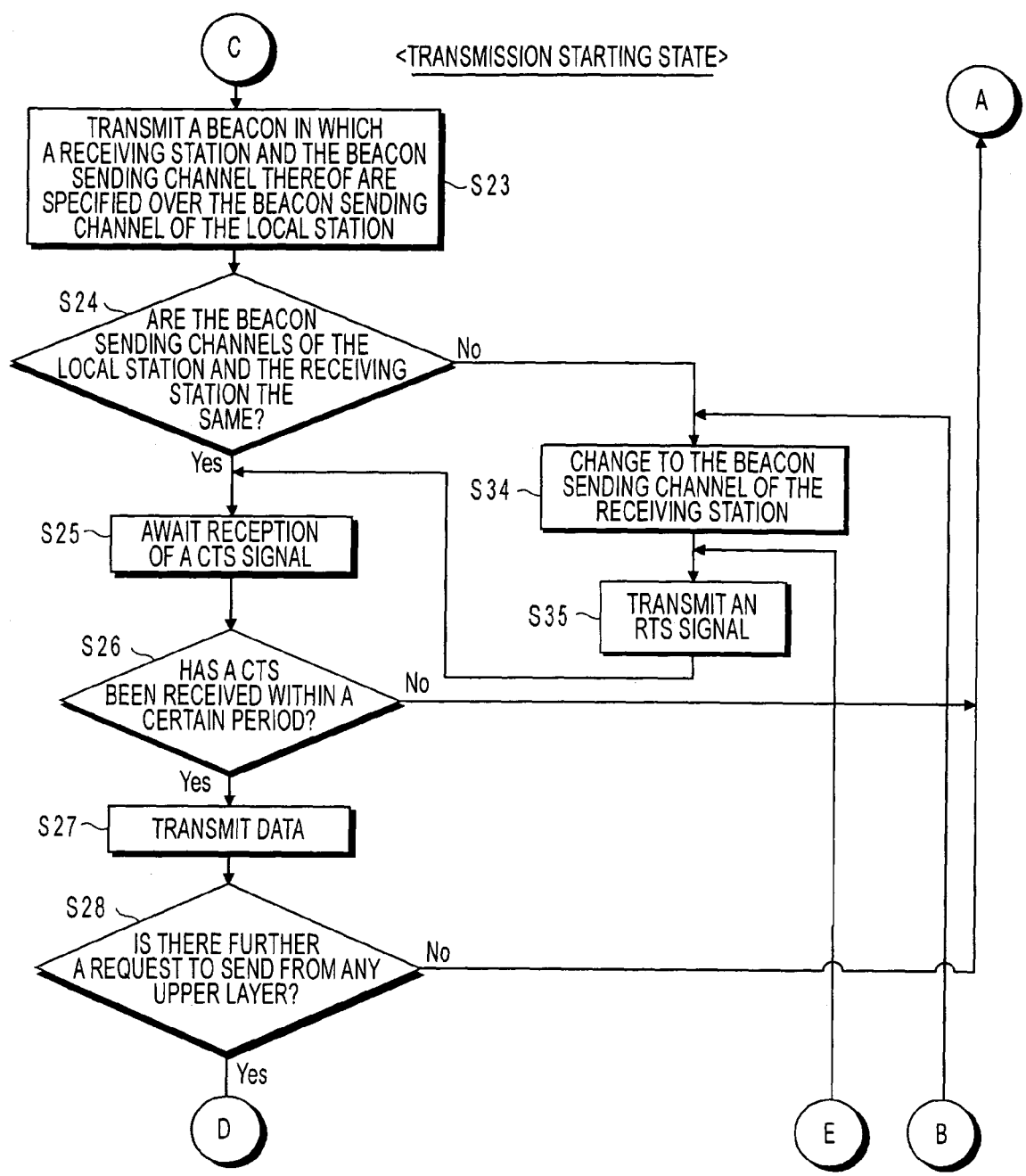
FIG. 23 is a flowchart illustrating processing procedures (in a transmission starting state) for the wireless communication apparatus 100 performing autonomous operation as a communication station with a multi-path autonomous decentralized wireless network according to the present invention.
Figure 24:
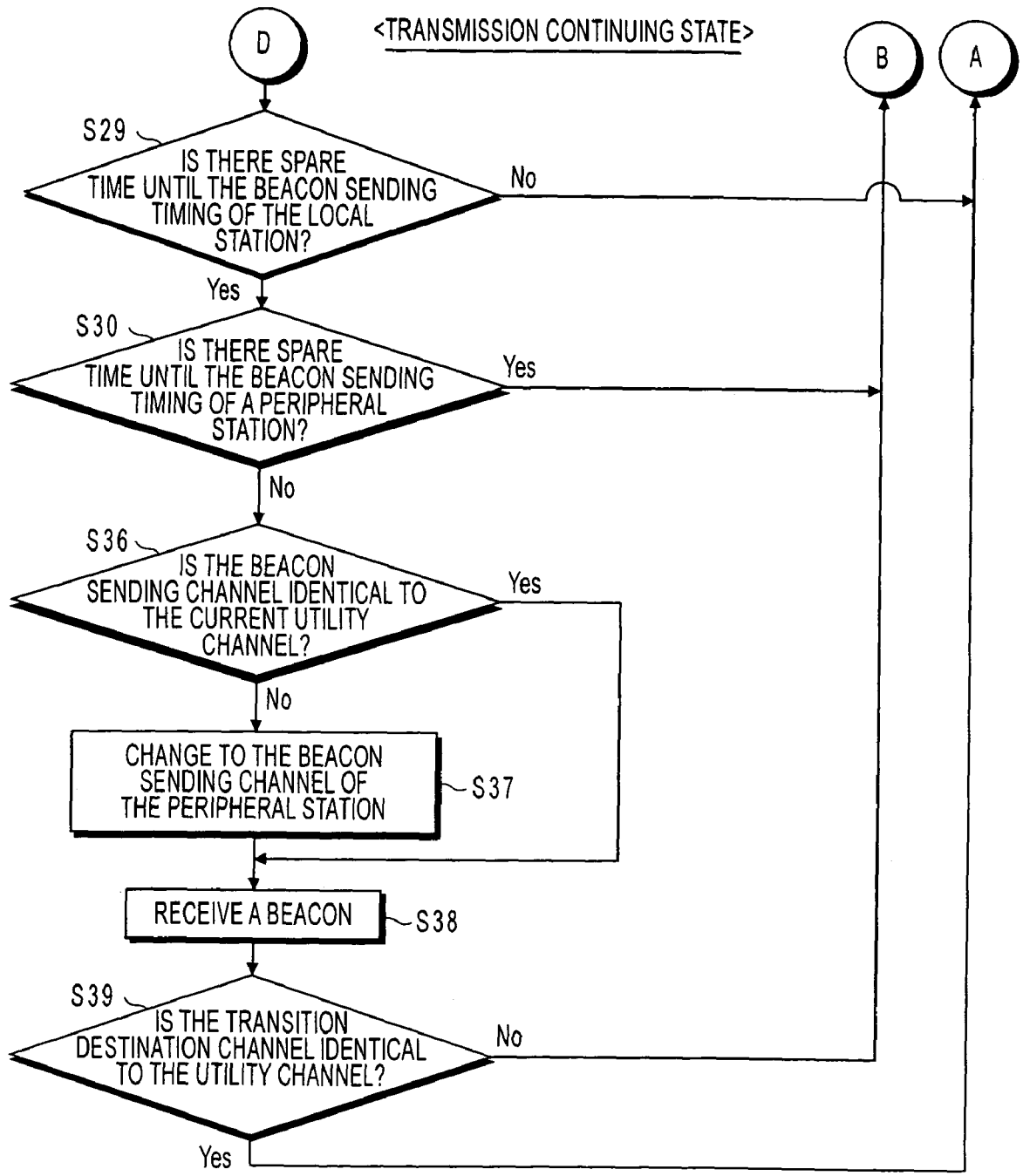
FIG. 24 is a flowchart illustrating processing procedures (in a transmission continuing state) for the wireless communication apparatus 100 performing autonomous operation as a communication station with a multi-path autonomous decentralized wireless network according to the present invention.

FIG. 22 through FIG. 24 illustrate processing procedures for the wireless communication apparatus 100 performing autonomous operation as a communication station with the multi-bus autonomous decentralized wireless network according to the present embodiment using a flowchart format. However, let us say that the wireless communication station 100 has already acquired neighboring station information such as the beacon sending channels and beacon sending timing of the peripheral stations, and the like by scan operation not shown, or the like. As illustrated in the drawings, the communication station has a steady operation mode not depending on a request to send, a transmission starting mode of which the trigger is beacon transmission, and a transmission continuing mode. Such processing procedures are realized with an arrangement wherein the central control unit 103 executes an executive instructing program stored in the information storing unit 113.

Under the steady operation mode, until the beacon sending timing comes, upon the beacon sending timing of a peripheral station coming (Step S31), the communication station makes the transition to the beacon sending channel of the peripheral station to perform beacon reception (Step S32).

Upon the beacon sending timing of the local station coming (Step S21), the communication station checks regarding whether or not there is a request to send from an upper layer of the communication protocol (e.g., external device to be connected via the interface 101) (Step S22). In the event that there is no request to send, the communication station performs beacon transmission over the beacon sending channel most appropriate for the local station (Step S33).

On the other hand, in the event that there is a request to send from the upper layer, the communication station transmits, at a predetermined beacon transmission timing, a beacon multiplexed with the (RTS) signal (beacon including information of the channel used for data communication) over the beacon sending channel of the local station for the purpose of the (RTS/CTS) procedures (Step S23).

Subsequently, the communication station makes the transition to the transmission starting mode, and checks regarding whether or not the beacon sending channel of the local station is identical to the beacon sending channel of the communication station serving as a data sending destination (i.e., channels to be used for data transmission) (Step S24).

Here, in the event that the mutual beacon sending channels are not matched, the communication station makes the transition to the beacon sending channel of the communication station serving as the data sending destination (Step S34), following which transmits the (RTS) signal (Step S35). On the other hand, in the even that the mutual beacon sending channels are matched, the communication station regards the beacon multiplexed with the (RTS) signal (beacon including information of the channel used for data communication) as the (RTS) signal itself, and omits transmission operation of the normal (RTS) signal and channel transition operation. Subsequently, the communication station awaits until the communication station serving as the data sending destination transmits the (CTS) signal (Step S25).

Here, in the event that the communication station could not receive the (CTS) signal within a predetermined period (Step S26), the communication station proceeds to Step S35, and performs retransmission of the (RTS) signal.

On the other hand, in the event that the communication station could receive the (CTS) signal within a predetermined period (Step S26), the communication station executes data transmission which is requested from the upper layer (Step S27). Subsequently, the communication station checks regarding whether or not there is further a request to send from the upper layer (Step S28). In the event that the request to send is completed, the communication station returns to Step S21, and performs beacon sending/receiving operation under the steady operation mode.

Also, in the event that the request to send continues (Step S28), the communication station makes the transition to the transmission continuing mode. Subsequently, the communication station checks regarding whether or not there is spare time until the beacon sending timing of the local station (Step S29). In the event that there is no spare time, the communication station returns to Step S21, and performs beacon sending operation under the steady operation mode.

In the event that there is spare time until the beacon sending timing of the local station (Step S29), the communication station further checks regarding whether or not there is spare time until the beacon sending timing of a peripheral station (Step S30).

In the event that there is spare time until the beacon sending timing of the local station and a peripheral station (Step S30), the communication station proceeds to Step S35, transmits the (RTS) signal, and continues data communication operation.

In the event that there is no spare time until the beacon sending timing of a peripheral station (Step S30), the communication station makes channel transition in the event that the current utility channel and the beacon sending channel of the relevant peripheral station differ (Steps S36 and S37), and receives a beacon (Step S38).

Subsequently, following reception of the beacon of the peripheral station, the communication station checks regarding whether or not the beacon sending channel of the peripheral station serving as a transition destination is identical to the utility channel which the local station has been used for data transmission so far (Step S39). In the event that the mutual beacon sending channels are not matched, the communication station proceeds to Step S34, and makes the transition to the beacon sending channel of the communication station serving as a data sending destination, following which transmits the RTS signal (Step S35), and resume data communication operation.

Also, in the event that the mutual beacon sending channels are matched (Step S39), this means the transmission prioritized period of the beacon sending station, so the communication station cannot resume data communication operation. In this case, the communication station returns to Step S21, and performs beacon transmission operation under the steady operation mode.

With the multi-channel autonomous decentralized network, the communication station can set a more appropriate channel to the beacon sending channel of the local station by setting the beacon sending channel in accordance with the procedures such as shown in FIG. 18. According to the communication operation procedures shown in FIG. 22 through FIG. 24, the communication station can perform data communication according to the (RTS/CTS) method while transmitting a beacon in a predetermined transmission frame cycle to perform notification of comprehension of neighbor's existence and a network status, and also making transition to the beacon sending channel in concert with the beacon sending timing of a peripheral station to perform beacon reception operation.

Here, channel switching requires a period of around 300 μsec or so from the perspective of hardware operation. Consequently, in the event that the communication station which is communicating data suspends data communication to receive a beacon from one of the other stations, performs channel transition and reception of a beacon, following which makes the transition to the original channel to resume data communication, overhead becomes great.

Figure 25:
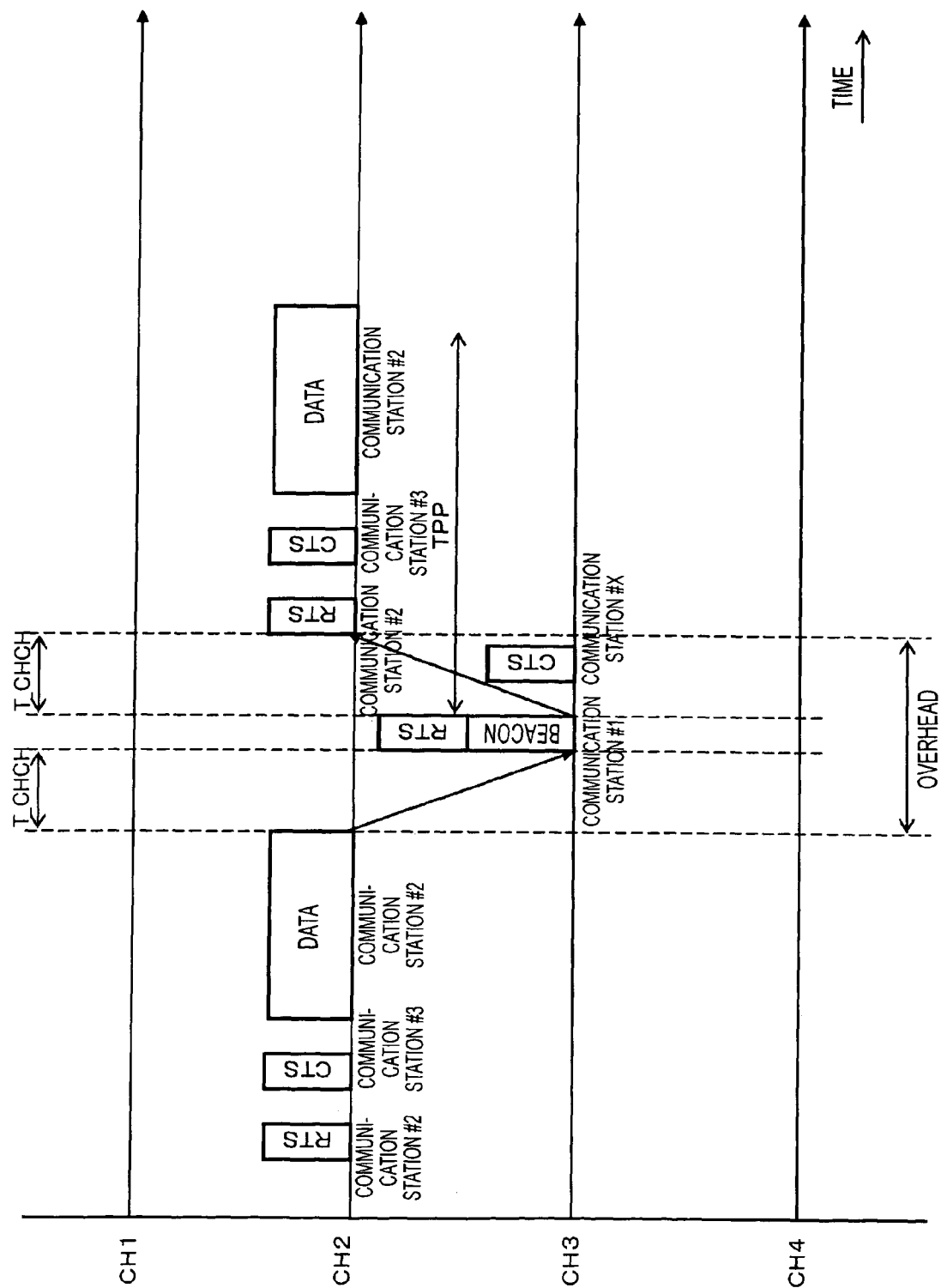
FIG. 25 is a diagram illustrating operation for a communication station, which is communicating data, suspending data communication to receive the beacon of one of the other stations, performing channel transition and beacon reception, following which resuming data communication by making the transition to the original channel.

FIG. 25 illustrates an operation example for a communication station, which is communicating data, suspending data communication to receive the beacon of one of the other stations, performing channel transition and beacon reception, following which making the transition to the original channel to resume data communication.

As shown in the drawing, with over a channel CH2, a communication station #2 serving as a data sending source transmits the (RTS) packet, and starts transmission operation of a data packet in response to receiving the (CTS) packet from a communication station #3 serving as a data sending destination.

Here, with over another channel CH3, when the beacon sending timing TBTT by a peripheral station #1 approaches, the communication station #2 (and communication station #3) makes the transition to the channel CH3 spending time for a channel transition period T_CHCH regardless of whether or not transmission data continues, and receives a beacon.

The communication station #1 serving as a beacon sending station acquires a preferential transmission right, and starts preferential data transmission operation in accordance with the (RTS/CTS) procedures over the channel CH3 during the TPP interval.

Conversely, upon the communication station #2 (and communication station #3) receiving the (RTS) packet, and acknowledging that preferential sending operation is performed over the channel CH3, data communication can be continued over the data communication channel CH2 of the local station, the communication station #2 (and communication station #3) returns to the channel CH2 spending time for the channel transition period T_CHCH. Subsequently, the communication station #2 transmits the (RTS) packet, and resumes sending operation of a data packet in response to receiving the (CTS) packet from the communication station #3.

As shown in FIG. 25, with a multi-channel communication environment, overhead of data communication increases along with beacon reception of peripheral stations. On the other hand, a situation is also assumed wherein the communication station need not always receive a beacon from a peripheral station which is not a party of data communication each time.

To this end, as an modification example of the above communication operation procedures, an arrangement is proposed wherein in the event that the communication station comprehends that the beacon sending timing of one of the other stations approaches, following the communication station determining regarding whether or not there is the need to communicate with the relevant beacon sending station, in the event that there is no need to receive a beacon, and also the current channel to be used is not matched with the beacon sending channel, the communication station omits reception operation of that beacon.

Thus, omitting unnecessary beacon receiving operation enables time necessary for beacon transition and power consumption of an apparatus to be omitted, and also enables communication capacity to be increased.

Now, with the present embodiment, comings and goings of traffics is managed in an autonomous decentralized manner by providing a preferential communication right to a beacon sending station (described above), but the beacon sending station does not always acquire the TPP over a beacon sending channel. That is to say, the beacon sending station may change a channel which can be used preferentially to the channel most appropriate for traffic transmission other than a beacon sending channel depending on the interference situation on the reception side.

Accordingly, upon the communication station omitting beacon receiving operation, a problem is caused wherein such channel transition operation cannot be acknowledged.

To this end, the communication station, in the event of omitting beacon receiving operation, estimates the sending timing regarding CTS and RTS signals based on the beacon sending timing, performs receiving operation over the current utility channel only for that timing, and detects regarding whether or not the beacon sending station has made the transition to the current utility channel.

Subsequently, in the event that the communication station detects that the beacon sending station has made the transition to the current utility channel at the sending timing of (RTS) and (CTS) signals, the communication station avoids a communication collision by withholding data communication operation of the local station. On the other hand, in the event that the communication station does not detect that situation, the communication station acknowledges that the beacon sending station has acquired a preferential transmission right based on another channel, and continuously performs data communication operation of the local station over the current utility channel.

Thus, in the event of omitting beacon receiving operation of one of the other stations, there is no need to perform unnecessary channel transition, and also a communication collision can be avoided by the beacon sending station performing receiving operation according to the transmission prioritized period acquired through beacon transmission.

Figure 26:
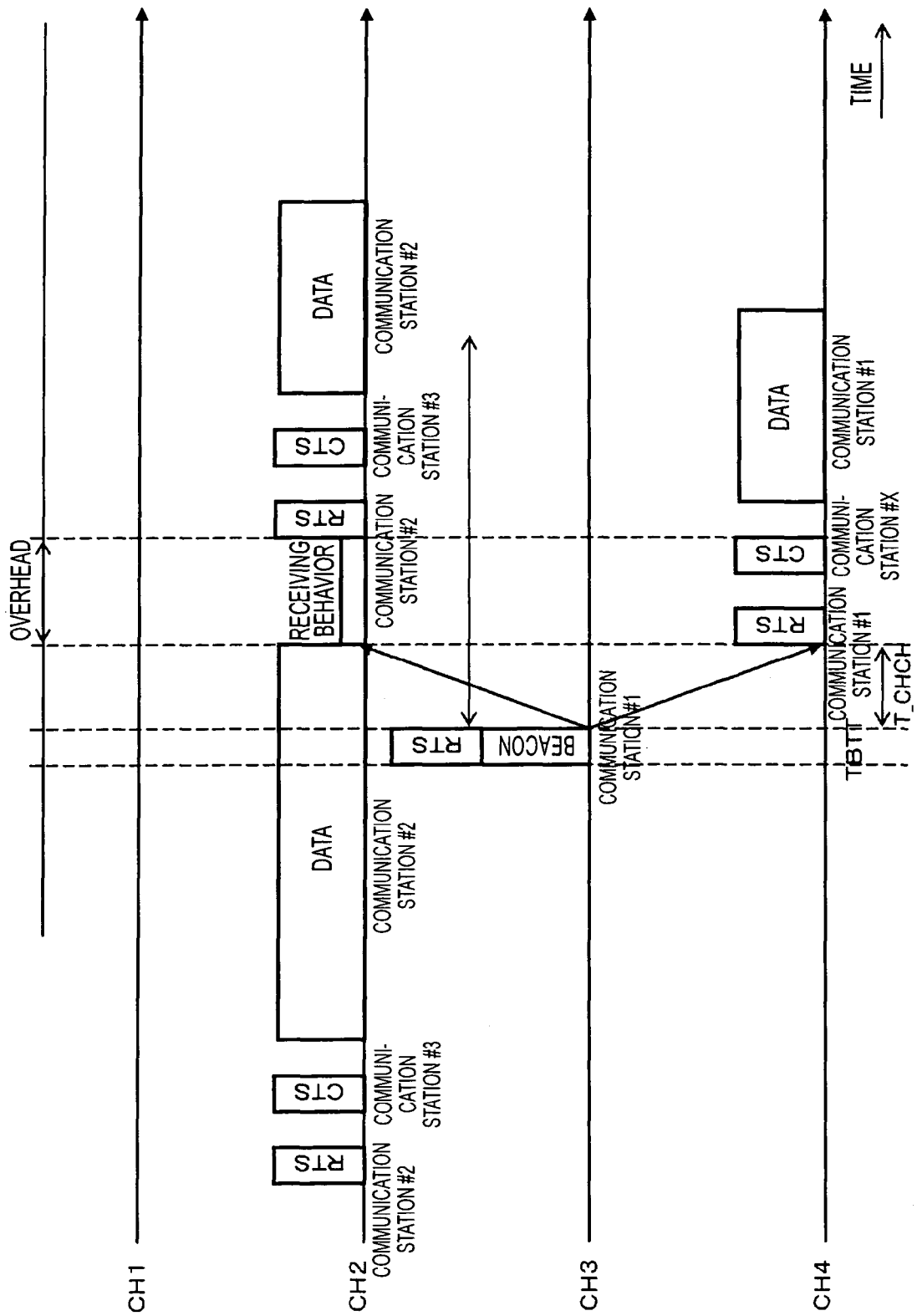
FIG. 26 is a diagram illustrating operation for a communication station, which is communicating data, omitting the beacon reception of one of the other stations.

FIG. 26 illustrates an operation example for a communication station, which is communicating data, omitting the beacon reception of one of the other stations.

As shown in the drawing, with over a channel CH2, a communication station #2 serving as a data sending source transmits the (RTS) packet, and starts transmission operation of a data packet in response to receiving the CTS packet from a communication station #3 serving as a data sending destination.

Here, with over another channel CH3, when the beacon sending timing TBTT by a peripheral station #1 approaches, the communication station #2 (and communication station #3) determines regarding whether or not there is the need to receive a beacon from the peripheral station #1. Subsequently, in the event that there is no need to receive a beacon, and also the current utility channel CH2 is not identical to the beacon sending channel CH3, the communication station #2 (and communication station #3) omits receiving operation of a beacon.

Subsequently, the communication station #2 (and communication station #3) further continues data sending operation only for a period equivalent to the channel transition period T_CHCH, following which estimates the sending timing regarding the beacon sending timing TBTT by the peripheral station #1, and thereafter, the (RTS) and (CTS) signals, performs receiving operation over the channel CH2 currently used only for these timings, and detects regarding whether or not the beacon sending station has made the transition to the current utility channel.

With the example shown in the drawing, a communication station #1 serving as a beacon sending station makes the transition to a channel CH4 most appropriate for traffic transmission, which is different from a beacon sending channel CH3, and starts preferential data sending operation over the channel CH4 during the TPP interval in accordance with the (RTS/CTS) procedures based on the acquired preferential transmission right.

On the other hand, the communication station #2 (and communication station #3) has not detected comings of the (RTS) and (CTS) packets over the current utility channel CH2 during the estimated standby period, so acknowledges that the beacon sending channel #1 has acquired a preferential transmission right over another channel. In this case, the communication station #2 (and communication station #3) can resume data communication operation of the local station over the current utility channel. It is necessary to fully understand that the communication station #2 (and communication station #3) can resume data communication immediately after the standby period without spending the channel transition period T_CHCH.

Figure 27:
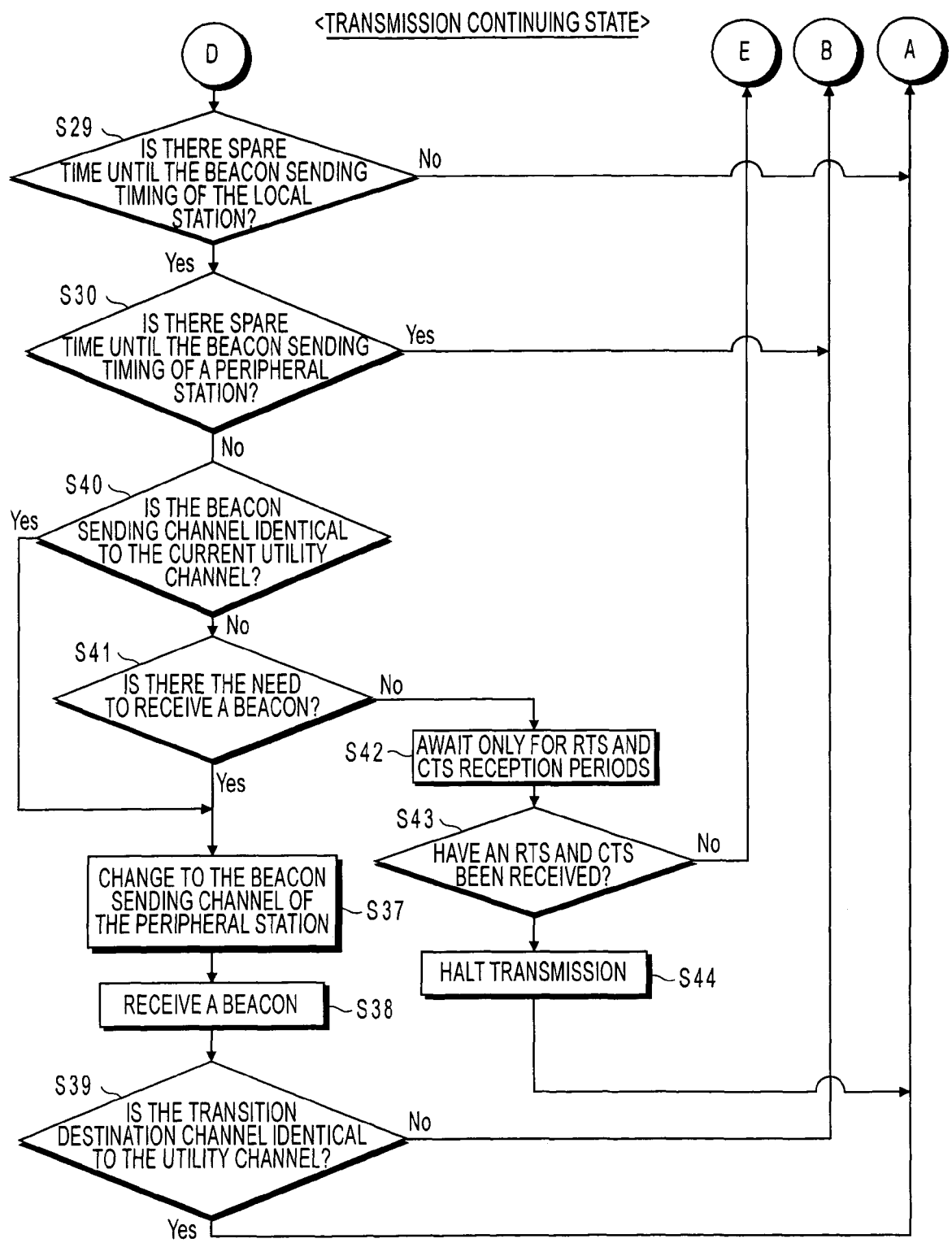
FIG. 27 is a flowchart illustrating processing procedures (in a case wherein beacon reception is omitted in a transmission continuing state) for the wireless communication apparatus 100 performing autonomous operation as a communication station with a multi-path autonomous decentralized wireless network according to the present invention.

In the event that the communication station performs communication operation such as shown in FIG. 26, the communication operation procedures in a transmission continuous state are not FIG. 24 but the flowchart shown in FIG. 27 obtained by modifying FIG. 24.

Following data transmission being executed in Step S27, in the event that the request to send from the upper layer continues (Step S28), the communication station makes the transition to the transmission continuing mode. Subsequently, the communication station checks regarding whether or not there is spare time until the beacon sending timing of the local station (Step S29). In the event that there is no spare time, the communication station returns to Step S21, and performs beacon sending operation under the steady operation mode.

In the event that there is spare time until the beacon sending timing of the local station (Step S29), the communication station further checks regarding whether or not there is spare time until the beacon sending timing of a peripheral station (Step S30).

In the event that there is spare time until the beacon sending timing of the local station and a peripheral station (Step S30), the communication station proceeds to Step S35, transmits the RTS signal, and continues data communication operation.

On the other hand, in the event that there is no spare time until the beacon sending timing of a peripheral station (i.e., comprehends that the beacon sending timing of one of the other stations approaches) (Step S30), the communication station further checks regarding whether or not the current utility channel is identical to the beacon sending channel of the relevant peripheral station (Step S40).

In the event that the current utility channel is identical to the beacon sending channel of the relevant peripheral station, the communication station receives a beacon over this channel (Step S38).

Conversely, in the event that the current utility channel is not identical to the beacon sending channel of the relevant peripheral station (Step S40), the communication station further determines regarding whether or not there is the need to communicate with the relevant beacon sending station (Step S41).

Here, in the event that determination is made that there is the need to receive a beacon, and also in the event that the current utility channel is not identical to the beacon sending channel of the relevant peripheral station, the communication station performs channel transition (Step S37), and receives a beacon (Step S38).

Subsequently, following reception of the beacon of the peripheral station in Step S38, the communication station checks regarding whether or not the beacon sending channel of the peripheral station serving as a transition destination is identical to the utility channel which the local station has been used for data transmission so far (Step S39). In the event that the mutual beacon sending channels are not matched, the communication station proceeds to Step S34, and makes the transition to the beacon sending channel of the communication station serving as a data sending destination, following which transmits the (RTS) signal (Step S35), and resume data communication operation.

Also, in the event that the mutual beacon sending channels are matched (Step S39), this means the transmission prioritized period of the beacon sending station, so the communication station cannot resume data communication operation. In this case, the communication station returns to Step S21, and performs beacon transmission operation under the steady operation mode.

On the other hand, in the event that there is no need to receive a beacon in Step S41, and also in the event that the current utility channel is not identical to the beacon sending channel, the communication station omits beacon receiving operation. Thus, omitting unnecessary beacon receiving operation enables time necessary for beacon transition and power consumption of an apparatus to be omitted, and also enables communication capacity to be increased.

Here, the beacon sending station does not always acquire the TPP over a beacon sending channel. That is to say, the beacon sending station may make the transition to the current utility channel of the local station to acquire the transmission prioritized period TPP, so if the communication station omits beacon receiving operation to continue data communication, there is the possibility that communication will result in a collision.

To this end, the communication station, in the event of omitting beacon receiving operation, estimates the sending timing regarding (CTS) and (RTS) signals based on the beacon sending timing, performs receiving operation over the current utility channel only for that timing (Step S42), and detects regarding whether or not the beacon sending station has made the transition to the current utility channel.

Subsequently, in the event that the communication station has received the RTS and CTS signals at the sending timing of the (RTS) and (CTS) signals (Step S43), the communication station acknowledges that the beacon sending channel has made the transition to the current utility channel, and avoids a communication collision by suspending data communication operation of the local station. In this case, the flow returns to Step S21, and beacon transmission is performed under the steady operation mode.

On the other hand, in the event that the communication station has not received the (RTS) and (CTS) signals at the sending timing of the (RTS) and (CTS) signals (Step S43), the communication station acknowledges that the beacon sending station has acquired a preferential transmission right based on another channel. In this case, the communication station returns to Step S35, and continuously performs data communication operation of the local station over the current utility channel by transmitting the RTS signal.

E. Second Embodiment

With the second embodiment of the present invention, each communication station selects the channel having communication quality most excellent for the local station as the beacon sending channel, but on the other hand, when transmitting data, each communication station performs data transmission utilizing the channel, which has excellent communication quality, appropriate for reception at the communication station serving as a data sending destination regardless of the beacon sending channel of the local station.

Regarding which channel communication quality is appropriate for each communication station can be readily determined by which channel the communication station thereof uses to perform beacon transmission. Each communication station determines a beacon sending channel only depending on the interference situation of the local station, and this is familiarized to the public as a channel for receiving the traffic of the local station, which facilitates control in each communication station under a multi-channel autonomous decentralized communication environment.

Figure 28:
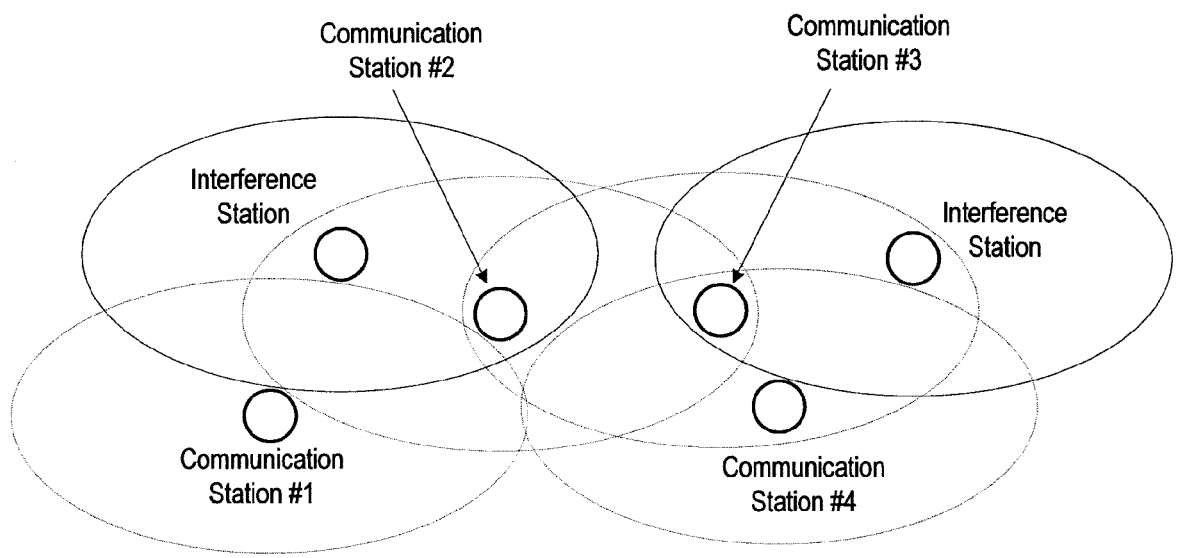
FIG. 28 is a diagram illustrating a situation wherein the beacon of the local station is transmitted using the channel which each communication station receives traffic.

Now, let us consider a situation wherein two or more communication stations are disposed under an interference environment such as shown in FIG. 28.

Each communication station sets the channel having the most excellent communication quality as the beacon sending channel for itself, taking into consideration only the interference situation in the local station. With the example shown in the drawing, a communication station #2 receives interference over a channel #4, and a communication station #3 receives interference over a channel #1 respectively. To this end, in order to avoid interference when receiving data, the communication station #2 transmits a beacon over a channel #3, and the communication station #3 transmits a beacon over a channel #2 respectively, thereby instructing peripheral stations so as to perform transmission using these channels, in the event of transmitting a traffic addressed to the local station.

Further, a communication station #1 does not receive interference over the channel #1, and accordingly transmits the local station beacon using the channel #1, thereby performing effective recycle of a frequency. Similarly, a communication station #4 does not receive interference over the channel #4, and accordingly transmits the local station beacon using the channel #4, thereby performing effective recycle of a frequency. By transmitting a beacon over a channel which receives a traffic, it is announced that the band thereof is used, and consequently, an advantage of reducing interference from another system can be expected.

Figure 29:
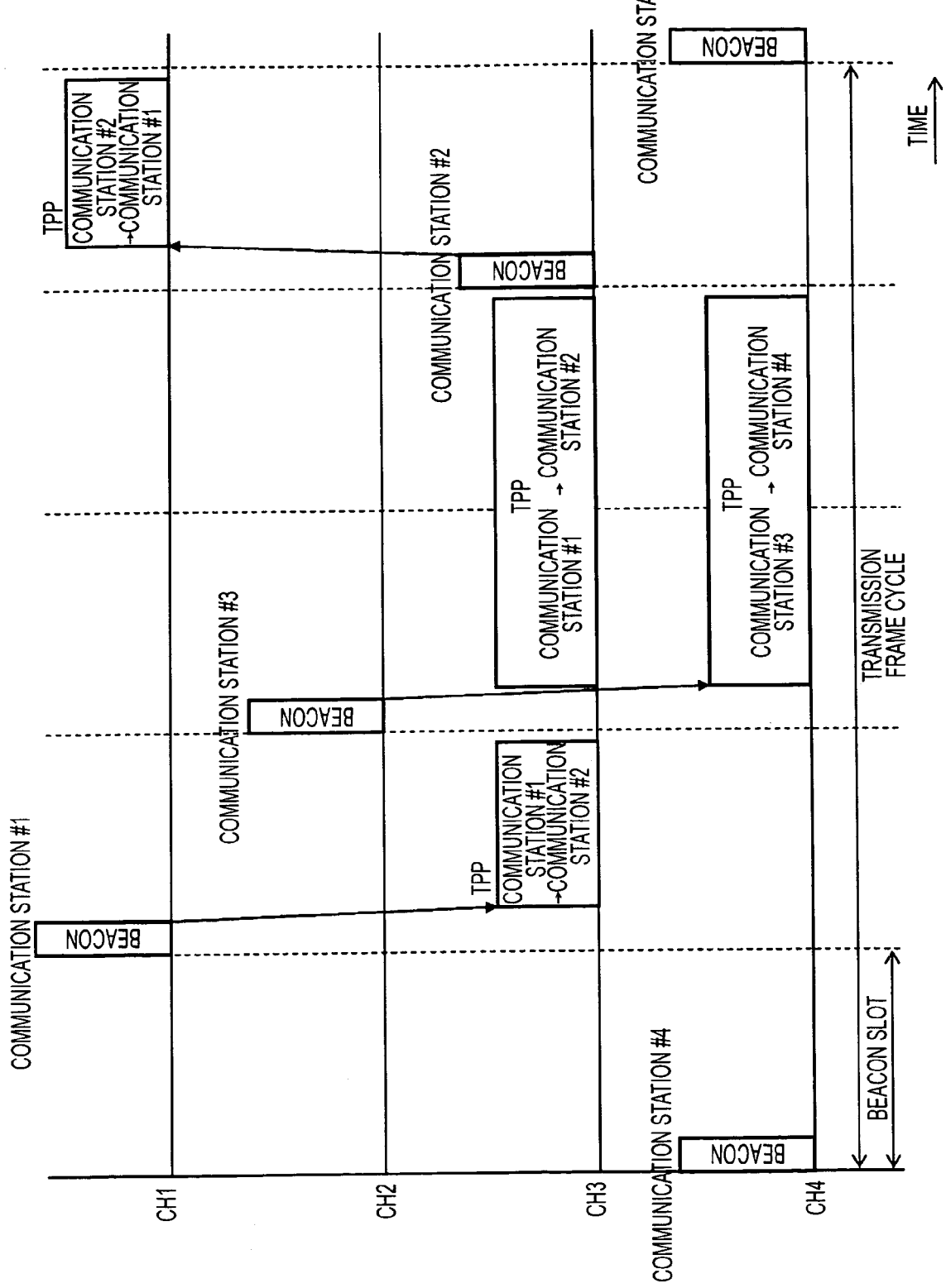
FIG. 29 is a diagram illustrating a situation wherein each communication station performs beacon transmission and data transmission using the preferential sending period (TPP) over each channel.

FIG. 29 is a diagram illustrating a situation wherein each communication station performs beacon transmission and data transmission over each channel. However, with the example shown in the drawing, let us say that each communication station acquires the transmission prioritized period (TPP) immediately following the beacon sending timing of the local station.

Each communication station sets the channel having the most excellent communication quality in the local station as the beacon sending channel of the local station. With the example shown in the drawing, the communication station #1 sets the channel #1, the communication station #2 sets the channel #3, the communication station #3 sets the channel #2, and the communication station #4 sets the channel #4, as the beacon sending channel of the local station.

Each communication station transmits a beacon at the head of the frame cycle of the local station over the beacon sending channel of the local station, so a transmission frame cycle is defined with a beacon interval. The transmission frame cycle is made up of multiple (5 in the drawing) slots, and in addition to the headmost beacon sending slot being disposed over the beacon sending channel of the local station, the receiving slot of the local station, the beacon receiving slot from a peripheral station, and the like are disposed over the other channels.

Each communication station transmits a beacon to the beacon slot determined over the beacon sending channel of the local station at the timing so as to not overlap another beacon temporally. Also, along with the beacon sending timing of one of the other stations, each communication station makes the transition to the beacon sending channel of that station, and performs beacon reception.

The communication stations receive beacon signals of other stations over each channel by scan operation at start-up for example, and can acquire the beacon sending channel and beacon sending timing of these. Also, an arrangement may be made wherein the communication stations perform scan operation over the beacon sending channel of the local station or communicable (not interfered) channels other than that channel in a predetermined interval, and neighboring information such as the beacon sending channel and beacon sending timing of one of the other stations, and so forth is updated constantly. The procedures themselves of scan operation are not directly associated with the essence of the present invention, so further description will not be made in the present specification.

Each communication station can acquire the transmission prioritized period TPP following beacon transmission (see FIG. 6). The communication station, which acquired a preferential transmission right, makes the transition to the most appropriate channel on the reception side (i.e., the beacon sending channel on the reception side), and starts traffic transmission.

Also, upon the beacon sending timing of one of the other stations approaching during the transmission prioritized period, the communication station, which is transmitting data, suspends data transmission operation, and makes the transition to the beacon sending scheduled channel to receive the beacon thereof. Subsequently, one of the other stations which transmitted that beacon successively acquires the transmission prioritized period TPP.

With the present embodiment, even during the transmission prioritized period of a certain communication station, the other data sending operations are allowed over channels other than the channel used for this preferential transmission. In other words, in the event that the channel which the communication station, which transmitted a beacon, uses as the TPP is different from the channel which the local communication station now uses, the local station can use that channel successively even following beacon reception.

With the example shown in FIG. 29, the communication station #1, during its own transmission prioritized period acquired along with beacon transmission, performs data sending operation using the channel #3 which is the beacon sending channel of the communication station #2 serving as a data sending destination.

Thereafter, prior to completion of data transmission, upon the beacon sending timing of the other communication station #3 approaching, the communication station #1 suspends data sending operation, makes the transition to the channel #2 which is the beacon sending scheduled channel, and receives the beacon of the communication station #3. The communication station #3, during the transmission prioritized period acquired along with beacon transmission, performs data sending operation using the channel #4 which is the beacon sending channel of the communication station #4 serving as a data sending destination.

At this time, the channel 4 which the communication station #3 uses as the transmission prioritized period is different from the channel #3 which the local station now uses, so the communication station #1 can successively use the channel thereof following beacon reception as well. That is to say, the communication station #1, following receiving the beacon of the communication station #3, successively obtains the transmission prioritized period over the channel #3, and resumes data sending operation to the communication station #2.

Following making the transition to the beacon sending channel of one of the other stations, and receiving a beacon, data sending operation is continued over even any channel other than the channel over which one of the other stations performs data transmission. With the present embodiment, as shown in FIG. 29, in the event of using the channel which was used prior to receiving the beacon of one of the other stations, data transmission can be performed without particularly performing a new negotiation between communication stations. However, in the event of using a channel other than the channel which was used prior to receiving the beacon of one of the other stations, and also in the event that there are multiple communicable channels, there is the need to use the same channel both on the transmission side and on the reception side beforehand, so in this case, there is the need to perform some kind of negotiation regarding a channel to be used prior to transmission.

Therefore, according to the present embodiment, each communication station determines a communication channel in an autonomous decentralized manner, whereby interference can be avoided effectively, and further, communication capacity can be drastically improved by using multiple channels effectively.

Also, with the autonomous decentralized multi-channel wireless communication system according to the present invention, random access based on (CSMA/CA) can be performed during a period other than the transmission prioritized period to be disposed immediately following a beacon sending timing over each channel. At this time, the (RTS/CTS) method can be employed as means for avoiding a collision and improving communication quality.

In this case, a communication station serving as a sending source transmits the (RTS) prior to transmission of net information, a communication station serving as a receiving destination receives this (RTS), and if possible to receive data, feeds back the CTS as the response thereof. Subsequently, following connection being established between the sending and receiving stations by (RTS/CTS) information exchange, data transmission is executed.

Figure 19:
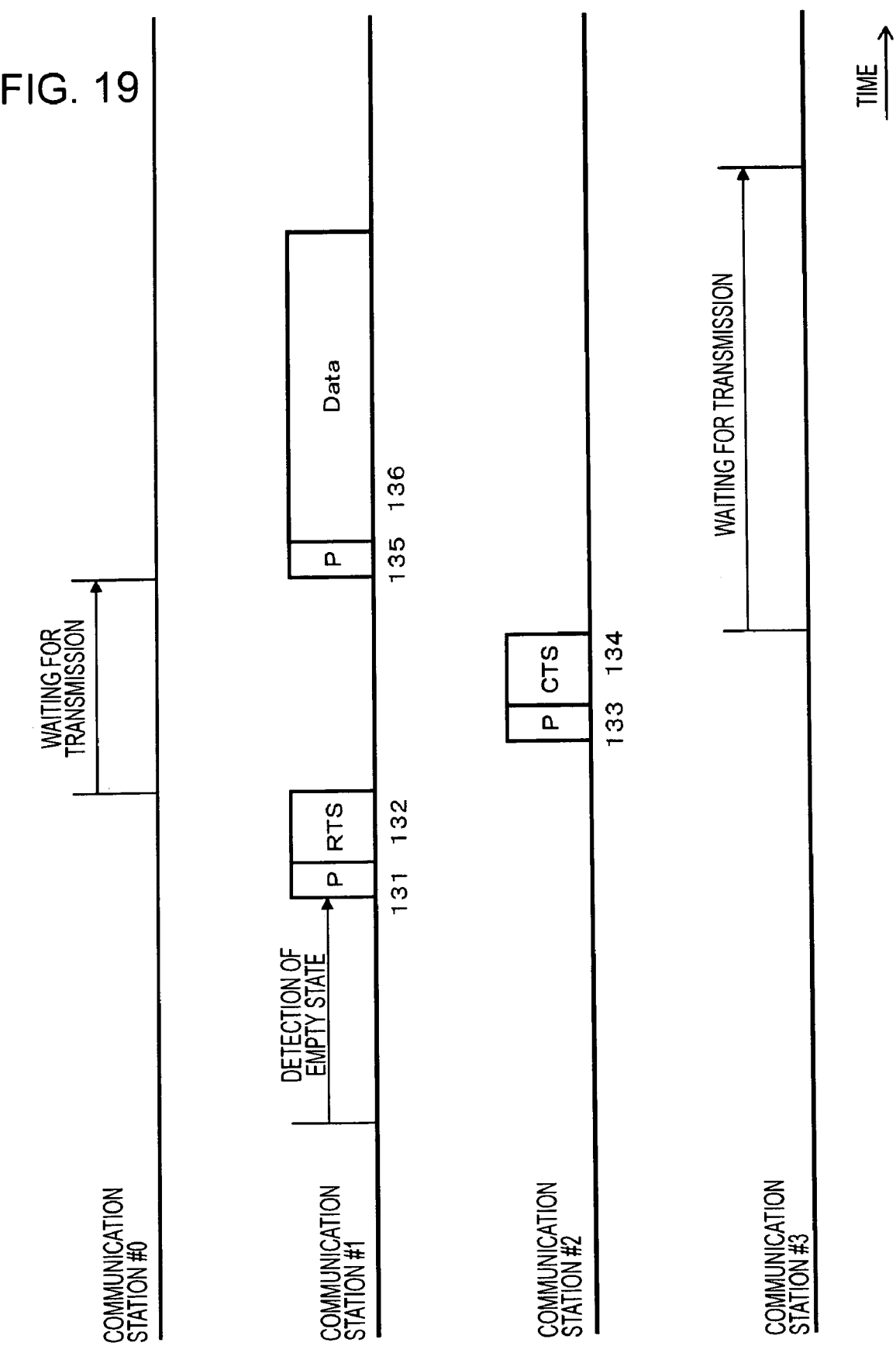
FIG. 19 is a diagram illustrating operation sequences of the (RTS/CTS) method.

Note that regarding the data sending/receiving sequence using the (RTS/CTS) information exchange, description has been already made with reference to FIG. 19, so the description thereof is omitted here. Also, let us say that in accordance with the operation sequence shown in FIG. 20 or FIG. 21, the (RTS/CTS) communication procedures can be applied to a multi-channel communication system.

Figure 30:
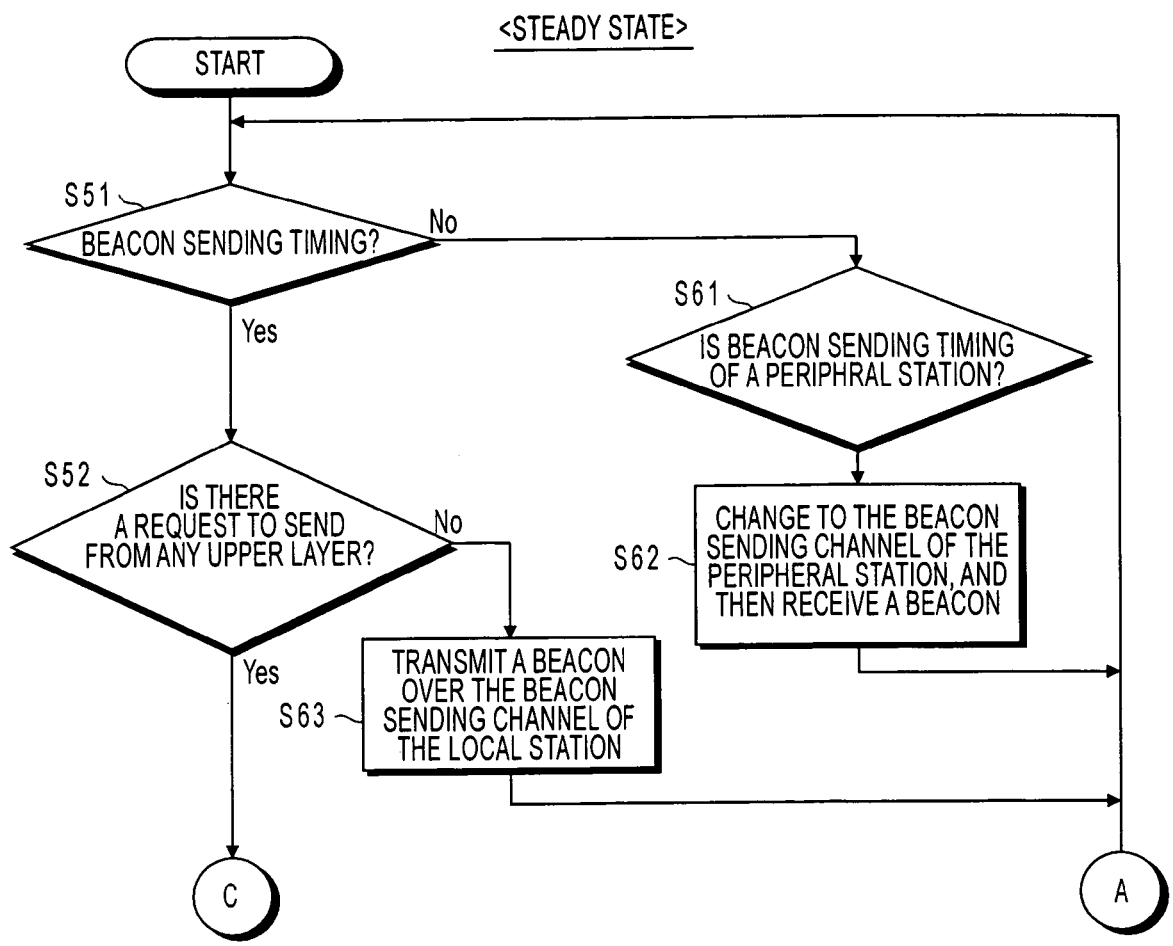
FIG. 30 is a flowchart illustrating processing procedures for the wireless communication apparatus 100 performing autonomous operation as a communication station with a multi-path autonomous decentralized wireless network according to the present invention.
Figure 31:
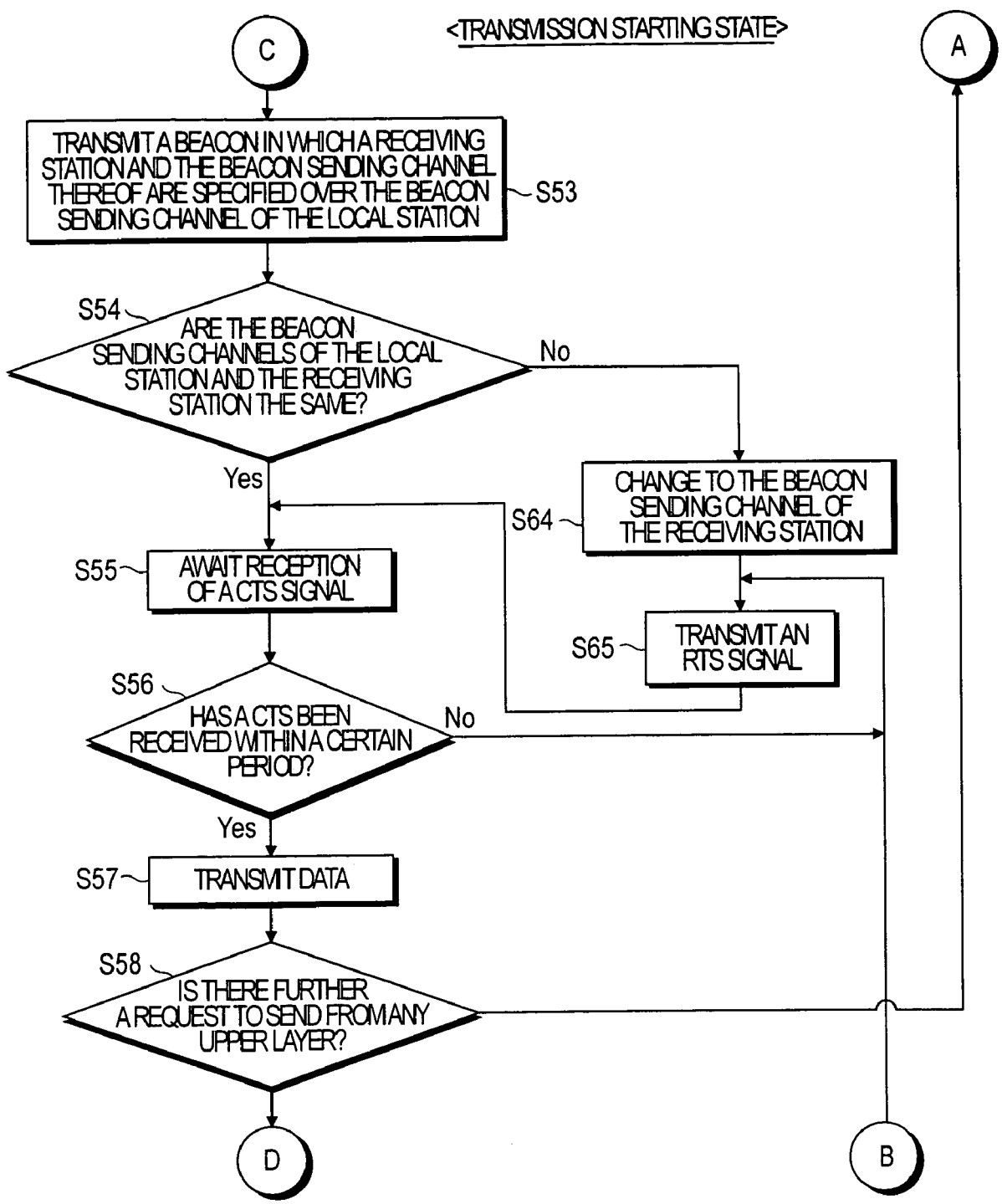
FIG. 31 is a flowchart illustrating processing procedures for the wireless communication apparatus 100 performing autonomous operation as a communication station with a multi-path autonomous decentralized wireless network according to the present invention.
Figure 32:
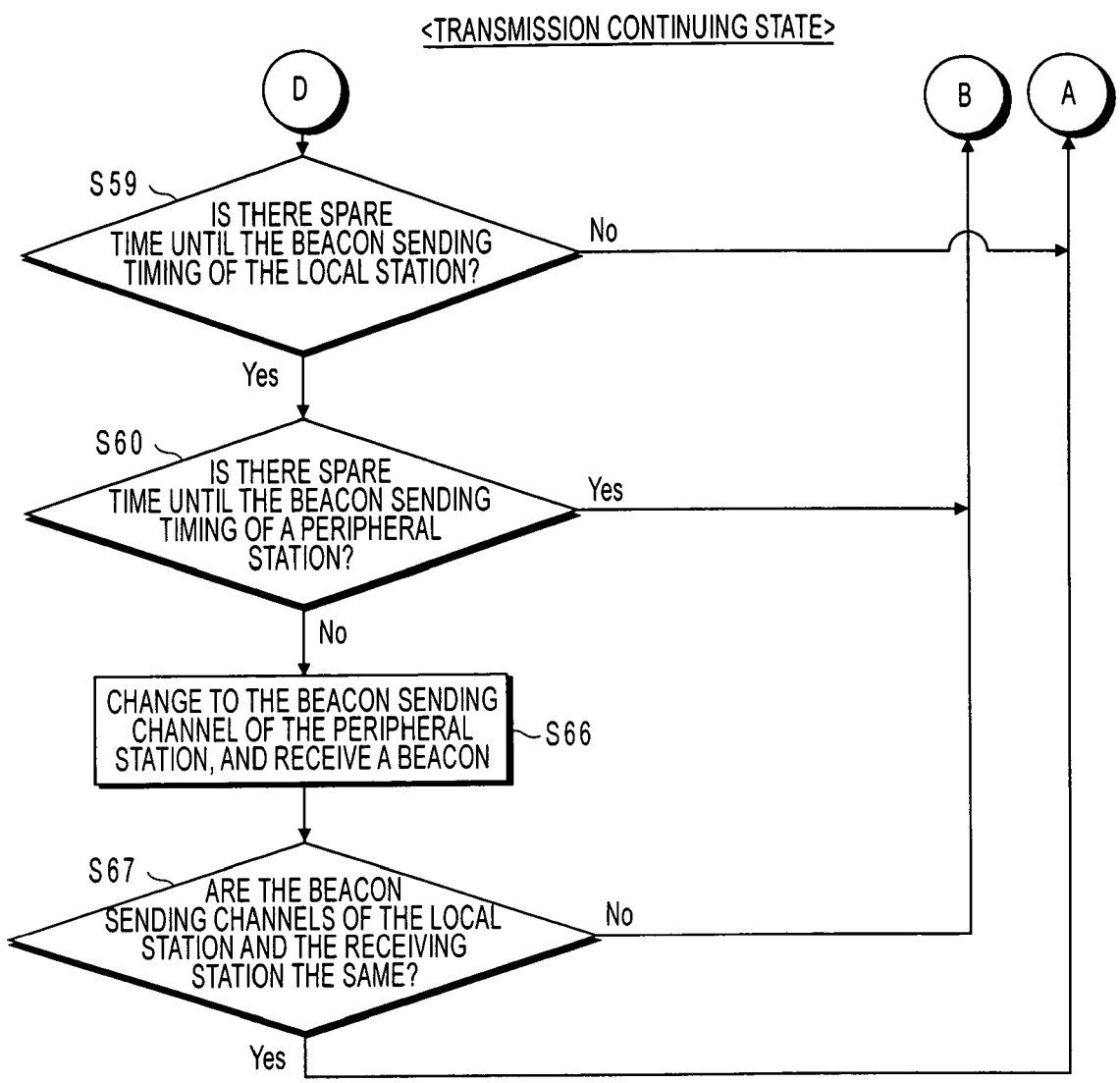
FIG. 32 is a flowchart illustrating processing procedures for the wireless communication apparatus 100 performing autonomous operation as a communication station with a multi-path autonomous decentralized wireless network according to the present invention.

FIG. 30 through FIG. 32 illustrate processing procedures for the wireless communication apparatus 100 performing autonomous operation as a communication station with the multi-path autonomous decentralized wireless network according to the present embodiment, using a flowchart format. However, let us say that the wireless communication station 100 has already acquired neighboring station information such as the beacon sending channels and beacon sending timing of the peripheral stations, and the like by scan operation not shown, or the like. As illustrated in the drawings, the communication station has a steady operation mode not depending on a request to send, a transmission starting mode of which the trigger is beacon transmission, and a transmission continuing mode. Such processing procedures are realized with an arrangement wherein the central control unit 103 executes an executive instructing program stored in the information storing unit 113.

Under the steady operation mode, until the beacon sending timing comes (Step S51), upon the beacon sending timing of a peripheral station coming (Step S61), the communication station makes the transition to the beacon sending channel of the peripheral station to perform beacon reception (Step S62).

Subsequently, upon the beacon sending timing of the local station coming (Step S51), the communication station checks regarding whether or not there is a request to send from an upper layer of the communication protocol (e.g., external device to be connected via the interface 101) (Step S52). In the event that there is no request to send, the communication station performs beacon transmission over the beacon sending channel most appropriate for the local station (Step S63).

On the other hand, in the event that there is a request to send from an upper layer, the communication station transmits a beacon in which the communication station serving as a data sending destination and the beacon sending channel thereof are specified over the beacon sending channel of the local station at predetermined beacon sending timing for the purpose of the (RTS/CTS) procedures (Step S53).

Subsequently, the communication station makes the transition to the transmission starting mode, and checks regarding whether or not the beacon sending channel of the local station is identical to the beacon sending channel of the communication station serving as the data sending destination (i.e., channels to be used for data transmission) (Step S54).

Here, in the event that the mutual beacon sending channels are not matched, the communication station makes the transition to the beacon sending channel of the communication station serving as the data sending destination (Step S64), following which transmits the RTS signal (Step S65).

On the other hand, in the event that the mutual beacon sending channels are matched (Step S54), the communication station regards the beacon in which the communication station serving as the data sending destination and the beacon sending channel thereof are specified as a pseudo-RTS signal, and omits transmission operation of the normal (RTS) signal and channel transition operation. Subsequently, the communication station awaits until the communication station serving as the data sending destination transmits the (CTS) signal (Step S55).

Here, in the event that the communication station could not receive the (CTS) signal within a predetermined period (Step S56), the communication station proceeds to Step S65, and performs retransmission of the (RTS) signal.

On the other hand, in the event that the communication station could safely receive the CTS signal within a predetermined period, the communication station executes data transmission which is requested from the upper layer (Step S57). Subsequently, the communication station checks regarding whether or not there is further a request to send from the upper layer (Step S58). In the event that the request to send is completed, the communication station returns to Step S51, and performs beacon sending/receiving operation under the steady operation mode.

Also, in the event that the request to send continues (Step S58), the communication station makes the transition to the transmission continuing mode. Subsequently, the communication station checks regarding whether or not there is spare time until the beacon sending timing of the local station (Step S59). In the event that there is no spare time, the communication station returns to Step S51, and performs beacon sending operation under the steady operation mode.

In the event that there is spare time until the beacon sending timing of the local station (Step S59), the communication station further checks regarding whether or not there is spare time until the beacon sending timing of a peripheral station (Step S60). In the event that there is no spare time, the communication station makes the transition to the beacon sending channel of the relevant peripheral station to receive a beacon (Step S66).

Subsequently, the communication station checks regarding whether or not the beacon sending channel of the local station is identical to the beacon sending channel of the communication station serving as the data transition destination (Step S67). In the event that the mutual beacon sending channels are not matched, the communication station proceeds to Step S65, and performs retransmission of the RTS signal. Also, in the event that the mutual beacon sending channels are matched, the communication station returns to Step S1, and performs beacon sending operation under the steady operation mode.

In the event that there is spare time until the beacon sending timing of the local station and a peripheral station (Step S60), the communication station proceeds to Step S65, and performs retransmission of the RTS signal.

Also, in the event that there is no spare time until the beacon sending timing of a peripheral station (Step S59), the communication station returns Step S51, and performs beacon sending operation under the steady operation mode.

INDUSTRIAL APPLICABILITY

As described above, description has been made in detail regarding the present invention with reference to the particular embodiment. However, it is fully apparent that one skilled in the art can make various modifications and substitutions to the embodiment without departing from the essence of the present invention.

With the present specification, description has been made regarding the embodiments wherein the present invention is applied to the autonomous decentralized multi-channel communication system for respective communication stations being gradually time-synchronized by notifying a beacon one another, but the essence of the present invention is not restricted to this.

For example, even with the autonomous decentralized multi-channel communication system not accompanying notification of beacons, or the multi-channel communication system of another type other than the autonomous decentralized type (e.g., managed under a control station), applying the present invention thereto can avoid a deadlock state wherein each of communication stations cannot acknowledge one another's existence, and also improve the throughput of the entire system by effective frequency assignment.

In other words, the present invention has been disclosed with a form of exemplification, the description content of the present specification should not be interpreted in a restrictive manner. In order to determine the essence of the present invention, the Claims should be referenced.

The invention claimed is:

1. A wireless communication system for forming an autonomous decentralized network, comprising:
a plurality of communication stations each configured to transmit a beacon signal at a predetermined time interval via one of a plurality of frequency channels received by the plurality of communication stations, and each configured to determine one of the plurality of frequency channels as a communication channel based on an interference level information included in the beacon signal, the interference level information corresponding to interference received by a communication station transmitting the beacon signal,
wherein each of the plurality of communication stations narrows the predetermined time interval in response to a new communication station joining the autonomous decentralized network, and the plurality of communication stations are not controlled by a controlling station.

2. The wireless communication system according to claim 1, wherein each of the plurality of communication stations changes a beacon sending channel thereof, when at least one of the plurality of communication stations does not receive the beacon signal.

3. The wireless communication system according to claim 1, wherein the communication stations send the beacon signal on a channel having a lowest interference level, when no beacon signal is detected from other communication stations.

4. The wireless communication system according to claim 1, wherein more than half of the communication stations transmit the beacon signal on a same beacon sending channel, when the interference level of the same beacon sending channel is below a predetermined lower level.

5. The wireless communication system according to claim 4, wherein the communication stations transmit the beacon signal on a channel having a lowest average interference level information, when the same beacon sending channel has an interference level greater than a predetermined upper level.

6. The wireless communication system according to claim 1, wherein the communication stations set, as a beacon sending channel, an unused channel having a low interference level, when wideband communication capacity is required.

7. The wireless communication system according to claim 1, wherein one of a sending communication station and a receiving communication station of the plurality of communication stations transmits the beacon signal including a channel information of a data communication channel to a third communication local station, and the third communication station withholds data transmission over the data communication channel for a predetermined period in response to receiving the beacon signal.

8. A wireless communication system for forming an autonomous decentralized network, comprising:
a plurality of communication stations each configured to transmit a beacon signal at a predetermined time interval via one of a plurality of channels received by the plurality of communication stations, the plurality of communication stations narrowing the predetermined time interval in response to a new communication station joining the autonomous decentralized network, each of the plurality of communication stations being configured to determine a communication channel based on an interference level information included in the beacon signal,
wherein the plurality of communication stations are not controlled by a controlling station, and a sending communication station of the plurality of communication stations transmits a request to send packet (RTS) over a channel having a low interference level with respect to a receiving communication station in the plurality of communication stations, and starts data transmission in response to receiving a clear to send packet (CTS) from the receiving communication station.

9. The wireless communication system according to claim 8, wherein the sending communication station withholds transmission of the request to send packet (RTS) following transmission of the beacon signal including the information of the data communication channel, when the beacon sending channel of the sending communication station is the data communication channel, and the sending communication station transmits a clear to send packet (CTS) in response to receiving the beacon signal including the information of the data communication channel.

10. A wireless communication system for forming an autonomous decentralized network, comprising:
a plurality of communication stations, not controlled by a controlling station, each configured to:
transmit a beacon at a predetermined transmission frame time interval via at least one of a plurality of channels;
transmit a request to send packet (RTS) via a beacon channel of a receiving communication station;
begin data transmission in response to a clear to send packet (CTS) from the receiving communication station; and
disable a beacon reception operation from the receiving communication station when not communicating with the receiving communication station and the receiving communication station is set to a different channel,
wherein when the beacon reception operation is disabled a respective communication station estimates a sending timing of one of the RTS and CTS signals based on a beacon sending timing for the beacon transmitted on the beacon sending channel corresponding to the respective communication station.

11. A wireless communication apparatus configured to operate in an autonomous decentralized manner under a wireless communication environment having multiple channels and no relationship between a control station and controlled stations, said apparatus comprising:

means for transmitting/receiving wireless data over each of the multiple channels;

means for setting one of the multiple channels as a data sending/receiving channel in said means for transmitting/receiving;

means for controlling transmission and reception of the wireless data in said means for transmitting/receiving;

means for generating a beacon signal including an interference level information corresponding to interference received by another wireless communication apparatus transmitting the beacon, the beacon signal being transmitted by the means for transmitting/receiving at a predetermined transmission frame time interval, the predetermined transmission frame time interval being narrowed in response to discovery of a new wireless communication apparatus; and means for analyzing the beacon signal received from the other wireless communication apparatus, wherein said means for setting determines a communication channel based on the interference level information included in the beacon signal received from the other wireless communication apparatus.

12. The wireless communication apparatus according to claim 11, wherein said means for setting sets a channel having a lowest interference level with respect to the wireless communication apparatus as a beacon sending channel, when the beacon signal of an other communication station is not detected over any channel.

13. The wireless communication apparatus according to claim 11, wherein said means for generating generates a beacon signal including an information of a data communication channel.

14. The wireless communication apparatus according to claim 11, wherein said communication control means transmits a clear to send packet in response to receiving one of a request to send packet (RTS) addressed to the wireless communication apparatus and a beacon including the information of a data communication channel.

15. A wireless communication apparatus configured to operate in an autonomous decentralized manner under a wireless communication environment having multiple channels and no relationship between a control station and controlled stations, said apparatus comprising:

means for transmitting/receiving wireless data over each of the multiple channels;

means for setting one of the multiple channels as a data sending/receiving channel in said means for transmitting/receiving;

means for controlling transmission and reception of the wireless data in said means for transmitting/receiving;

means for generating a beacon signal including an interference level information corresponding to interference received by the wireless communication apparatus; and means for analyzing a beacon signal received from another wireless communication apparatus, wherein said means for setting determines a communication channel based on the interference level information included in the beacon signal received from the other wireless communication apparatus and said means for setting sets a most frequent channel used by more than half of a plurality of communication stations as a beacon sending channel, when an interference level information of the most frequent channel is below a predetermined lower level with respect to the wireless communication apparatus.

16. The wireless communication apparatus according to claim 15, wherein said means for setting sets, as the beacon sending channel, a channel having a lowest average interference level information with respect to the wireless communication apparatus, when any other communication station receives interference above a predetermined upper level over the most frequent channel.

17. A wireless communication apparatus configured to operate in an autonomous decentralized manner under a wireless communication environment having multiple channels and no relationship between a control station and controlled stations, said apparatus comprising:

means for transmitting/receiving wireless data over each of the multiple channels;

means for setting one of the multiple channels as a data sending/receiving channel in said means for transmitting/receiving;

means for controlling transmission and reception of the wireless data in said means for transmitting/receiving;

means for generating a beacon signal including an interference level information corresponding to interference received by the wireless communication apparatus; and means for analyzing the beacon signal received from another wireless communication apparatus, wherein said means for setting determines a communication channel based on the interference level information included in the beacon signal received from the other wireless communication apparatus and said means for setting sets an unused channel, having a low interference level information, as a beacon sending channel when the wireless communication apparatus requires wideband communication capacity.

18. A wireless communication apparatus configured to operate in an autonomous decentralized manner under a wireless communication environment having multiple channels and no relationship between a control station and controlled stations, said apparatus comprising:

means for transmitting/receiving wireless data over each of the multiple channels;

means for setting one of the multiple channels as a data sending/receiving channel in said means for transmitting/receiving;

means for controlling transmission and reception of the wireless data in said means for transmitting/receiving;

means for generating a beacon signal including an interference level information corresponding to interference received by the wireless communication apparatus, the beacon signal being transmitted by the means for transmitting/receiving at a predetermined transmission frame time interval, the predetermined transmission frame time interval being narrowed in response to discovery of a new wireless communication station; and means for analyzing the beacon signal received from another wireless communication apparatus, wherein said means for setting determines a communication channel based on the interference level information included in the beacon signal received from the other wireless communication apparatus and said means for controlling transmits a request to send packet (RTS) over a channel having a low interference level information, and starts data transmission in response to receiving a clear to send packet (CTS) from a receiving wireless communication apparatus.

19. A wireless communication apparatus configured to operate in an autonomous decentralized manner under a wireless communication environment having multiple channels and no relationship between a control station and controlled stations, said apparatus comprising:

means for transmitting/receiving wireless data over each of the multiple channels;

means for setting one of the multiple channels as a data sending/receiving channel in said means for transmitting/receiving;

means for controlling transmission and reception of the wireless data in said means for transmitting/receiving;

means for generating a beacon signal including an interference level information corresponding to interference received by the wireless communication apparatus; and means for analyzing a beacon signal received from another wireless communication apparatus, wherein said means for setting determines a communication channel based on the interference level information included in the beacon signal received from the other wireless communication apparatus and said means for controlling disables transmission of data over a receiving channel for a predetermined period in response to one of a request to send packet (RTS) addressed to the other wireless communication apparatus, a beacon having a request to send packet (RTS) addressed to the other wireless communication apparatus superimposed, or a beacon including information of a data communication channel.

20. A wireless communication apparatus configured to operate in an autonomous decentralized manner under a wireless communication environment having multiple channels and no relationship between a control station and controlled stations, said apparatus comprising:

means for transmitting/receiving wireless data over each of the multiple channels;

means for setting a data sending/receiving channel in said means for transmitting/receiving;

means for controlling transmission and reception of the wireless data in said means for transmitting/receiving;

means for analyzing a beacon signal received from another wireless communication apparatus, the beacon signal including interference level information corresponding to interference received by the other wireless communication apparatus; and means for controlling communication operation over the multiple channels;

wherein the means for controlling communication establishes communication with the other wireless communication apparatus in accordance with a beacon signal from the other wireless communication apparatus, and the means for controlling communications disables beacon reception operation when not communicating with the other wireless communication apparatus when the other wireless communication apparatus uses a channel other than an established beacon sending channel.

21. A wireless communication apparatus operable in an autonomous decentralized manner under a wireless communication environment having multiple channels and no relationship between a control station and controlled stations, said apparatus comprising:

means for transmitting/receiving wireless data over each of the multiple channels;

means for setting one of the multiple channels as a data sending/receiving channel in said means for transmitting/receiving;

means for controlling transmission and reception of the wireless data in said means for transmitting/receiving;

means for analyzing a beacon signal received from another wireless communication apparatus; and means for controlling communication operation over the multiple channels, wherein the means for controlling communication establishes communication with the other wireless communication apparatus in accordance with a beacon signal from the other wireless communication apparatus, disables beacon reception operation when not communicating with the other wireless communication apparatus when the other wireless communication apparatus uses a channel other than an established beacon sending channel, transmits a request to send packet (RTS), and starts the data transmission in response to receiving a clear to send packet (CTS) from a receiving wireless communication apparatus, and, when disabling receiving operation of the beacon from the receiving wireless communication apparatus, estimates a sending timing of the (RTS) and (CTS) signals based on a beacon sending timing received on a channel used by the wireless communication apparatus.

22. A wireless communication method for operating a communication station in an autonomous decentralized manner under a wireless communication environment having multiple channels and no relationship between a control station and controlled stations, said method comprising:

setting, at a channel setting unit, a data sending/receiving channel;

controlling, at a central control unit, transmission and reception of data via the data sending/receiving channel;

generating, at a beacon generating unit, a beacon signal including an interference level information corresponding to interference received by a communication station transmitting the beacon signal;

transmitting, from a wireless sending unit, the beacon signal at a predetermined frame time interval;

narrowing, by the central control unit, the predetermined frame time interval in response to discovery of a new communication station; and analyzing, in a beacon analyzing unit, the beacon signal received from another communication station, wherein a communication channel is determined based on the interference level information included in the beacon signal received from the other communication station.

23. A wireless communication method for operating a communication station in an autonomous decentralized manner under a wireless communication environment having multiple channels and no relationship between a control station and controlled stations, said method comprising:

setting, at a channel setting unit, a beacon signal sending channel of a communication station;

sending, from a wireless sending unit, a beacon signal;

controlling, at a central control unit, beacon receiving operation of another communication station, including determining, at the central control unit, whether to communicate with the other communication station in accordance with the beacon signal, the beacon signal including interference level information corresponding to interference received by the other communication station, disabling, by the central control unit, beacon signal reception operation when not communicating with the other communication station when the other communication station sends the beacon signal over a channel other than a beacon signal sending channel;

analyzing, at a beacon analyzing unit, the beacon signal received from the other communication station;

setting, at the channel setting unit, a data communication channel; and controlling data communication via the data communication channel.

24. A wireless communication method for operating a communication station in an autonomous decentralized manner under a wireless communication environment having multiple channels and no relationship between a control station and controlled stations, said method comprising:

setting, at a channel setting unit, a beacon signal sending channel of a communication station;

sending, from a wireless sending unit, a beacon signal;

controlling, at a central controller, beacon receiving operation of another communication station, including determining, by the central controller, whether to communicate with the other communication station in accordance with the beacon signal, disabling the beacon signal reception operation when not communicating with the other communication station when the other communication station sends the beacon signal over a channel other than a beacon sending channel;

analyzing, at a beacon analyzing unit, the beacon signal received from the other communication station;

setting, at the channel setting unit, a data communication channel; and controlling, at the central controller, data communication via the data communication channel, wherein controlling the data communication includes transmitting, by wireless sending unit of a sending communication station, a request to send packet (RTS), starting data transmission in response to receiving a clear to send packet (CTS) from a receiving communication station, and estimating a timing of the (RTS) and (CTS) signals based on a beacon sending timing received on a channel used by the sending communication station, when disabling the receiving operation of the beacon signal from the receiving communication station.

25. A non-transitory computer-readable medium storing computer-readable instructions thereon, the computer-readable instructions when executed by a processor configured to operate in an autonomous decentralized manner under a wireless communication environment having multiple channels and no relationship between a control station and controlled stations, cause the processor to perform the steps comprising:

setting one of the multiple channels as a data sending/receiving channel;

transmitting and receiving data via the multiple channels;

generating a beacon signal including an interference level information corresponding to interference received by a communication station transmitting the beacon signal;

transmitting the beacon signal at a predetermined frame time interval;

narrowing the predetermined frame time interval in response to discovery of a new communication station; and analyzing the beacon signal received from another communication station, wherein in said data channel setting step, a communication channel is determined based on the interference level information included in the beacon signal received from the other communication station.

26. A non-transitory computer-readable medium storing computer readable-instructions thereon, the instructions when executed by a processor configured to operate in an autonomous decentralized manner under a wireless communication environment having multiple channels and no relationship between a control station and controlled stations, cause the processor to perform the steps comprising:

setting a beacon sending channel of a communication station;

sending a beacon via the beacon sending channel;

controlling beacon signal receiving operation, of a beacon signal from another communication station, including:

determining whether to communicate with the other communication station in accordance with the beacon signal, the beacon signal including interference level information corresponding to interference received by the other communication station, disabling the beacon signal reception operation when not communicating with the other communication station when the other communication station sends the beacon signal over a channel other than a beacon sending channel;

analyzing the beacon signal received from the other communication station;

setting a data communication channel; and controlling data communication with the other communication station via the data communication channel.

27. A wireless communication system for forming an autonomous decentralized network having multiple communication channels, comprising:

a plurality of communication stations each configured to:

set a channel of the plurality of channels having a highest reception level as a beacon communication channel, and transmit data to another communication station via a beacon communication channel of another communication station at a predetermined frame time interval, the predetermined frame time interval being narrowed in response to a new communication station joining the autonomous decentralized network, and transition to the beacon communication channel of the other communication station, in accordance with the beacon signal of the other communication station, to receive the beacon signal of the other communication station, the beacon signal including interference level information corresponding to interference received by the other communication station.

28. The wireless communication system according to claim 27, wherein each communication station of the plurality of communication stations determines a beacon sending timing to avoid overlap with other communication stations, when the beacon sending timing of a respective communication station overlaps with the beacon sending timing of another communication station on the beacon communication channel.

29. The wireless communication system according to claim 27, wherein each communication station acquires a preferential sending period according to beacon transmission of at least one of the plurality of communication stations.

30. The wireless communication system according to claim 29, wherein each communication station transitions to a beacon communication channel of another communication station, according to the beacon sending timing of the other communication station, receives a beacon, and subsequently transmits data over a channel other than a channel used by the other communication station even during the preferential sending period provided to the other communication station.

31. The wireless communication system according to claim 27, wherein a sending communication station of the plurality of communication stations transmits a request to send packet (RTS) over the beacon communication channel of a receiving communication station, and starts data transmission in response to receiving a clear to send packet (CTS) from the receiving communication station.

32. The wireless communication system according to claim 27, wherein a sending communication station of the plurality of communication stations transmits a beacon identifying the sending communication station and a beacon communication channel thereof, the beacon being transmitted over the beacon communication channel of the sending communication station, and another communication station, which receives the beacon, withholds data transmission over the beacon communication channel of the sending communication station for a predetermined period.

33. A wireless communication system for forming an autonomous decentralized network having multiple communication channels, comprising:
   a plurality of communication stations each configured to:
      set a channel of the plurality of channels having a highest reception level as a beacon communication channel,
      transmit data to another communication station via a beacon communication channel of the other communication station, and
      transition to the beacon communication channel of the other communication station, in accordance with a beacon signal of the other communication station, to receive the beacon signal of the other communication station,
   wherein a sending communication station of the plurality of communication stations omits transmission of a request to send packet (RTS), when a beacon communication channel thereof is the same beacon communication channel of a receiving communication station, and the sending communication station transmits a clear to send packet (CTS) in response to receiving the beacon identifying the receiving communication station and the beacon sending channel thereof.

34. A wireless communication apparatus in an autonomous decentralized manner under a wireless communication environment having multiple channels and no relationship between a control station and controlled stations, said apparatus comprising:
   means for transmitting/receiving wireless data over each channel of the multiple channels;
   means for setting one of the multiple channels as a data sending/receiving channel in said means for transmitting/receiving, including:
      setting a beacon sending channel and a data sending channel, the data sending channel corresponding to a beacon sending channel of a receiving communication station, a beacon signal transmitted via the beacon sending channel including interference level information corresponding to interference received by the receiving communication station;
   means for controlling data sending/receiving timing in said communication means;
   means for generating a beacon signal to be transmitted via said communication means at a predetermined frame time interval, the predetermined frame time interval being narrowed in response to discovery of a new wireless communication apparatus; and
   means for analyzing a beacon signal received from another communication station using said communication means.

35. The wireless communication apparatus according to claim 34, wherein said channel setting means sets as the beacon sending channel, a channel having a highest communication quality or highest reception with respect to the wireless communication apparatus.

36. The wireless communication apparatus according to claim 34, wherein said means for controlling determines a beacon sending timing that does not overlap with beacon sending timings of other communication stations, when the beacon sending timing of an existing communication station overlaps with the beacon sending channel of the wireless communication apparatus.

37. The wireless communication apparatus according to claim 34, wherein said means for setting sets the beacon sending channel of the wireless communication apparatus in accordance with the beacon sending timing, and said means for controlling performs control of beacon sending operation in accordance with the beacon sending timing.

38. The wireless communication apparatus according to claim 34, wherein said means for setting sets the beacon sending channel of another communication station to a receiving channel of the wireless communication apparatus in accordance with the beacon sending timing of the other communication station, and said means for controlling controls a receiving operation, in response to the beacon sending timing of the other communication station.

39. The wireless communication apparatus according to claim 34, wherein said means for controlling acquires a preferential sending period via a beacon transmission.

40. The wireless communication apparatus according to claim 34, wherein said means for controlling transmits a request to send packet (RTS) over the beacon sending channel, and starts the data transmission in response to receiving a clear to send packet (CTS) from a receiving communication station.

41. The wireless communication apparatus according to claim 34, wherein said means for generating generates a beacon identifying the wireless communication apparatus and the beacon sending channel thereof, and said means for controlling transmits the beacon over the beacon sending channel.

42. The wireless communication apparatus according to claim 41, wherein said means for controlling transmits a clear to send packet in response to receiving a request to send packet (RTS) addressed to the wireless communication apparatus or a beacon identifying the wireless communication apparatus as a destination station.

43. A wireless communication apparatus configured to operate in an autonomous decentralized manner under a wireless communication environment having multiple channels and no relationship between a control station and controlled stations, said apparatus comprising:
   means for transmitting/receiving wireless data over each of the multiple channels;
   means for setting a data sending/receiving channel in said means for transmitting/receiving, including:
      setting a beacon communication channel and a data communication channel in correspondence with the beacon communication channel of a receiving communication station;
   means for controlling data sending/receiving timing in said means for transmitting/receiving;
   means for generating a beacon signal to be transmitted via said means for transmitting/receiving; and
   means for analyzing the beacon signal received from another communication station using said means for transmitting/receiving,
   wherein said means for generating generates a beacon identifying the wireless communication apparatus and the beacon communication channel thereof, and said means for controlling transmits the beacon over the beacon communication channel, said means for controlling withholding transmission of data over a relevant receiving channel for a predetermined period in response to receiving a request to send packet (RTS) addressed to an other communication station, or a beacon in which the other communication station is specified as a destination station.

44. A wireless communication method for causing a communication station to operate in an autonomous decentralized manner under a wireless communication environment having multiple channels and no controlling station, said method comprising:
    setting, at a channel setting unit, a data sending/receiving channel, including setting a beacon sending channel and a data transmission channel corresponding to the beacon sending channel of a destination station;
    controlling, at a central control unit, data sending/receiving timing;
    generating, at a beacon generating unit, a beacon signal to be transmitted in accordance with a predetermined frame time interval the predetermined frame time interval being narrowed in response to discovery of a new communication station; and
    analyzing, at a beacon analyzing unit, a beacon signal received from another communication station, the received beacon signal including interference level information corresponding to interference received by the other communication station.

45. The wireless communication method according to claim 44, wherein a channel having a highest communication quality or highest reception is set as the beacon sending channel.

46. A non-transitory computer-readable medium storing computer-readable instructions thereon, the instructions when executed by a processor operable in an autonomous decentralized manner under a wireless communication environment having multiple channels and no relationship between a control station and controlled stations, cause the processor to perform the steps comprising:
    setting a data sending/receiving channel, including setting a beacon sending channel and a data transmission channel corresponding to the beacon sending channel of a destination communication station;
    controlling data sending/receiving timing;
    generating a beacon signal of a communication station to be transmitted via the beacon sending channel in accordance with a predetermined frame time interval, the predetermined frame time interval being narrowed in response to discovery of a new communication station; and
    analyzing a beacon signal received from another communication station, the received beacon signal including interference level information corresponding to interference received by the another communication station.

47. A wireless communication apparatus configured to operate in an autonomous decentralized manner under a wireless communication environment having multiple channels and no relationship between a control station and controlled stations, said apparatus comprising:
    means for transmitting/receiving wireless data over each of the multiple channels;
    means for setting a data sending/receiving channel in said means for transmitting/receiving, including:
        setting a beacon communication channel and a data communication channel in correspondence with the beacon communication channel of a receiving communication station;
    means for controlling data sending/receiving timing in said means for transmitting/receiving;
    means for generating a beacon signal to be transmitted via said means for transmitting/receiving; and
    means for analyzing a beacon signal received from another communication station using said means for transmitting/receiving,
    wherein said means for controlling acquires a preferential sending period via a beacon transmission, and, in accordance with a beacon sending timing of an other communication station, transitions to a beacon communication channel of the other communication station, receives a beacon, and subsequently sends data over a channel other than a data communication channel of the other communication station, even during the preferential sending period of the other communication station.

* * * * *